(12) United States Patent
Pearce et al.

(10) Patent No.: US 11,093,250 B2
(45) Date of Patent: Aug. 17, 2021

(54) APPARATUS AND METHOD FOR GANG INVARIANT OPERATION OPTIMIZATIONS USING DYNAMIC EVALUATION

(71) Applicant: Intel Corporation, Santa Clara, CA (US)

(72) Inventors: Jonathan Pearce, Hillsboro, OR (US); David Sheffield, Portland, OR (US); Srikanth Srinivasan, Portland, OR (US); Jaewoong Sim, Portland, OR (US); Andrey Ayupov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 16/147,694

(22) Filed: Sep. 29, 2018

(65) Prior Publication Data
US 2019/0042269 A1 Feb. 7, 2019

(51) Int. Cl.
*G06F 9/38* (2018.01)
*G06F 9/30* (2018.01)
(Continued)

(52) U.S. Cl.
CPC ........ *G06F 9/3851* (2013.01); *G06F 9/30123* (2013.01); *G06F 9/30145* (2013.01); *G06F 9/3891* (2013.01); *G06F 9/4806* (2013.01)

(58) Field of Classification Search
CPC .... G06F 9/3851; G06F 9/3887; G06F 9/3891; G06F 9/3009; G06F 9/30123;
(Continued)

(56) References Cited

U.S. PATENT DOCUMENTS 7,587,584 B2   9/2009  Enright et al.
10,354,733 B1  7/2019  Zejda et al.
(Continued)

OTHER PUBLICATIONS

Rogers, TG et al. A VariableWarp Size Architecture. ACM SIGARCH, vol. 43, Issue 3S, Jun. 2015, pp. 489-501 [online], [retrieved on Feb. 20, 2020], Retrieved from the Internet <URL: https://dl.acm.org/doi/abs/10.1145/2872887.2750410>.*

(Continued)

*Primary Examiner* — Shawn Doman
(74) *Attorney, Agent, or Firm* — Nicholson De Vos Webster & Elliott LLP

(57) ABSTRACT

An apparatus and method for efficiently processing invariant operations on a parallel execution engine. For example, one embodiment of a processor comprises: a plurality of parallel execution lanes comprising execution circuitry and registers to concurrently execute a plurality of threads; front end circuitry coupled to the plurality of parallel execution lanes, the front end circuitry to arrange the threads into parallel execution groups and schedule operations of the threads to be executed across the parallel execution lanes, wherein the front end circuitry is to dynamically evaluate one or more variables associated with the operations to determine if one or more conditionally invariant operations will be invariant across threads of a parallel execution group and/or across the parallel execution lanes; a scheduler of the front end circuitry to responsively schedule a shared thread upon a determination that a conditionally invariant operation will be invariant across threads of a parallel execution group and/or across the parallel execution lanes.

24 Claims, 41 Drawing Sheets

(51) Int. Cl.
*G06F 9/48* (2006.01)
*G06F 9/50* (2006.01)

(58) Field of Classification Search
CPC .. G06F 9/4806; G06F 9/30145; G06F 9/5038; G06F 9/3828; G06F 9/4843
USPC .................................................... 712/22, 220
See application file for complete search history.

(56) References Cited

U.S. PATENT DOCUMENTS

| | | | |
|---|---|---|---|
| 10,419,338 B2 | 9/2019 | Gray | |
| 2009/0259997 A1* | 10/2009 | Grover | G06F 8/456 717/136 |
| 2013/0042090 A1 | 2/2013 | Krashinsky | |
| 2013/0191817 A1 | 7/2013 | Vorbach | |
| 2013/0305021 A1* | 11/2013 | Grover | G06F 9/3836 712/214 |
| 2014/0006753 A1 | 1/2014 | Gopal et al. | |
| 2014/0189306 A1* | 7/2014 | Merten | G06F 9/30065 712/208 |
| 2015/0187042 A1 | 7/2015 | Gupta | |
| 2015/0301826 A1* | 10/2015 | Sideris | G06F 9/3826 712/226 |
| 2016/0085551 A1 | 3/2016 | Greathouse et al. | |
| 2016/0132338 A1 | 5/2016 | Jin | |
| 2016/0371093 A1 | 12/2016 | Chang | |
| 2018/0181398 A1 | 6/2018 | Scherbinin et al. | |
| 2019/0325296 A1 | 10/2019 | Fowers et al. | |
| 2020/0089528 A1 | 3/2020 | Gutierrez et al. | |

OTHER PUBLICATIONS

Brunie, Nicolas, et al., "Simultaneous Branch and Warp Interweaving for Sustained GPU Performance", 39th Annual International Symposium on Computer Architecture (ISCA), Portland, OR, United States, May 2, 2012, pp. 49-60.

Non-Final Office Action, U.S. Appl. No. 16/147,692, dated Apr. 2, 2020, 8 pages.

Non-Final Office Action, U.S. Appl. No. 16/147,696, dated Jan. 21, 2020, 9 pages.

Non-Final Office Action, U.S. Appl. No. 16/220,528, dated Apr. 8, 2020, 8 pages.

Notice of Allowance, U.S. Appl. No. 16/147,696, dated May 8, 2020, 8 pages.

Notice of Allowance, U.S. Appl. No. 16/147,692, dated Jul. 14, 2020, 10 pages.

Notice of Allowance, U.S. Appl. No. 16/220,528, dated Oct. 16, 2020, 7 pages.

* cited by examiner

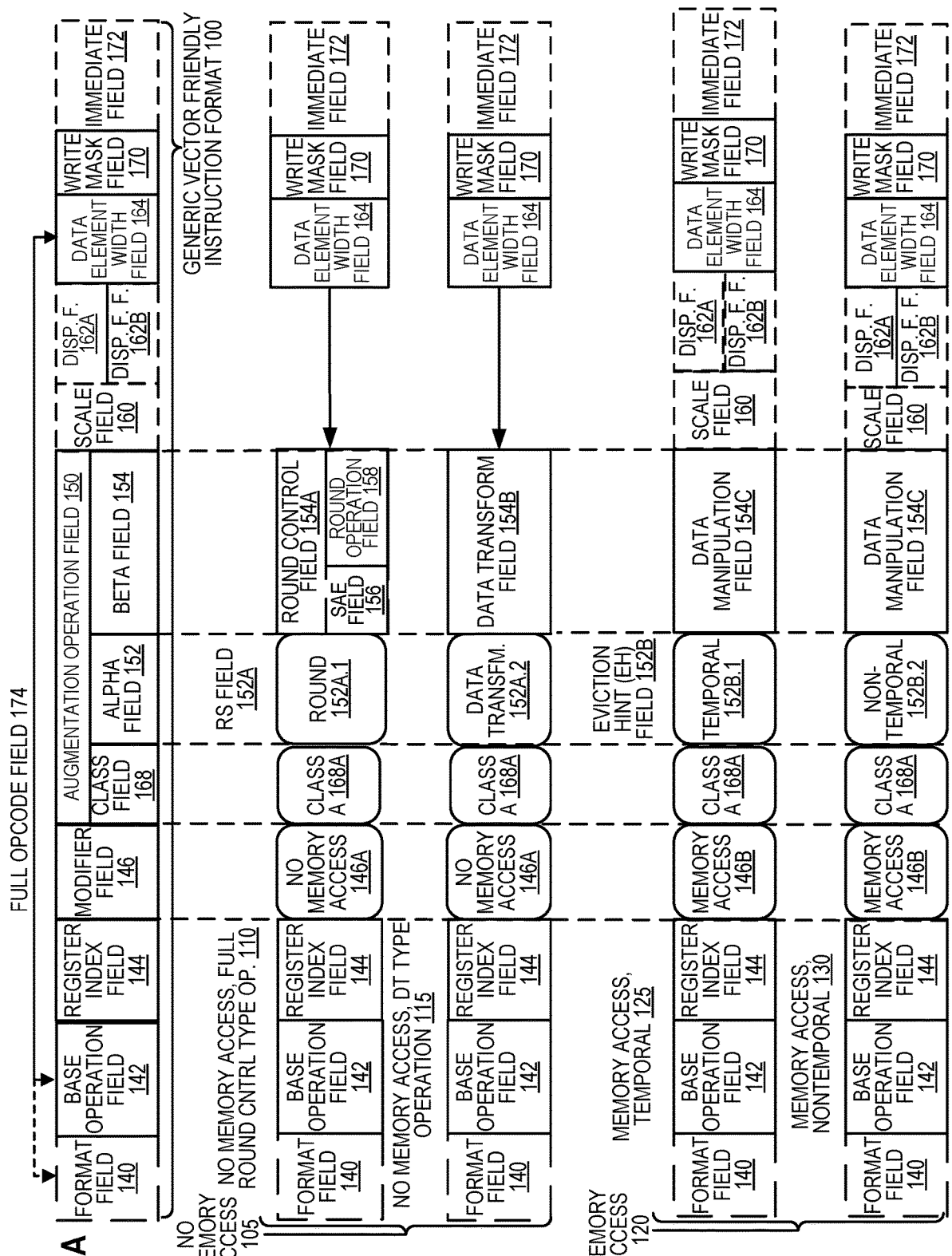

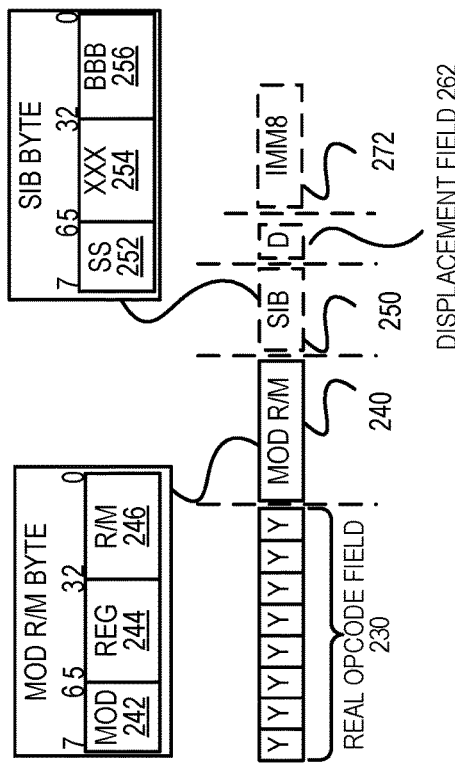
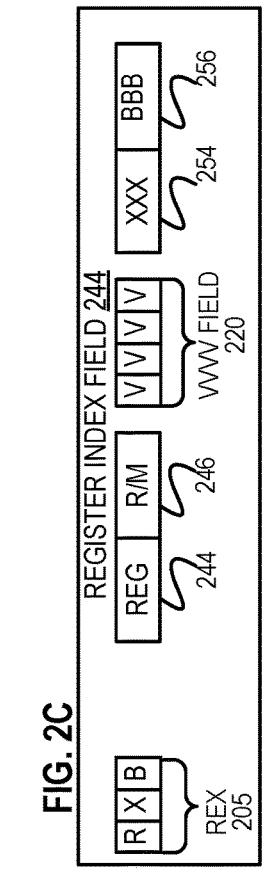
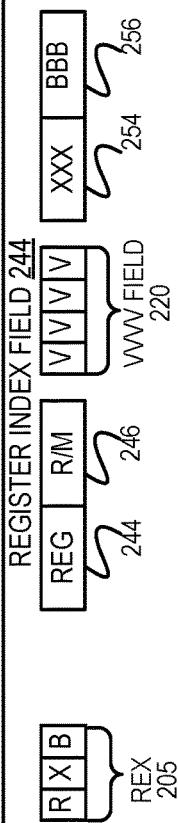
FIG. 2A
FIG. 2C
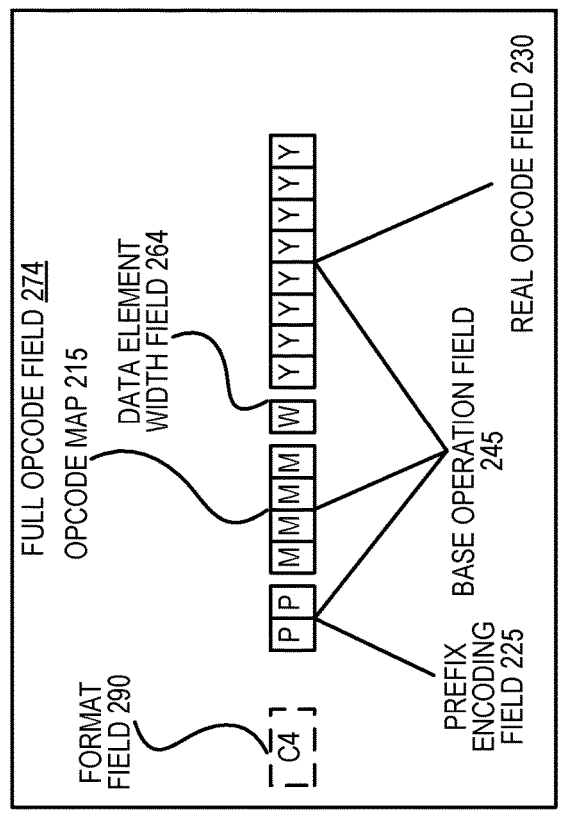
FIG. 2B

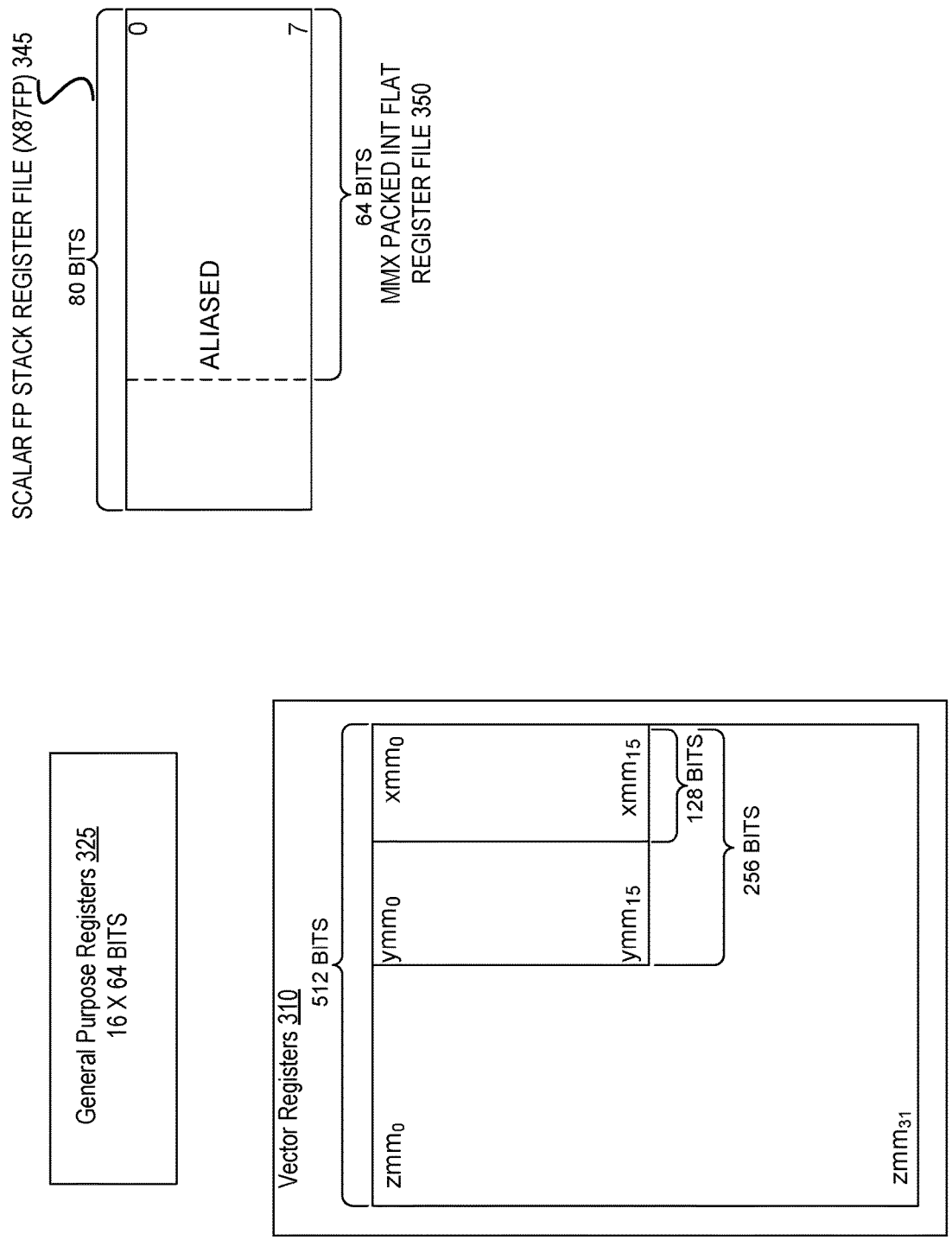

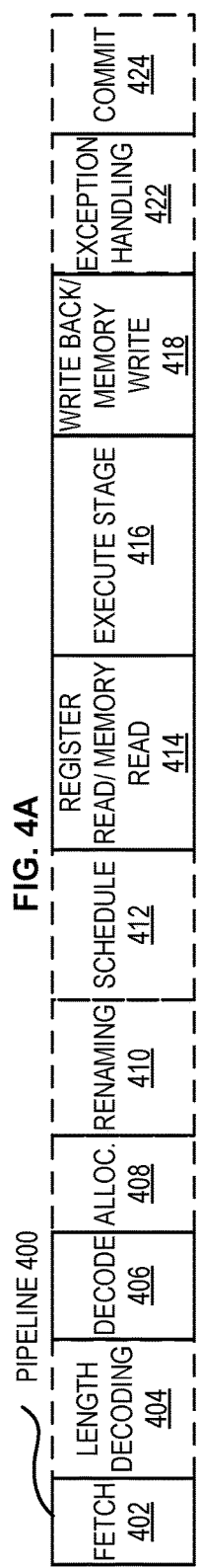
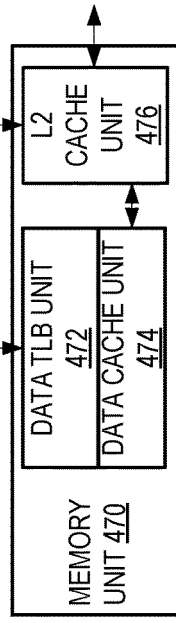
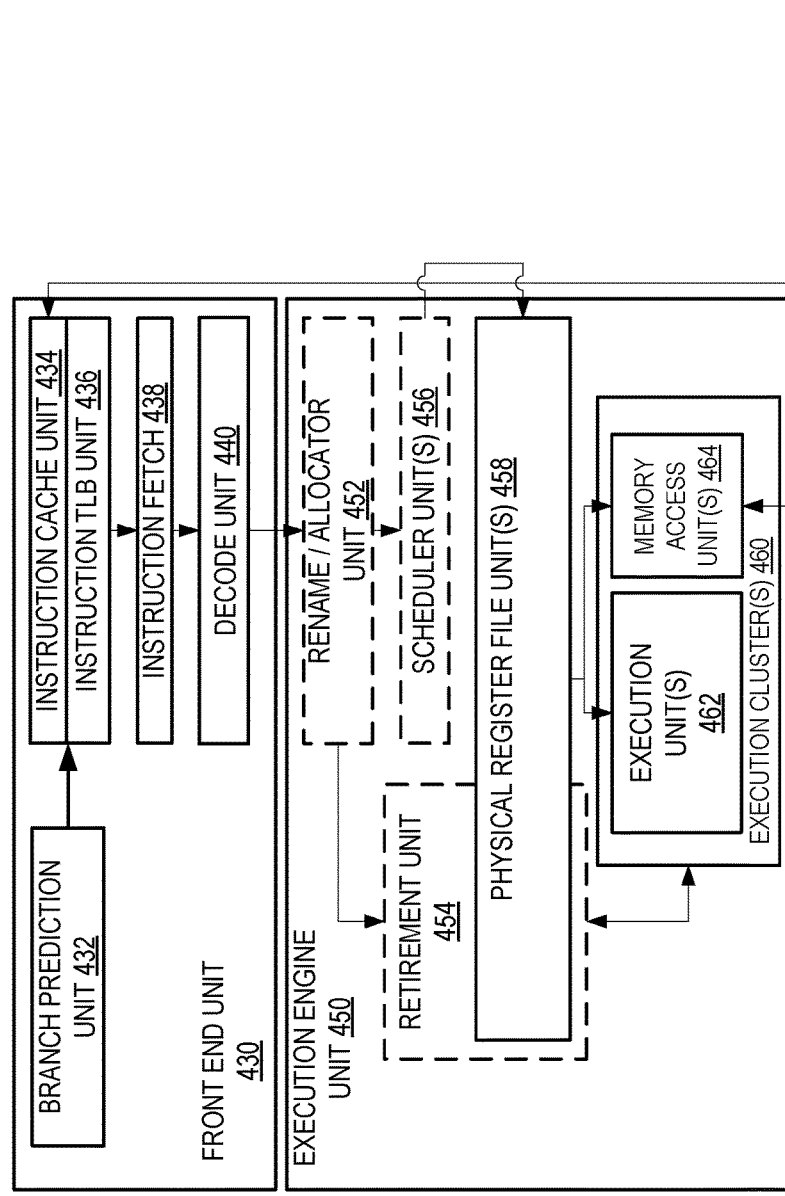
FIG. 4A
FIG. 4B

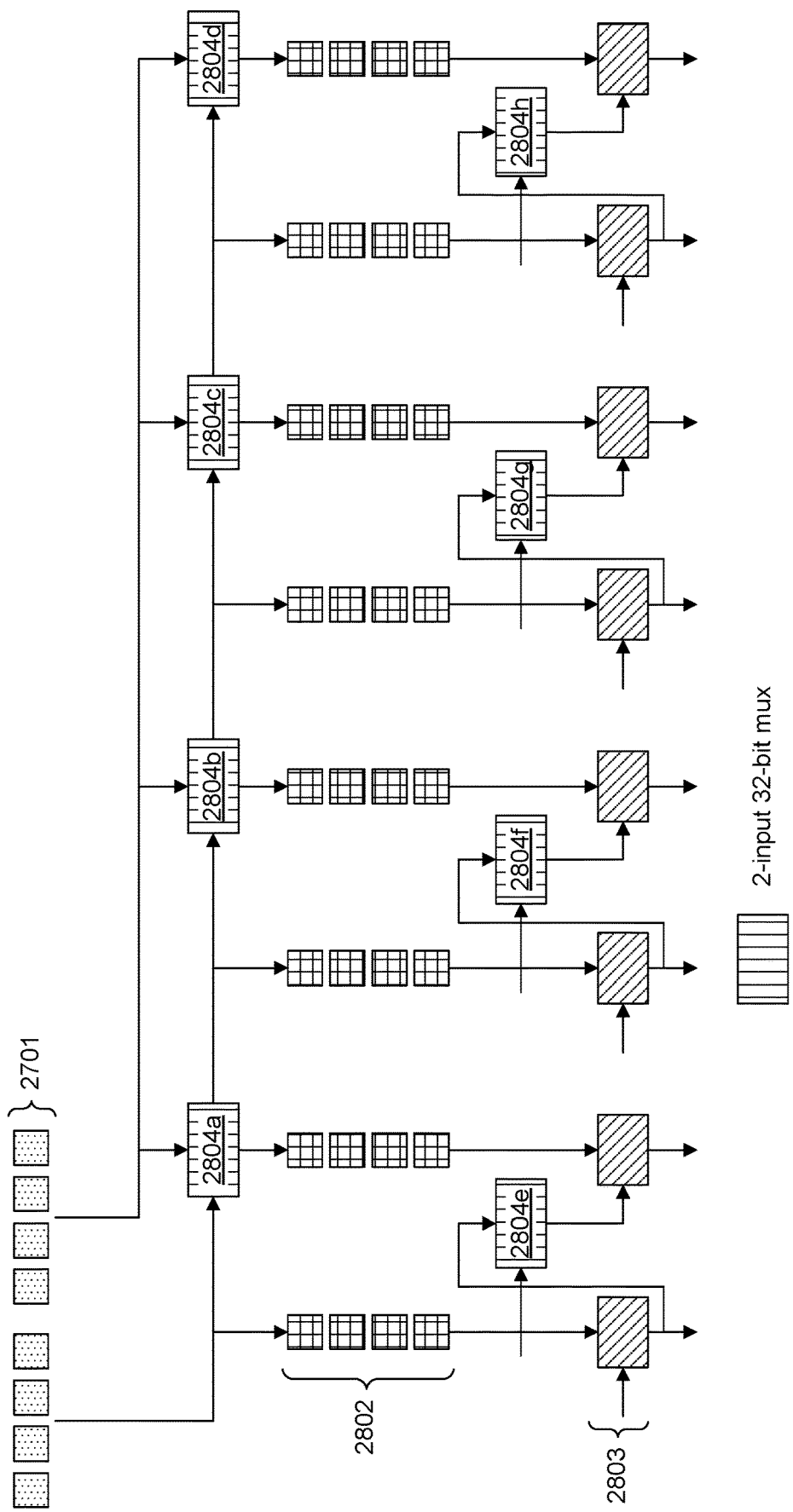

APPARATUS AND METHOD FOR GANG INVARIANT OPERATION OPTIMIZATIONS USING DYNAMIC EVALUATION

BACKGROUND

Field of the Invention

The embodiments of the invention relate generally to the field of computer processors. More particularly, the embodiments relate to an apparatus and method for gang invariant operation optimizations.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention; and FIG. 4A is a block diagram illustrating both an exemplary in-order fetch, decode, retire pipeline and an exemplary register renaming, out-of-order issue/execution pipeline according to embodiments of the invention;

FIG. 4B is a block diagram illustrating both an exemplary embodiment of an in-order fetch, decode, retire core and an exemplary register renaming, out-of-order issue/execution architecture core to be included in a processor according to embodiments of the invention;

FIGS. 26-28 illustrate different arrangements of processing elements;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
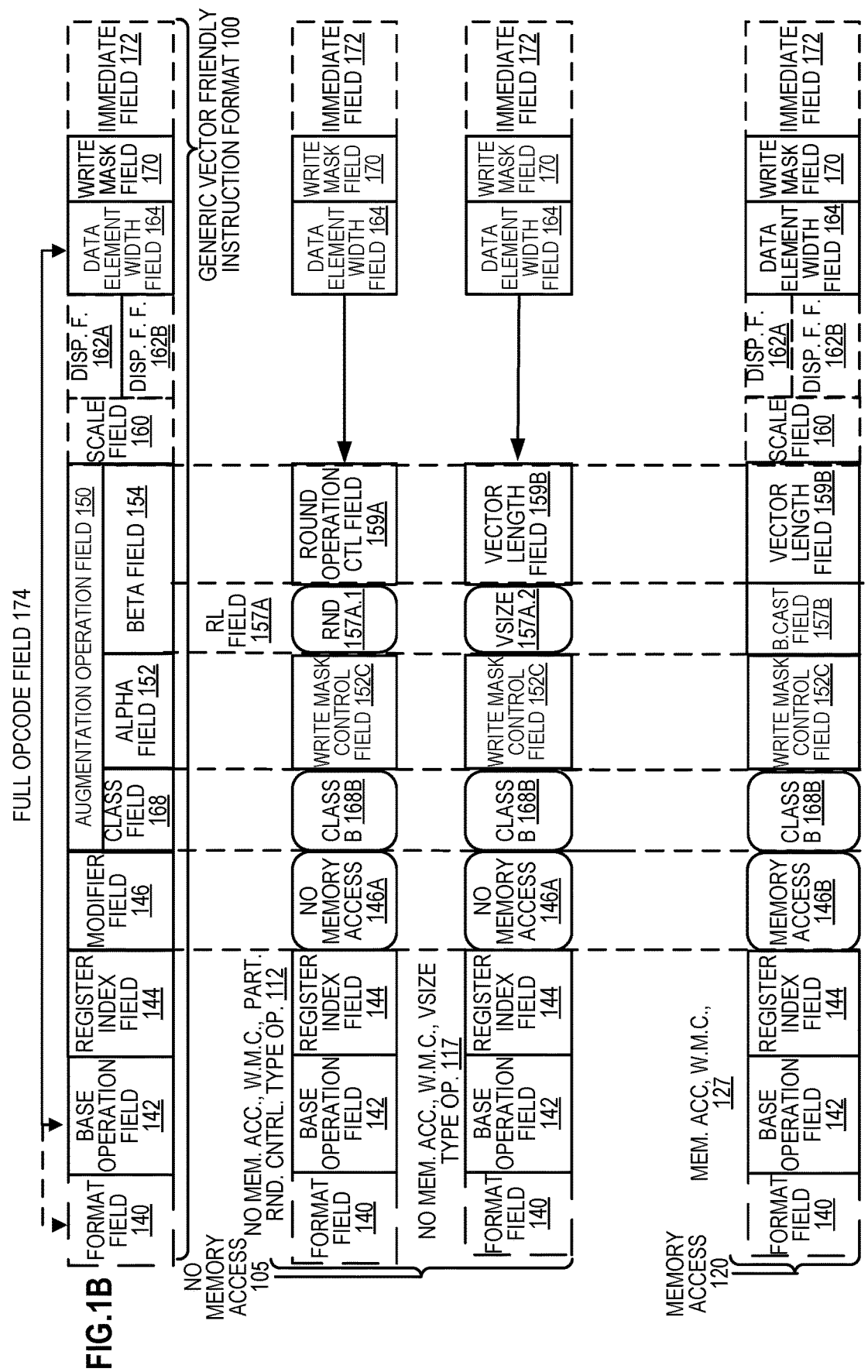

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*$index+base).

Displacement Field 162A—its content is used as part of memory address generation (e.g., for address generation that uses $2^{scale}*$index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
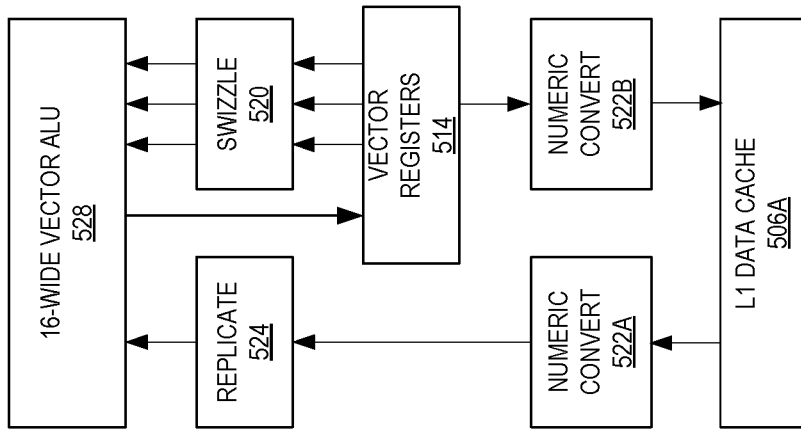
FIG. 5B illustrates an expanded view of part of the processor core in FIG. 5A according to embodiments of the invention.
Figure 5A:
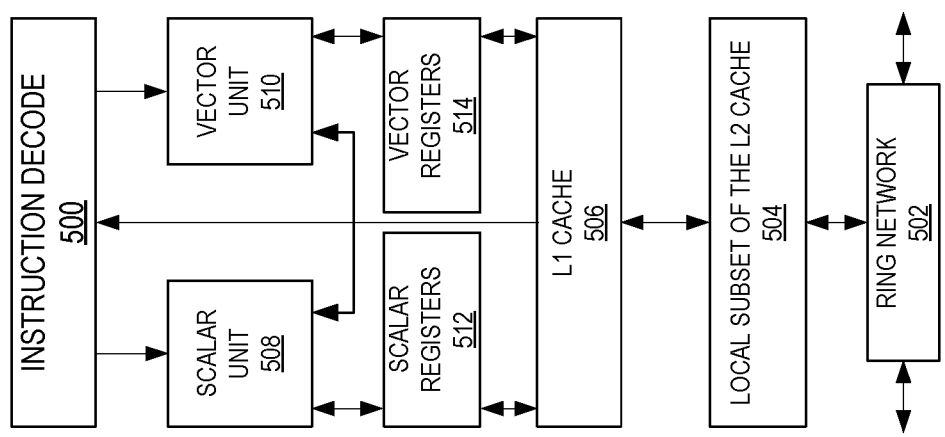
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
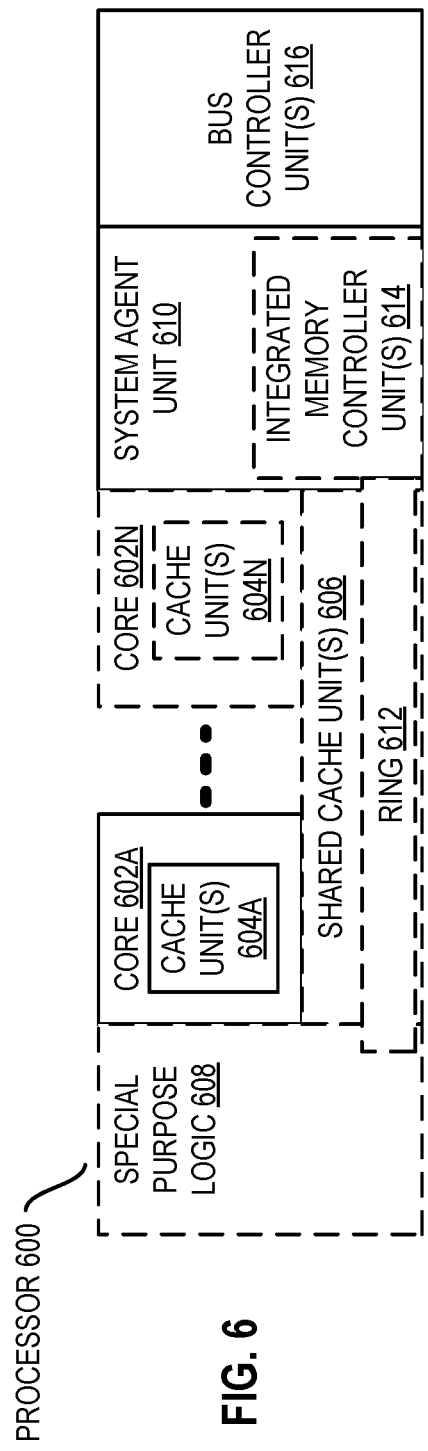
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s)

614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
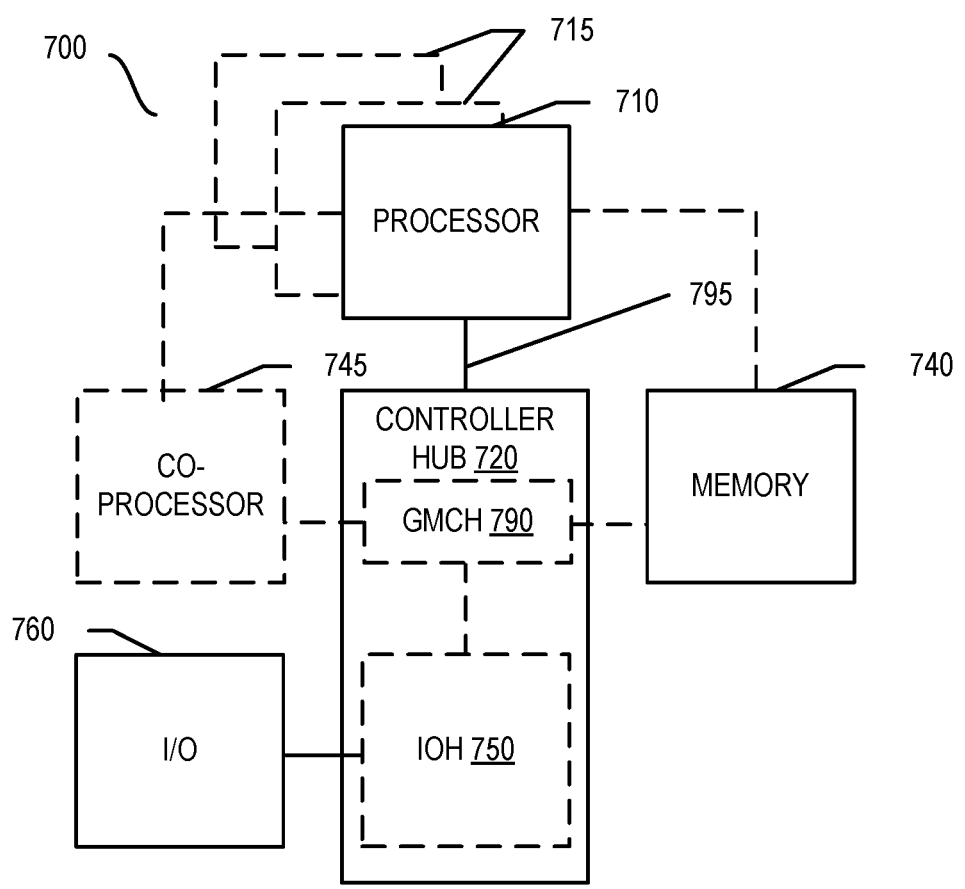
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
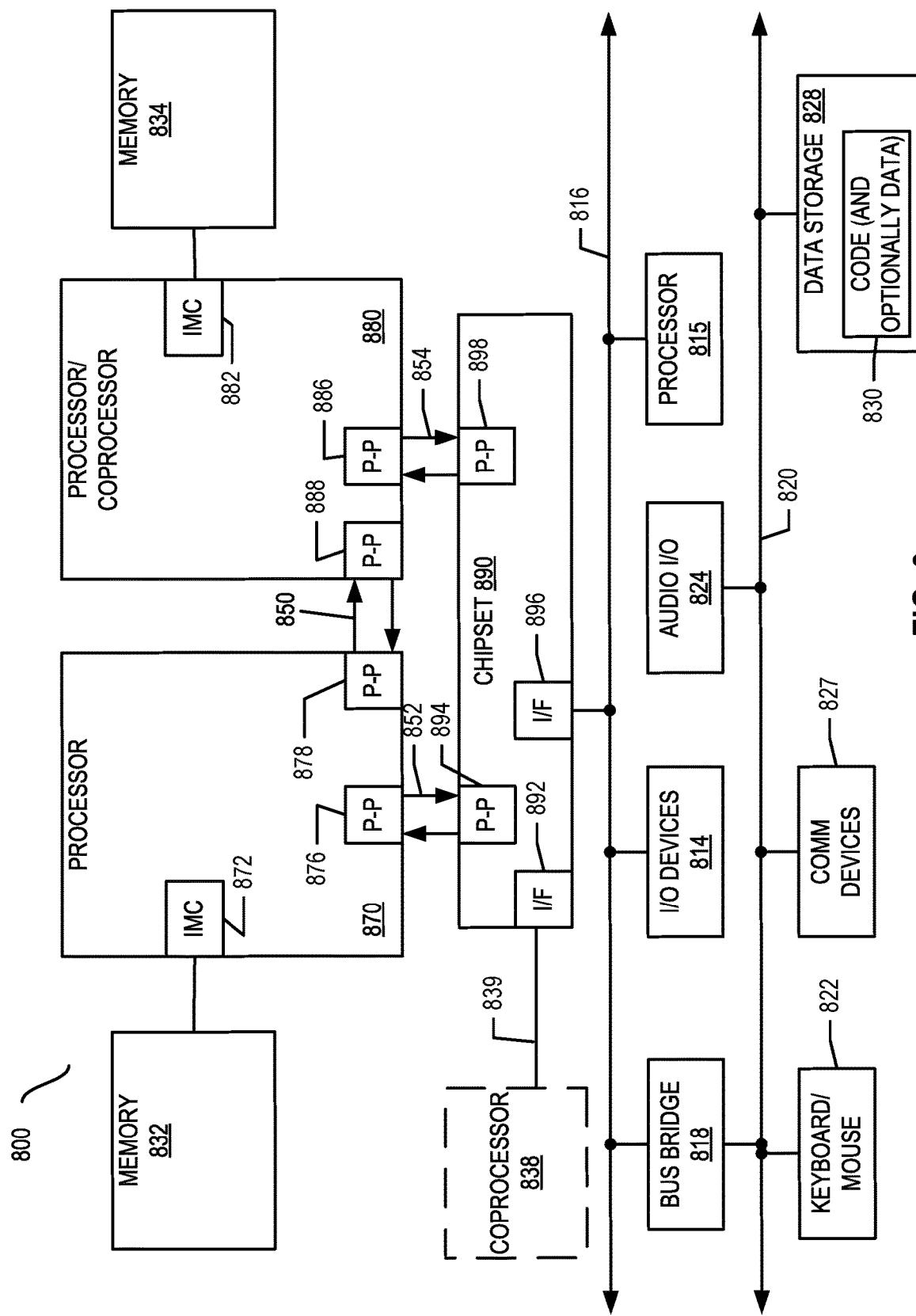
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
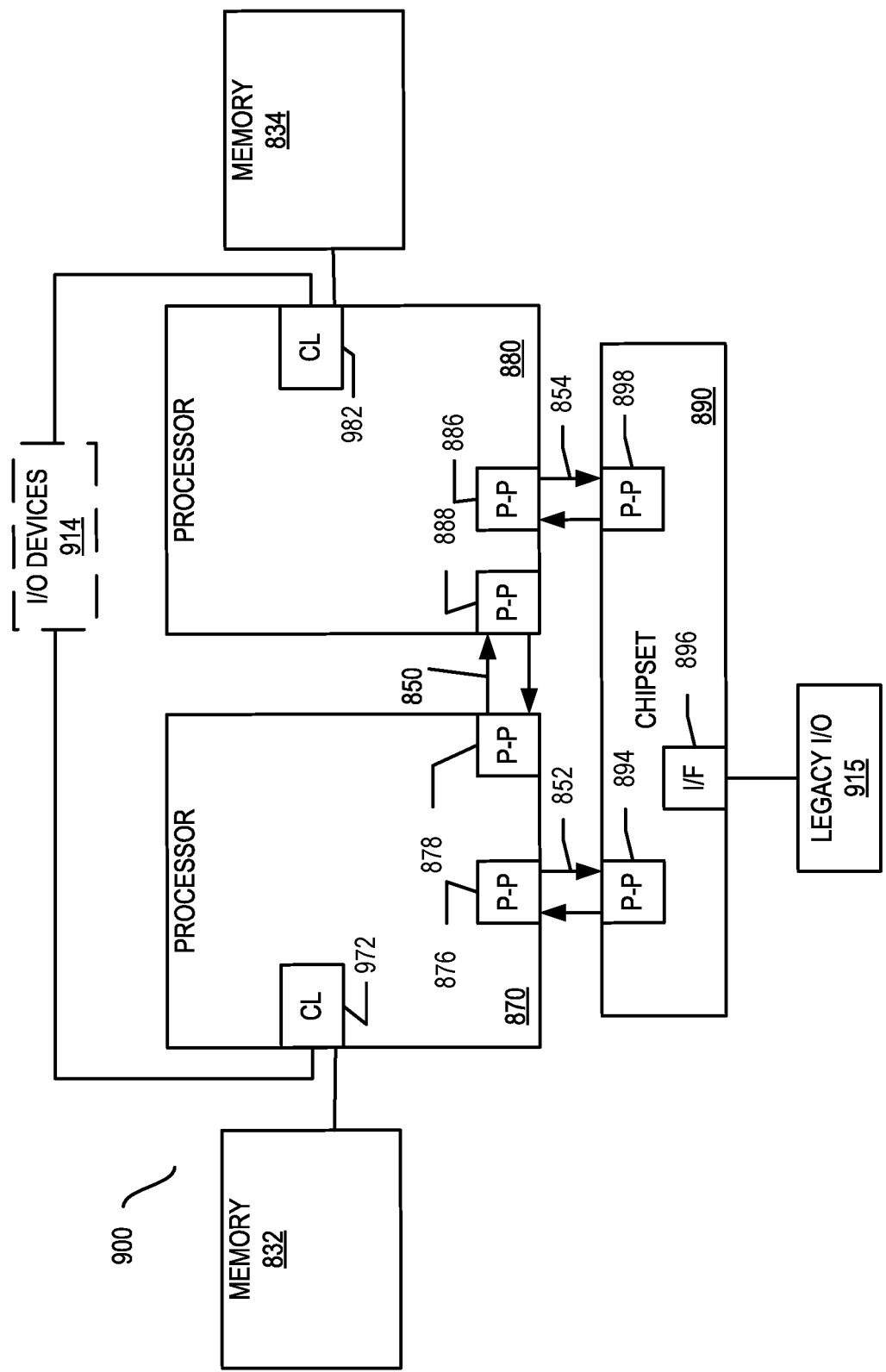
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
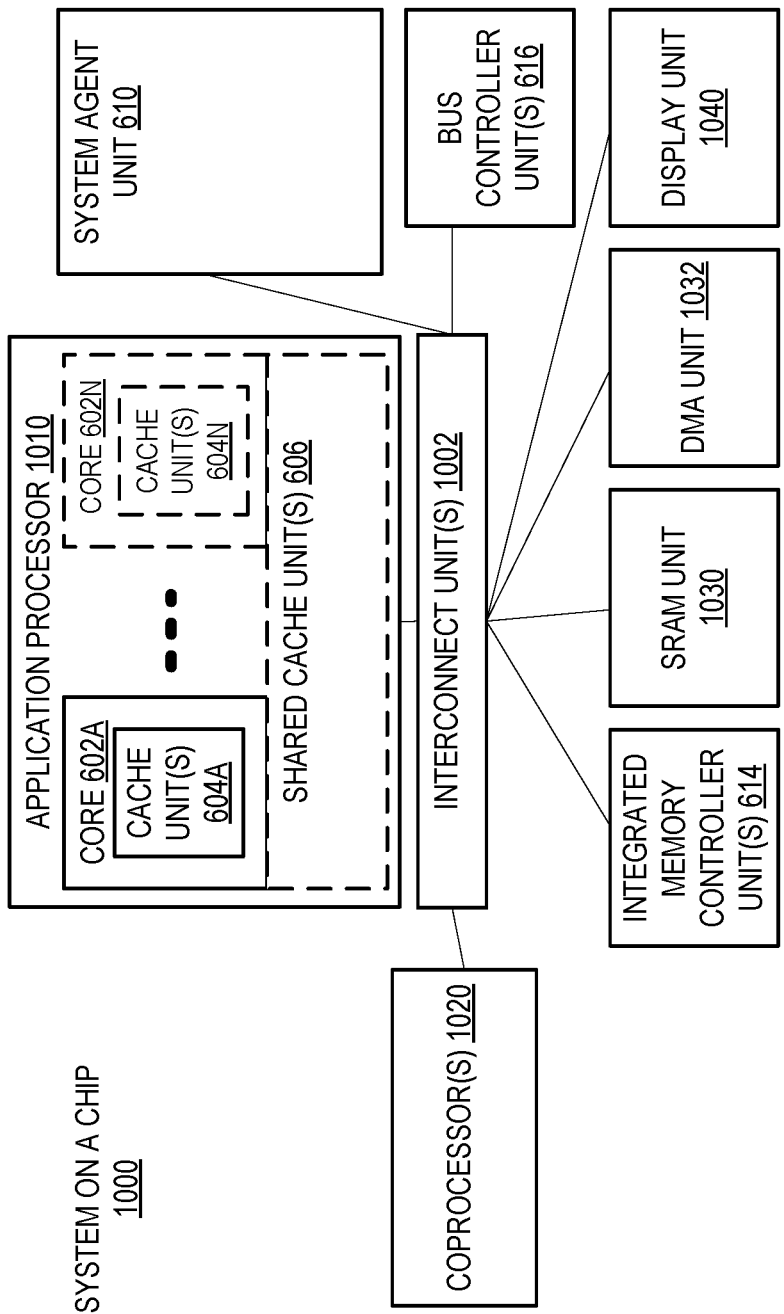
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
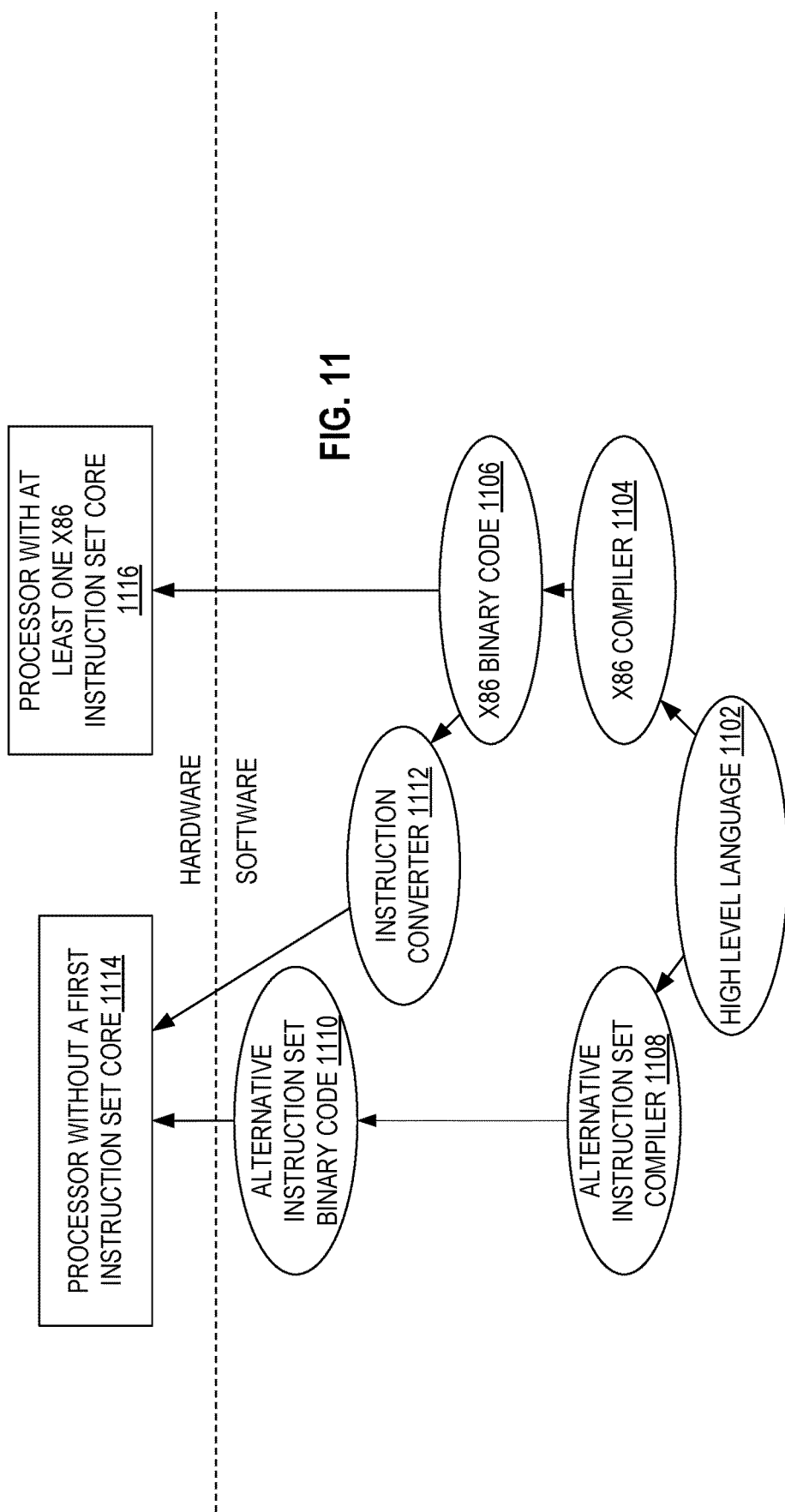
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Architecture and Method for Data Parallel Single Program Multiple Data (SPMD) Execution Instruction set architecture (ISA) extensions for accelerating data parallel workloads require explicit vector word lengths encoded in the machine representation. One embodiment of the invention extends an existing ISA (e.g., such as an x86 ISA) with a scalar microthreaded instruction processing architecture. In particular, a data parallel single program multiple data (SPMD) microarchitecture may be used to provide for scalable execution datapath sizes beyond the limitations of existing instructions, achieving greater instruction execution throughput with reduced energy consumption.

Current CPU architectures have used multiple generations of sub-word single instruction multiple data (SIMD) extensions for accelerating data parallel operations (e.g., including SSE2, SSE4, AVX, and AVX-512 in the x86 architecture). Each successive generation extends the state and instruction set of the CPU, creating legacy performance upside issues and requiring recompilation of old codes.

Graphics processing units (GPUs) have implemented SPMD architectures using hardware divergence stacks to handle divergent control flow cases. The hardware divergence stack is manipulated via explicit instructions and/or control codes as statically implemented by the finalizer agent for existing GPUs.

One embodiment of the invention includes a SPMD data parallel execution engine that uses a scalar microthread abstraction, similar to programming an array of scalar processors with no architected divergence instructions or control codes. As discussed below, these embodiments are particularly suitable for implementation in an existing ISA which includes a predefined Application Binary Interface (ABI).

Figure 12:
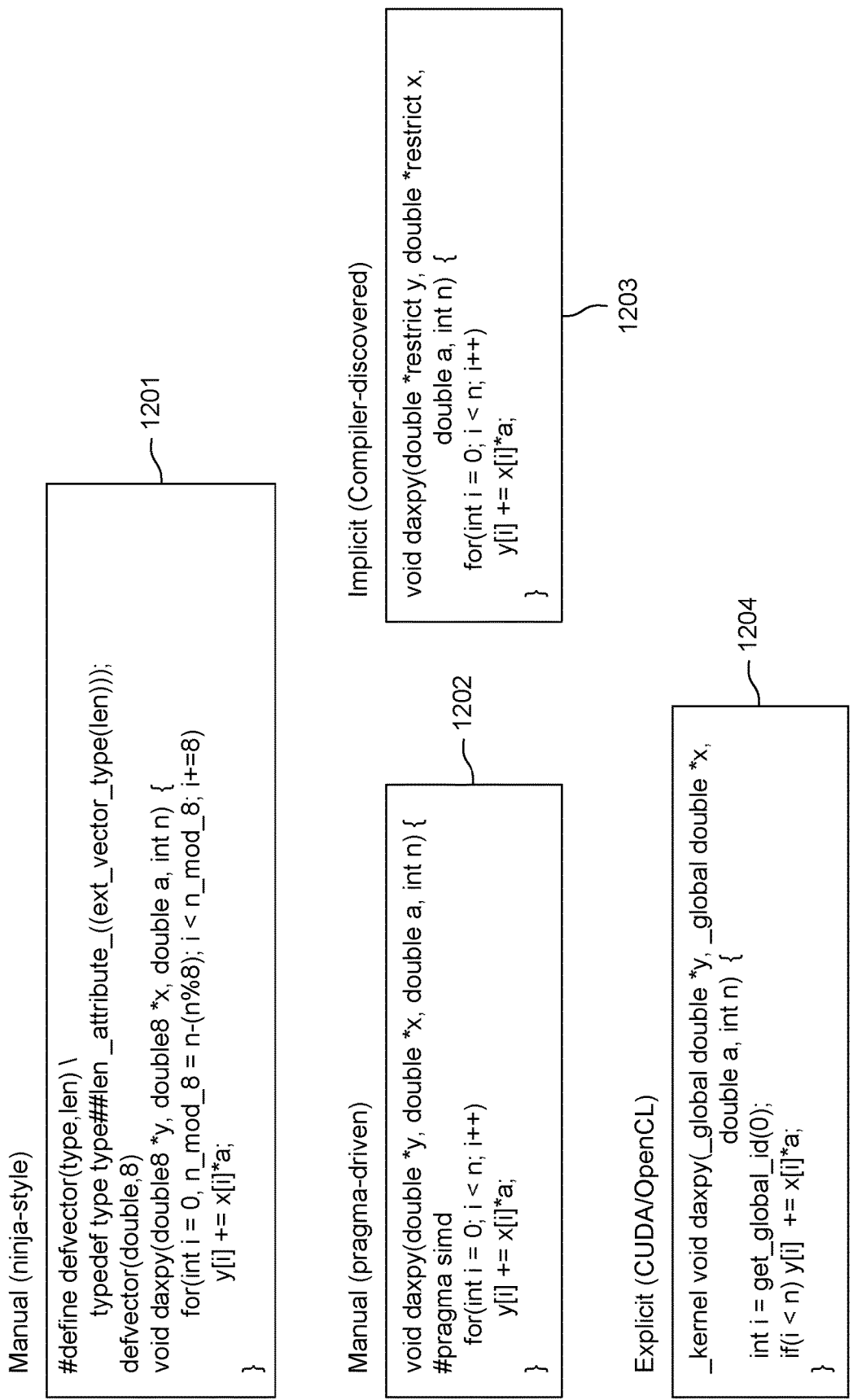
FIG. 12 illustrate examples of different types of code which may be used in combination with embodiments of the invention.

Embodiments described below are agnostic to the programming paradigm used to encode a data-parallel kernel by providing the abstraction of scalar microthreads executing on an efficient vector-style hardware. FIG. 12 illustrates four examples of programming paradigms for a Sparse Matrix-Vector Multiplication with immediate post-dominator reconvergence including two manually coded examples (ninja-style and pragma-driven) 1201-1202, an implicitly coded example (compiler discovered) 1203, and an example with explicit coding (using CUDA/OpenCL in the example).

The embodiments of the invention allow a programmer to develop data-parallel software using a parallel threaded programming model. The resulting threads are then efficiently executed on vector/SIMD style execution hardware. A larger number of instructions executed per clock is achieved with significantly reduced energy per operation while also providing a highly accessible software abstraction.

Figure 13:
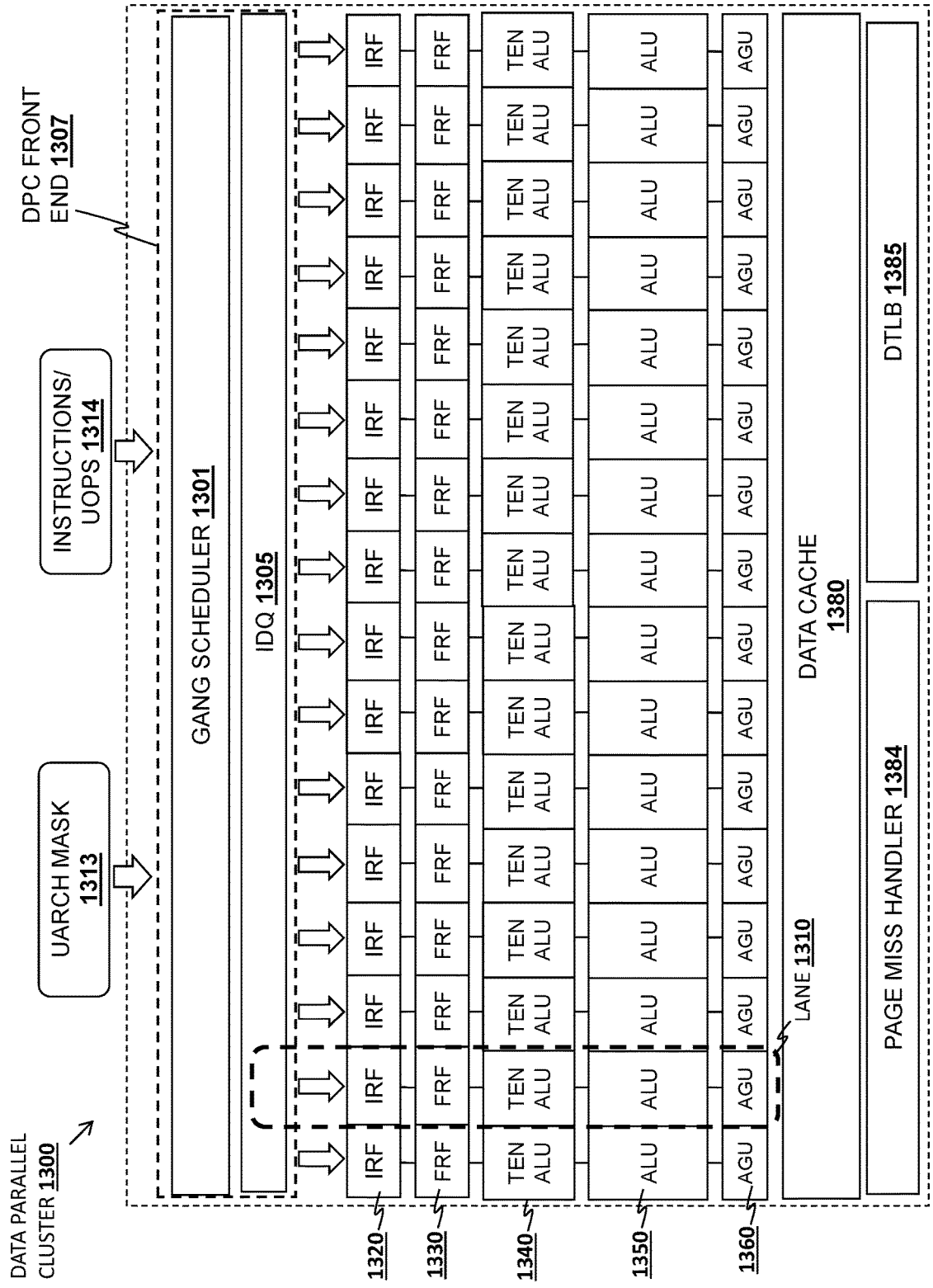
FIG. 13 illustrates one embodiment of a data parallel cluster architecture.

FIG. 13 illustrates one example of a data parallel cluster (DPC) 1300 which may be integrated within a microarchitecture of a processor and/or may be used as an acceleration engine to execute a particular set of instructions uops 1314. In one embodiment, front end circuitry 1307 comprises a gang scheduler 1301 to schedule ganged execution of scalar microthreads within a plurality of scalar lanes such as lane 1310. The number of scalar lanes in the data parallel cluster 1300 can be varied without impacting software. In the illustrated implementation, 16 lanes are shown; however, any number of lanes may be used, depending on the implementation. In one embodiment discussed below, 32 lanes are used.

In one embodiment, the gang scheduler 1301 schedules the same instruction on multiple active lanes. A microarchitectural mask 1313 (e.g., read from a mask register) disables those lanes that are not required to be active. In one embodiment, the gang scheduler 1301 reads the mask values to determine which lanes are to be active for which instructions/uops.

In one embodiment, an Instruction Decode Queue (IDQ) 1305 within the front end 1307 stores microoperations (uops) of decoded macroinstructions which are added to the IDQ in program order (e.g., in a FIFO implementation). As mentioned, the IDQ 1305 may be partitioned for multiple gangs of operation.

Various arrangements for coupling the DPC 1300 to a host processor are described below. In an implementation in which instructions are decoded by a host processor, the DPC 1300 does not include a decoder to generate the uops prior to execution on the lanes. Alternatively, in an implementation in which macroinstructions are forwarded from a host processor or read directly from memory by the DPC, the front end of the DPC (e.g., the gang scheduler 1301) includes a decoder to generate sequences of uops which are then stored in the IDQ prior to execution.

Each lane in the data parallel cluster 1300 is coupled to the IDQ 1305 from which it receives uops to be executed in parallel. In one embodiment, each lane includes an integer register file (IRF) 1320 and a floating-point register file (FRF) 1330 for storing integer and floating point operands, respectively. Each lane also includes a tensor arithmetic logic unit (ALU) 1340 to perform adaptive lane-wise tensor processing (as described in greater detail below), a per-microthread scalar ALU 1350, and a per-microthread, independent address generation unit 1360. In one embodiment, the independent AGU 1360 provides high throughput address generation for codes with gather/scatter memory access patterns. Other independent functional units may also be allocated to each lane. For example, in one embodiment, each lane is equipped with an independent Jump Execution Unit (JEU) which allows the lanes to diverge and interact with the microarchitectural mask to provide the illusion of independent threads.

The illustrated architecture also includes a shared data cache 1380 to store local copies of data for each of the lanes. In one embodiment, if the data parallel cluster 1300 is integrated in a chip or system with a host processor, it participates in the cache coherency protocol implemented by the host processor. A page miss handler 1384 performs page walk operations to translate virtual addresses to physical (system memory) addresses and a data translation lookaside buffer (DTLB) 1385 caches the virtual-to-physical translations.

Figure 14A:
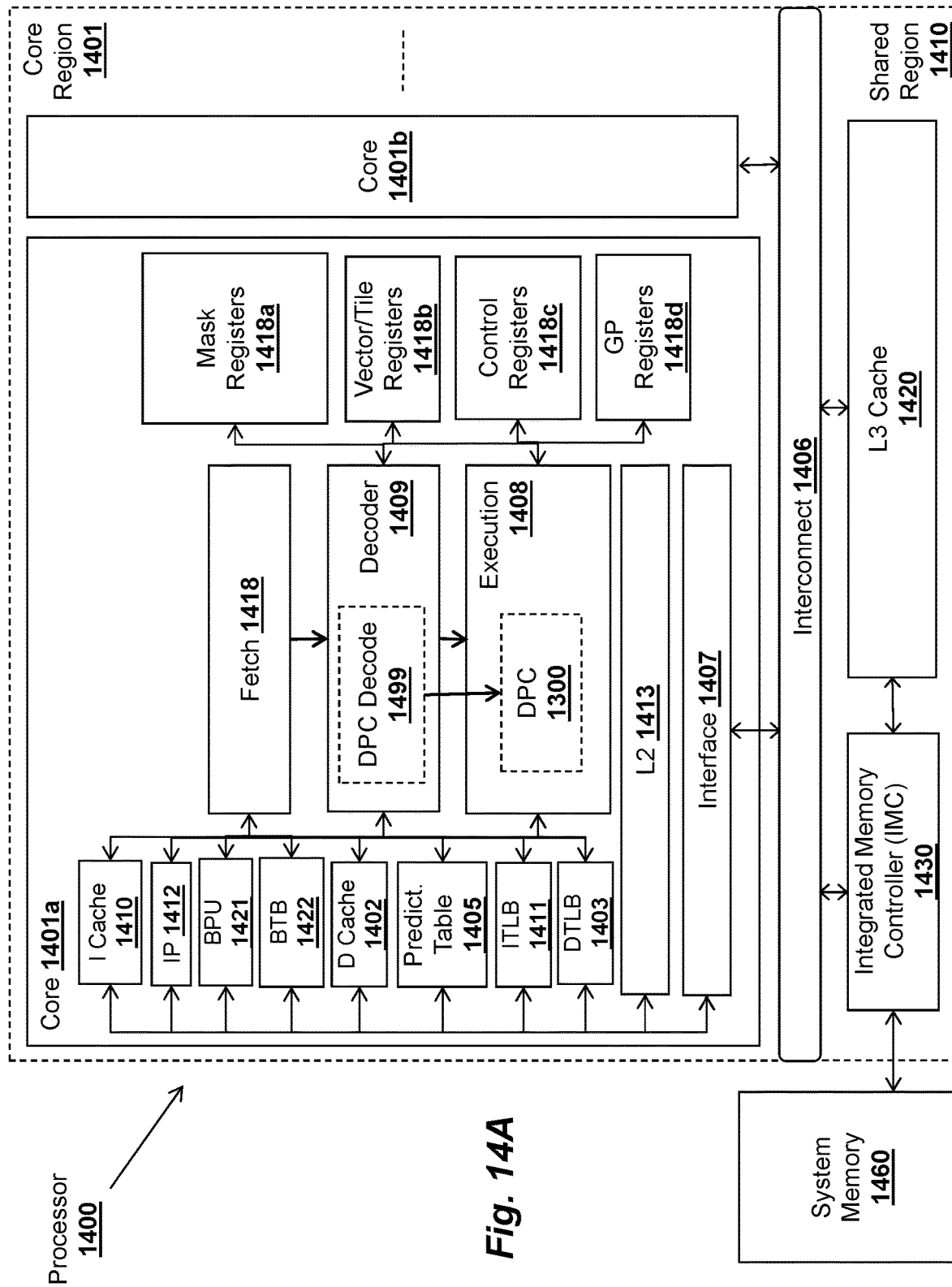
FIGS. 14A-C illustrate different implementations for integrating a DPC with a processor.
Figure 14B:
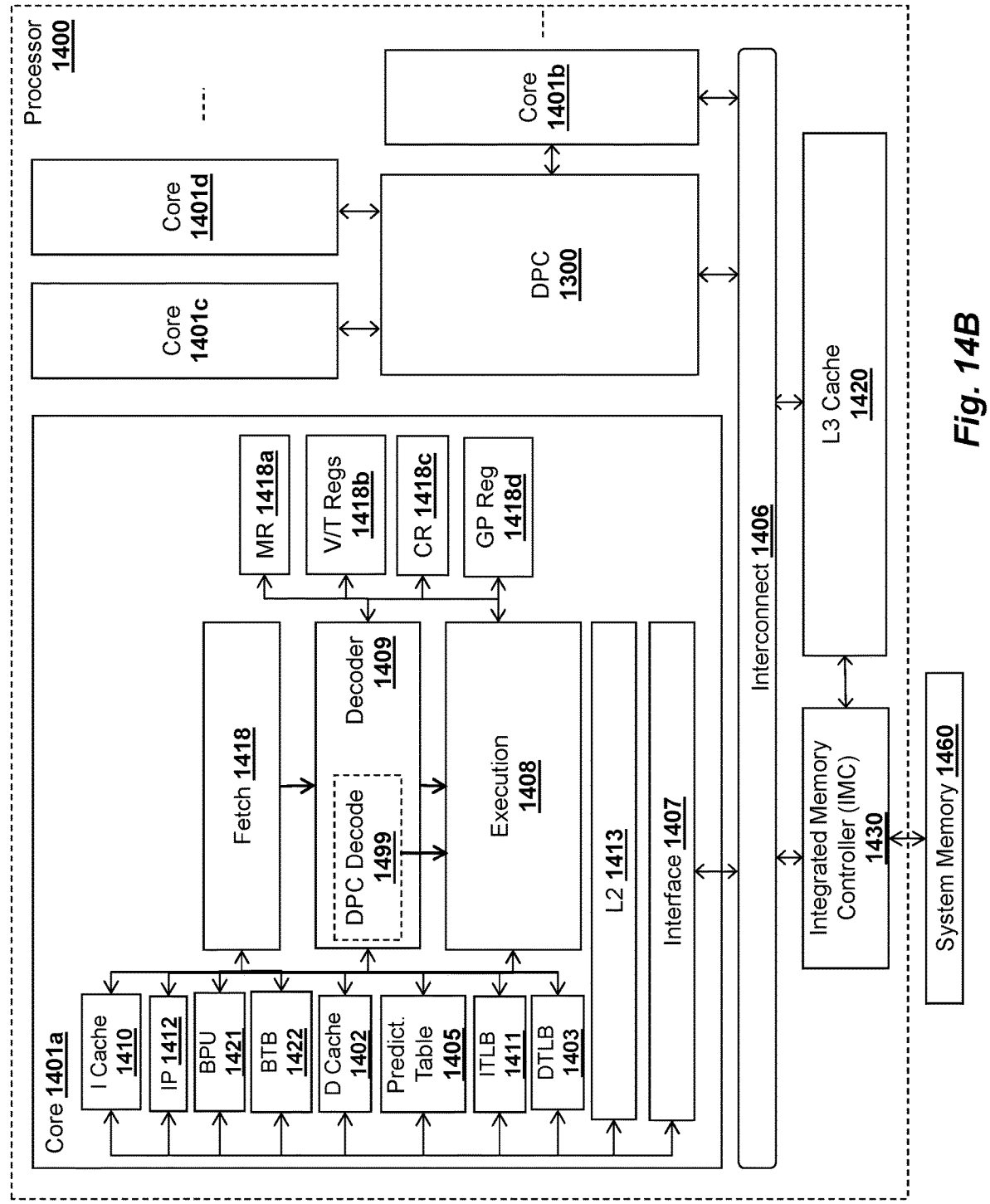
Figure 14C:
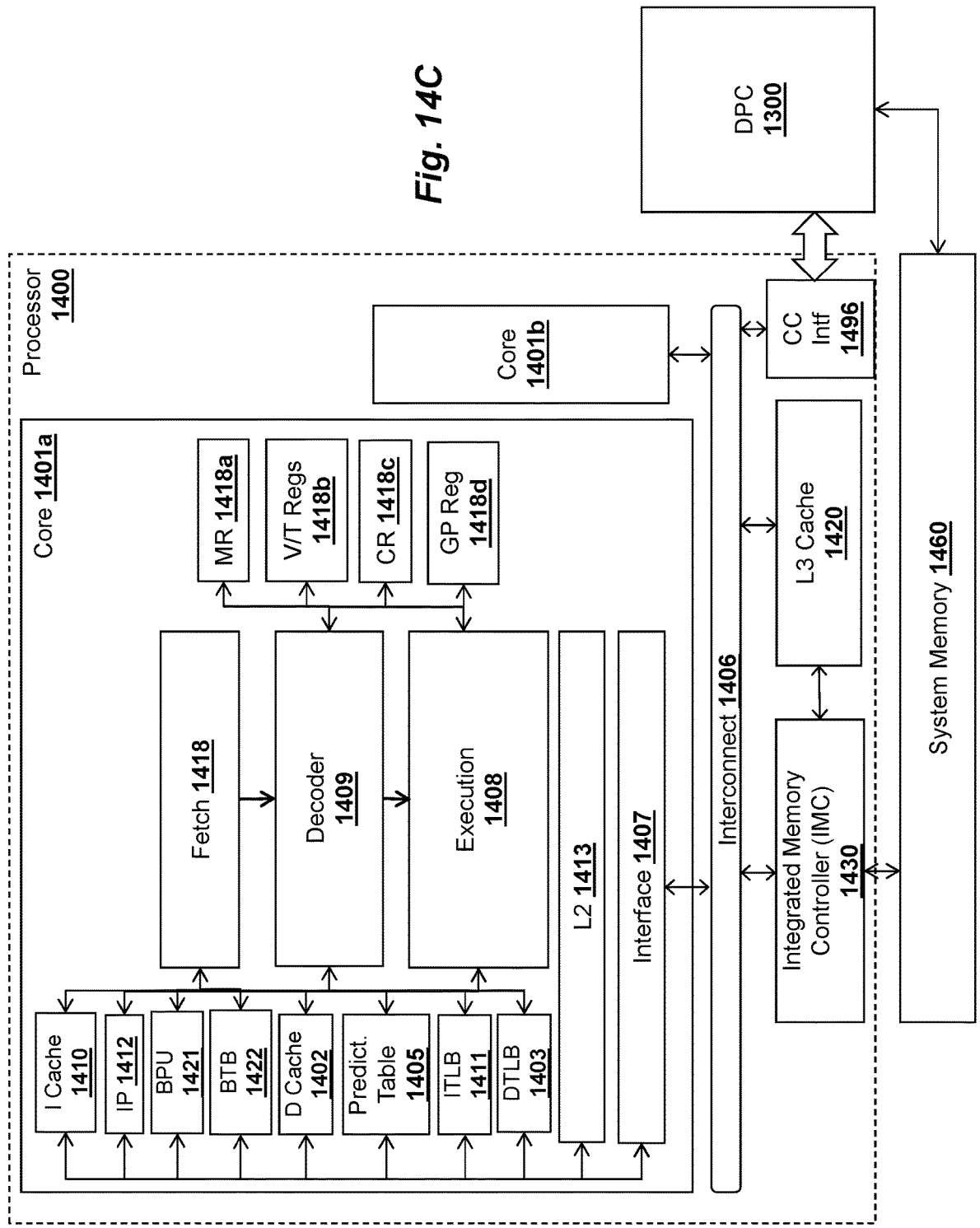

As illustrated in FIGS. 14A-C, the data parallel cluster 1300 may be integrated in a computer system in a variety of ways. In FIG. 14A, the DPC 1300 is integral to a core 1401*a*; in FIG. 14B, the DPC 1300 is on the same chip and shared by a plurality of cores; and in FIG. 14C, the DPC 1300 is on a different chip (but potentially in the same package) as the cores 1401*a-b*.

Turning first to FIG. 14A, The illustrated architectures include a core region 1401 and a shared, or "uncore" region 1410. The shared region 1410 includes data structures and circuitry shared by all or a subset of the cores 1401*a-b*. In the illustrated embodiment, the plurality of cores 1401*a-b* are simultaneous multithreaded cores capable of concurrently executing multiple instruction streams or threads. Although only two cores 1401*a-b* are illustrated in FIG. 14A for simplicity, it will be appreciated that the core region 1401 may include any number of cores, each of which may include the same architecture as shown for Core 1401*a*. Another embodiment includes heterogeneous cores which may have different instruction set architectures and/or different power and performance characteristics (e.g., low power cores combined with high power/performance cores).

The various components illustrated in FIG. 14A may be implemented in the same manner as corresponding components in FIGS. 1-11. For example, the core 1401*a* may execute the tile gather and scatter instructions using one of the instruction formats in FIGS. 1*a-b* and 2*a-c*, and/or using the register architecture illustrated in FIG. 3. In addition, the cores 1401*a* may include the components of core 490 shown in FIG. 4*b*, and may include any of the other processor/core components described herein (e.g., FIGS. 5*a-b*, FIG. 6, etc.).

Each of the cores 1401*a-b* include instruction pipeline components for performing simultaneous execution of instruction streams including instruction fetch circuitry 1418 which fetches instructions from system memory 1460 or the L1 instruction cache 1410 and decoder 1409 to decode the instructions. Execution circuitry 1408 executes the decoded instructions to perform the underlying operations, as specified by the instruction operands, opcodes, and any immediate values.

In the illustrated embodiment, the decoder 1409 includes DPC instruction decode circuitry 1499 to decode certain instructions into cops for execution by the DPC 1300 (integrated within the execution circuitry 1408 in this embodiment). Although illustrated as separate blocks in FIG. 14A, the DPC decode circuitry 1499 and DPC 1300 may be distributed as functional circuits spread throughout the decoder 1409 and execution circuitry 1408.

In an alternate embodiment, illustrated in FIG. 14B, the DPC 1300 is tightly coupled to the processor cores 1401*a-b* over a cache coherent interconnect (e.g., in which the data cache 1380 participates in the same set of cache coherent memory transactions as the cores). The DPC 1300 is configured as a peer of the cores, participating in the same set of cache coherent memory transactions as the cores. In this embodiment, the decoders 1409 decode the instructions which are to be executed DPC 1300 and the resulting microoperations are passed for execution to the DPC 1300 over the interconnect 1406. In another embodiment, the DPC 1300 includes its own fetch and decode circuitry to fetch and decode instructions, respectively, from a particular region of system memory 1460. In either implementation, after executing the instructions, the matrix accelerator 1491 may store the results to the region in system memory 1460 to be accessed by the cores 1401*a-b*.

FIG. 14C illustrates another embodiment in which the DPC is on a different chip from the cores 1401*a-b* but coupled to the cores over a cache coherent interface 1496. In one embodiment, the cache coherent interface 1496 uses packet-based transactions to ensure that the data cache 1380 of the DPC 1300 is coherent with the cache hierarchy of the cores 1401*a-c*.

Also illustrated in FIGS. 14A-C are general purpose registers (GPRs) 1418*d*, a set of vector/tile registers 1418*b*, a set of mask registers 1418*a* (which may include tile mask registers as described below), and a set of control registers 1418*c*. In one embodiment, multiple vector data elements are packed into each vector register which may have a 512 bit width for storing two 256 bit values, four 128 bit values, eight 64 bit values, sixteen 32 bit values, etc. Groups of vector registers may be combined to form the tile registers described herein. Alternatively, a separate set of 2-D tile registers may be used. However, the underlying principles of the invention are not limited to any particular size/type of vector/tile data. In one embodiment, the mask registers 1418*a* include eight 64-bit operand mask registers used for performing bit masking operations on the values stored in the vector registers 1418*b* (e.g., implemented as mask registers k0-k7 described above). However, the underlying principles of the invention are not limited to any particular mask register size/type. A set of one or more mask registers 1418*a* may implement the tile mask registers described herein.

The control registers 1418*c* store various types of control bits or "flags" which are used by executing instructions to determine the current state of the processor core 1401*a*. By way of example, and not limitation, in an x86 architecture, the control registers include the EFLAGS register.

An interconnect 1406 such as an in-die interconnect (IDI) or memory fabric implementing an IDI/coherence protocol communicatively couples the cores 1401*a-b* (and potentially a the DPC 1300) to one another and to various components within the shared region 1410. For example, the interconnect 1406 couples core 1401*a* via interface 1407 to a level 3 (L3) cache and an integrated memory controller 1430. In addition, the interconnect 1406 may be used to couple the cores 1401*a-b* to the DPC 1300.

The integrated memory controller 1430 provides access to a system memory 1460. One or more input/output (I/O) circuits (not shown) such as PCI express circuitry may also be included in the shared region 1410.

An instruction pointer register 1412 stores an instruction pointer address identifying the next instruction to be fetched, decoded, and executed. Instructions may be fetched or prefetched from system memory 1460 and/or one or more shared cache levels such as an L2 cache 1413, the shared L3 cache 1420, or the L1 instruction cache 1410. In addition, an L1 data cache 1402 stores data loaded from system memory 1460 and/or retrieved from one of the other cache levels 1413, 1420 which cache both instructions and data. An instruction TLB (ITLB) 1411 stores virtual address to physical address translations for the instructions fetched by the fetch circuitry 1418 and a data TLB (DTLB) 1403 stores virtual-to-physical address translations for the data processed by the decode circuitry 1409 and execution circuitry 1408.

A branch prediction unit 1421 speculatively predicts (e.g., using prediction table 1405) instruction branch addresses and branch target buffers (BTBs) 1422 for storing branch addresses and target addresses. In one embodiment, a branch history table (not shown) or other data structure is maintained and updated for each branch prediction/misprediction and is used by the branch prediction unit 1402 to make subsequent branch predictions).

Note that FIGS. 14A-C are not intended to provide a comprehensive view of all circuitry and interconnects employed within a processor. Rather, components which are not pertinent to the embodiments of the invention are not shown. Conversely, some components are shown merely for the purpose of providing an example architecture in which embodiments of the invention may be implemented.

Returning to FIG. 13, the processing cluster 1300 is arranged into a plurality of lanes 1310 that encapsulate execution resources (e.g., an IRF 1320, an FRF 1330, a tensor ALU 1340, an ALU 1350, and an AGU 1360) for several microthreads. Multiple threads share a given lane's execution resources in order to tolerate pipeline and memory latency. The per-microthread state for one implementation is a subset of a modern processor state.

Figure 15:
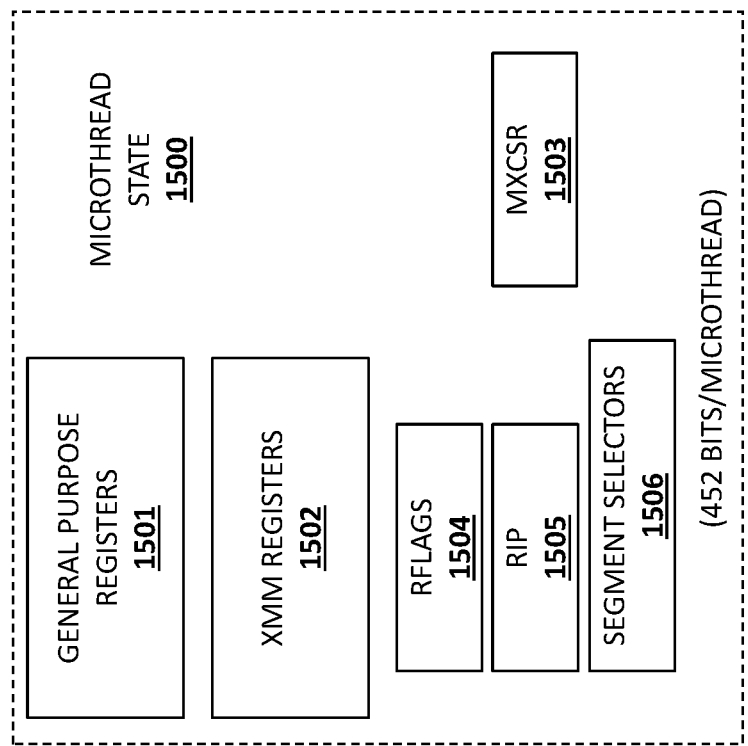
FIG. 15 illustrates an example of a microthread state.
Figure 16A:
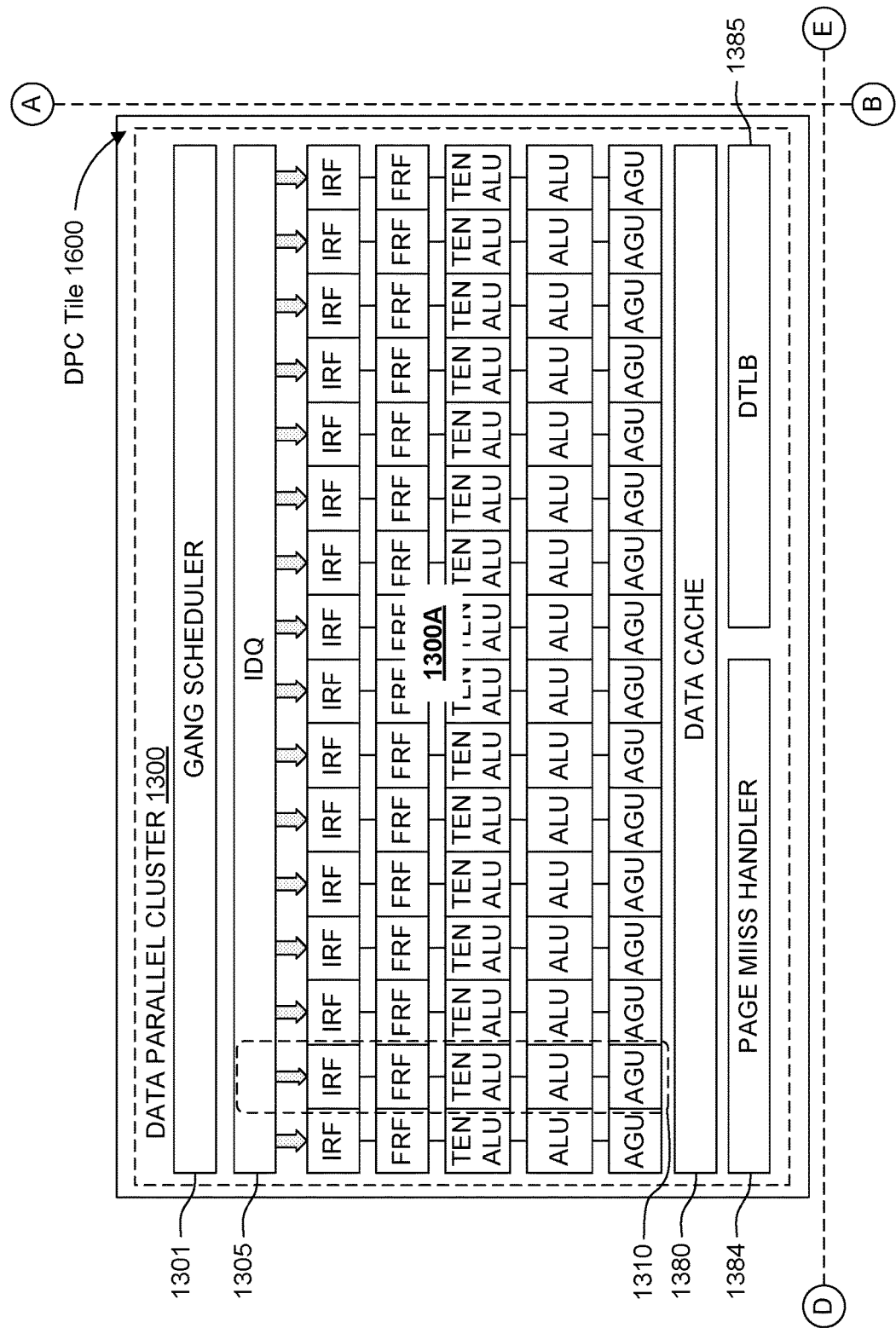
FIG. 16A-D illustrate one embodiment of a DPC tile.
Figure 16B:
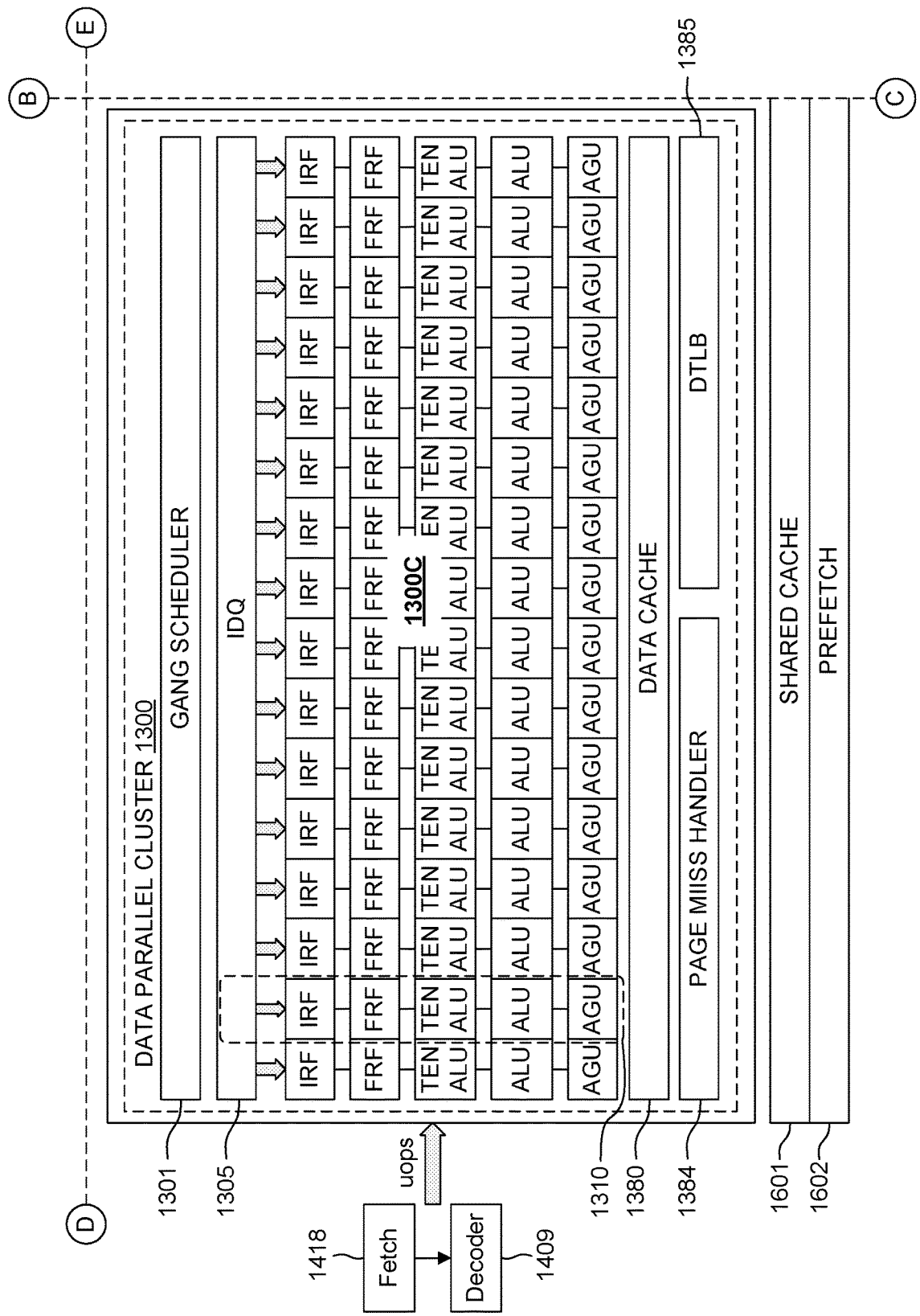
Figure 16C:
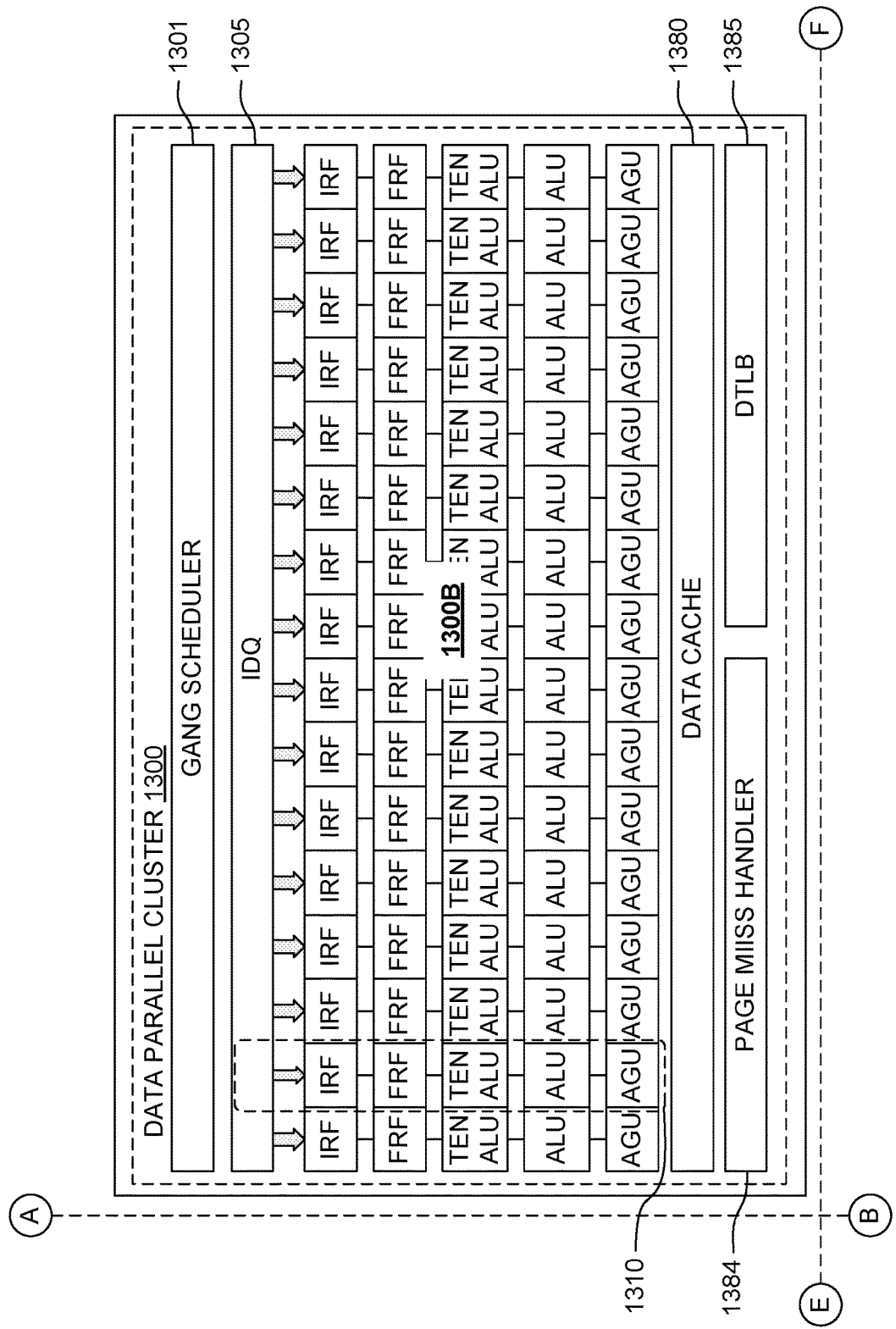
Figure 16D:
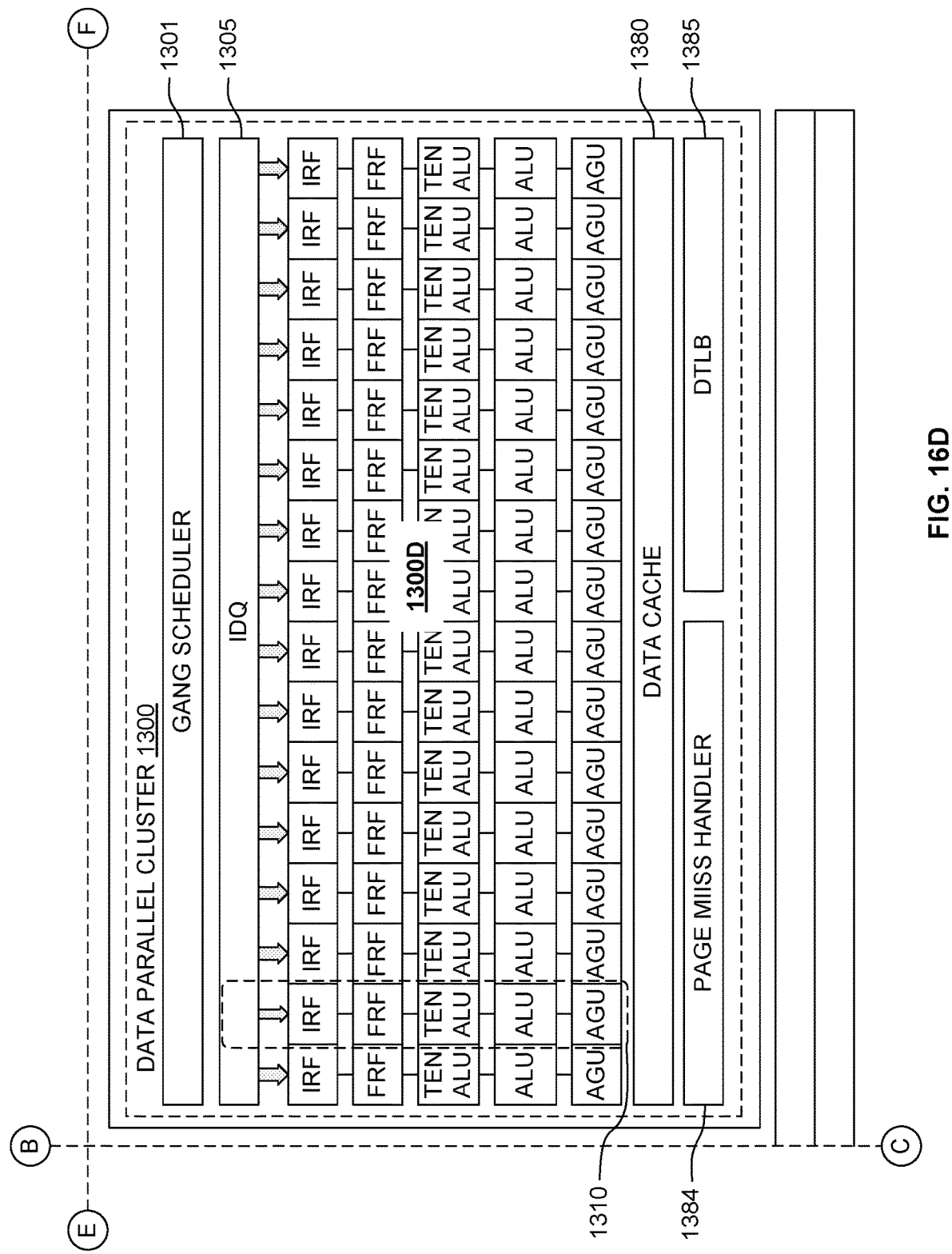

FIG. 15 illustrates one example of a microthread state 1500 which is a subset of a scalar x86 state. The microthread state 1500 includes state from general purpose registers 1501 (e.g., sixteen 64-bit registers), XMM registers 1502 (e.g., thirty-two 64-bit registers), an RFLAGS register 1504, an instruction pointer register 1505, segment selectors 1506, and the MXCSR register 1503. Using a subset of a scalar x86 is convenient for programmers, is software compatible with existing x86 codes, and requires minimal changes to current compilers and software toolchains. The lanes of this embodiment execute scalar, user-level instructions. Of course, the underlying principles of the invention are not limited to this particular arrangement.

In one embodiment, illustrated in FIG. 16A-D, multiple data parallel clusters 1300A-D are collocated into a larger unit of scaling referred to as a "DPC tile" 1600. The various data parallel clusters 1300A-D may be coupled to one another over a high speed interconnect of fabric. The DPC tile 1600 may be integrated within a processor or computer system using any of the microarchitectural implementations described above with respect to the single DPC 1300 in FIGS. 14A-C (i.e., DPC Tile 1600 may be substituted for the DPC 1300 in these figures).

The DPC tile 1600 includes a shared cache 1601 and relies on the existing fetch 1418 and decoder 1409 of one or more cores. A prefetcher 1602 prefetches data from system memory and/or the cache hierarchy in anticipation of cops executed on the data parallel clusters 1300A-D. Although not illustrated, the shared cache 1601 may be coupled between the data parallel clusters 1300A-D and each DPC 1300A-D may be coupled to the on-chip interconnection network (e.g., IDI).

Sharing the execution resources of a processor across a whole cluster amortizes the relatively complex decode process performed by decoder 1409. One embodiment of the invention can support hundreds of microthreads executing instructions using a tiny fraction of the fetch 1418 and decoder 1409 resources of a conventional processor design.

Figure 17:
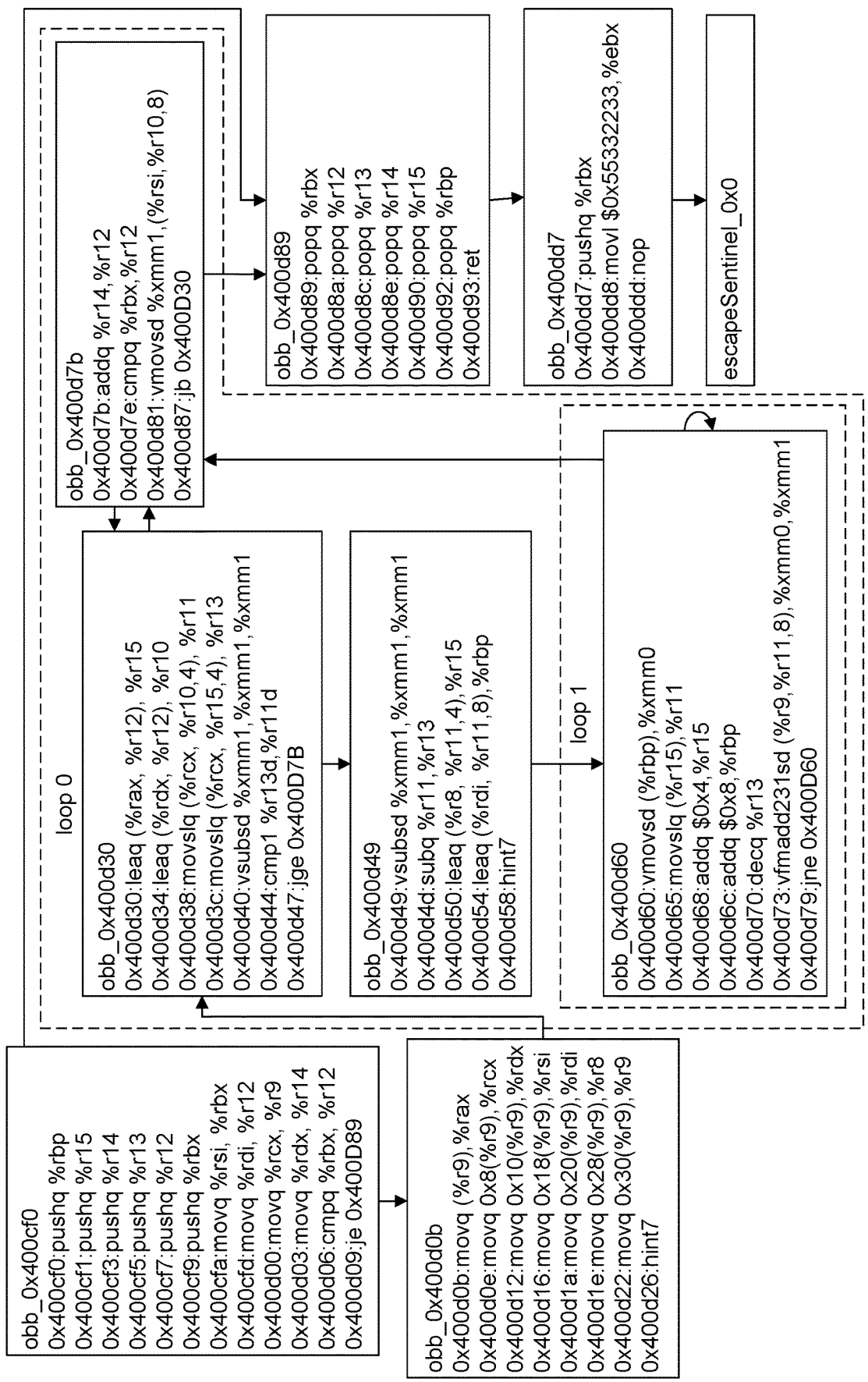
FIG. 17 illustrates an example code sequence which may be processed on one embodiment of the invention.

To highlight certain embodiments of the invention, FIG. 17 illustrates sparse matrix-vector multiplication. The sparse-matrix vector multiply computation assigns a microthread to each row of a sparse matrix. The outer loop (loop 0) distributes rows among the microthreads while the inner loop (loop 1) performs a sparse dot product. As the number of non-zeros per sparse row is highly variable in sparse matrices, the trip count of the inner loop will vary across microthreads. At beginning of computation (before loop 0), all the microthreads begin execution at the same instruction pointer. While all microthreads are executing the same instruction pointer, providing the illusion of microthreads using a SIMD data-path is trivial. As execution proceeds, the variable trip count of the inner loop will result in divergence.

Divergence occurs when some microthreads execute a different instruction pointer. In the above example, the conditional jumps at 0x400d47 and 0x400d79 can induce divergence. As divergence implies multiple instruction pointers, the microarchitecture must keep track of the mapping between microthreads and their associated instruction pointers. An instruction pointer with a collection of associated threads is referred to here as a "fragment." Performance on a data-parallel machine is highly dependent on reconverging fragments in order to amortize instruction fetch across the largest possible number of microthreads.

The immediate post-dominator of a divergent branch is the "closest" instruction where divergent execution paths can be guaranteed to re-converge. That said, microthread reconvergence can occur before or after the immediate post-dominator. In the example shown in FIG. 17, the basic block labeled "obb_0x400d7b" is the immediate post-dominator of the basic blocks terminated by the conditional jumps at 0x400d47 and 0x400d79. If the conditional jump at 0x400d47 or 0x400d79 causes microthreads to diverge, the instruction at 0x400d7b is the first time it can be guaranteed that the execution paths will reconverge.

An existing method to build a microthreaded machine using a SIMD data-path is to explicitly augment branches with a reconvergence instruction pointer (IP) and then place an instruction or control code at the immediate post-dominator. This approach exploits the static reconvergence guarantee made by the immediate-post dominator and is commonly performed by a compiler. Attempting a compiler-driven approach is a non-starter in current ecosystems. More importantly, augmented branches/reconvergence tokens do not have a sematic meaning outside of the data-parallel extension described herein and would make the extension incompatible with existing software.

One embodiment of the invention includes circuitry to dynamically manage microthread reconvergence. This approach allows for the execution of legacy instructions in a data-parallel fashion and can provide higher performance than the alternative, statically marked reconvergence mechanism used by prior systems. As this approach does not rely on compiler analysis for reconvergence, the hardware is in complete control of scheduling the microthreads in order induce reconvergence of execution fragments.

In one embodiment, the gang scheduler 1301 finds microthreads at the same instruction pointer, gangs the microthreads together into execution fragments, chooses one of the available fragments, and then executes it on a SIMD data-path. The task of the gang scheduler 1301 is similar to an associative search over all of the instruction pointers of microthreads resident in a processing cluster (e.g., scheduling at least one fragment every cycle). The gang scheduler 1301 may rely on various detectable properties to make efficient scheduling decisions. For example, in one embodiment, the gang scheduler 1301 performs scheduling by focusing on conditional branches that induce control divergence, based on the number of divergent instruction pointers bounded by the total number of microthreads, and/or in accordance with the fact that microthread reconvergence is likely to occur at instruction locations near the immediate post-dominator of the divergence branch. Finally, one embodiment of the gang scheduler heuristically selects the minimum IP fragment when multiple fragments are available for selection.

Figure 18:
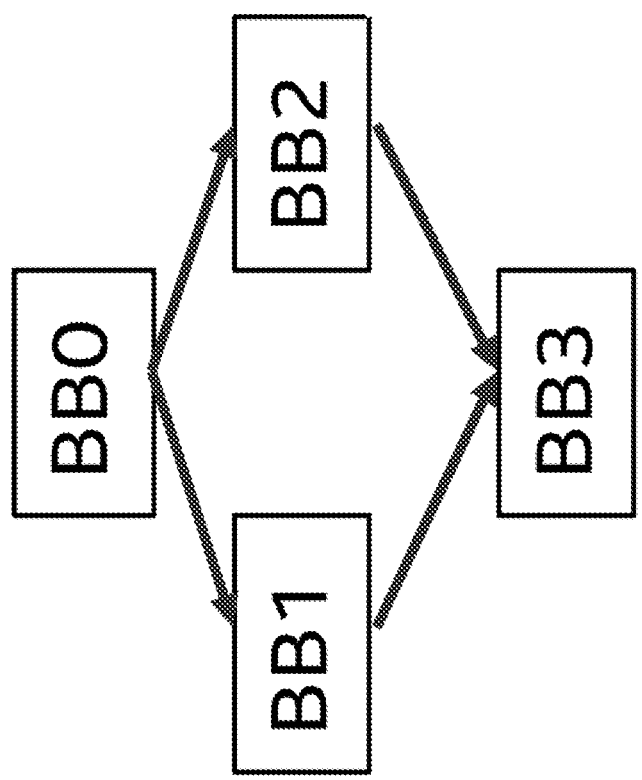
FIG. 18 illustrates an example in which different threads execute different basic blocks of code.

FIG. 18 provides an example in which some threads execute basic block 1 (BB1), while others execute BB2. Both reconverge at BB3. Thus, BB3 is post-dominator of {BB0, BB1, BB2}. In one embodiment, the gang scheduler 1301 performs scheduling based on the fact that the post-dominator is likely found at the larger future address when the control flow graph (CFG) is linearized. Thus, it may schedule the lower PC addresses first in order to induce improved mask coherence. In this specific example, basic blocks BB1 and BB2 should be executed before BB3 to induce reconvergence.

To exploit the above properties, one embodiment of the invention builds a data structure (e.g., a table or similar structure) to keep track of fragments (e.g., an instruction pointer (IP) and associated collection of threads), using a number of entries sufficient to hold a fully divergent gang (e.g. either 16 or 32 entries). The structure is managed such that a partial-order invariant is maintained to provide the ability to select the fragment with the minimum IP quickly.

Figure 19:
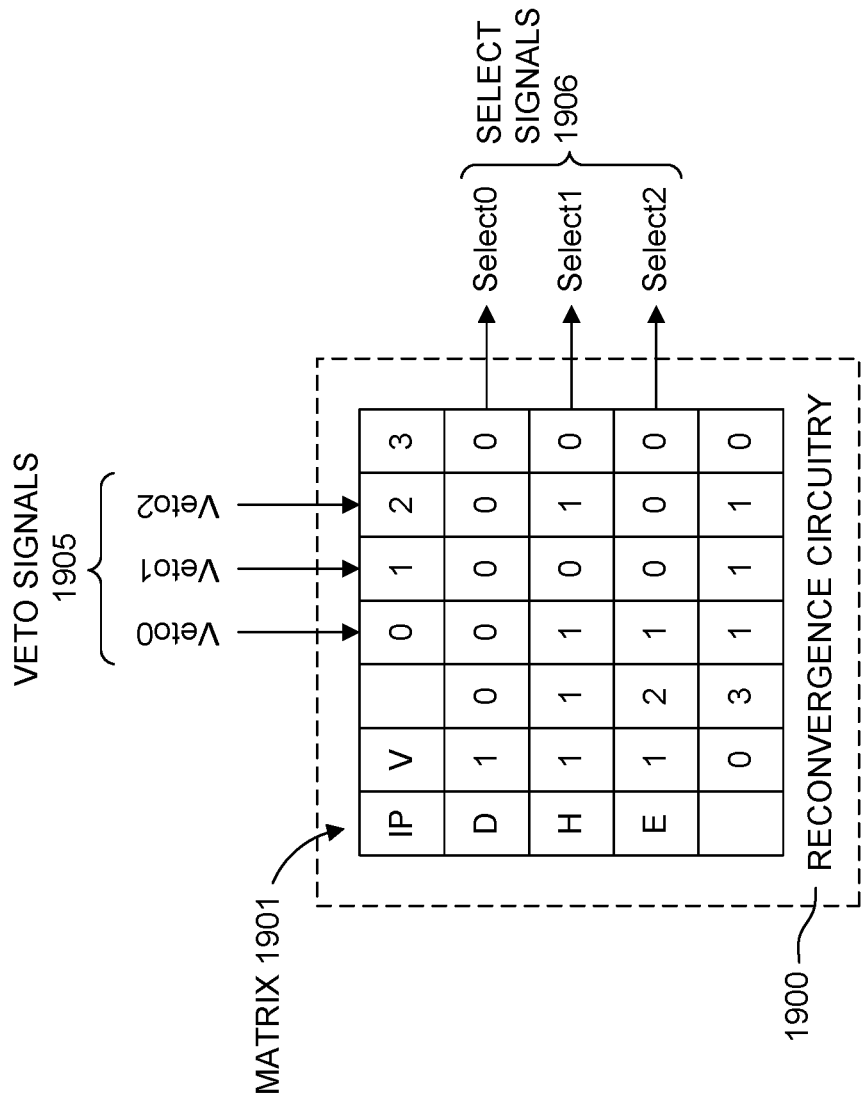
FIG. 19 illustrates reconvergence circuitry in accordance with one embodiment of the invention.

One implementation comprises a binary matrix-based scheme where each fragment is allocated a row and column in the binary matrix. One example of reconvergence circuitry 1900 including a matrix 1901 is illustrated in FIG. 19. In this matrix 1901, a dependency bit (D) is set in entry (i,j) to indicate that fragment i is at a larger IP than the fragment corresponding to row j. When a new fragment is inserted into the gang scheduler 1300, the reconvergence circuitry 1900 compares its NIP with the NIPs of existing fragments in the matrix and the row dependency bits are set accordingly. The minimum IP fragment is found by computing veto bits 1905 on the associated columns. The veto value will only affect entries with the dependency bit set (higher IPs). This process ensures that the row with the minimum IP will selected, as indicated by one of the select signals 1906, as it is in the only row that has not been vetoed.

The illustrated example of matrix-based minimum IP selection using matrix 1901 is defined by the following code sequence:

$$Select0 = NOR(Veto1 \& DependencyBit(0, 1), [ = 1]$$
$$Veto2 \& DependencyBit(0, 2),$$
$$...$$
$$Veto\,n \& DependencyBit\,(0, n))$$
$$Select1 = NOR(Veto0 \& DependencyBit(0, 0), [ = 0]$$
$$Veto2 \& DependencyBit\,(0, 2),$$
$$...$$
$$Veto\,n \& DependencyBit\,(0, n))$$
$$Select2 = NOR(Veto0 \& DependencyBit(0, 0), [ = 0]$$
$$Veto\,1 \& DependencyBit\,(0, 1),$$
$$...$$
$$Veto\,n \& DependencyBit\,(0, n))$$

In summary, ready fragments competing for scheduling transmit veto signals 1905 down their associated columns. The veto signal only impacts entries with the dependency bit set (i.e., those with larger IPs). The row with the minimum IP is not vetoed and will therefore be selected by the reconvergence circuitry 1900 (Select0).

Figure 20:
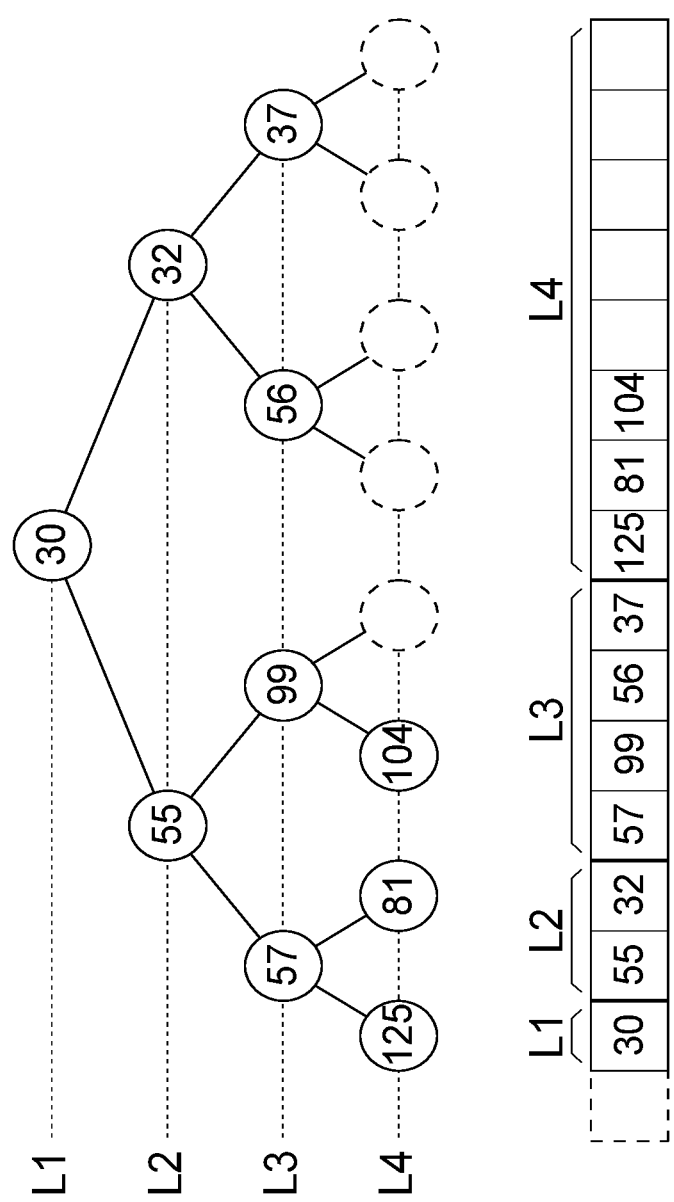
FIG. 20 illustrates one embodiment of an arrangement of instruction pointers.

An alternative implementation for minimum IP selection uses a binary heap (also known a priority queue) to manage the fragments. A binary heap is a linearization of a binary tree in an array structure. The array structure enforces the invariant that a parent node is smaller than both of its children. Therefore, the root of the tree (the first entry in the array) has the minimum IP and can be accessed in O(1) gates, as shown in FIG. 20. Insertion and deletion into the heap take O(lg2(microthreads)) gates in the worst case. In this example, the highest priority IP is in the leftmost entry and can be read directly. The insertion or deletion of new IPs requires a number of gates that fits with a cycle or two for many interesting tuples of total microthreads (and frequency based on prototyping).

An implementation may augment the cluster's instruction cache (or decoded uop cache, if present) with reconvergence hints. These hints provide significantly higher mask density when the latency to resolve the divergence event is longer than the latency for the front-end to fetch to the next fragment switch for this gang. By storing reconvergence locations in the I-cache or uop cache (DSB), embodiments of the invention significantly improve performance on divergent codes. In one embodiment, when a reconvergence event occurs, the location (IP) in the cache is marked as a reconvergence point. If an execution fragment later hits the reconvergence IP with a partial mask, execution is stalled for a small number of cycles in order to provide an opportunity for reconvergence. To guarantee forward progress, the number of stall cycles is limited in order to prevent deadlock. Using these techniques, the discovered reconvergence points closely approximate the points that a compiler would insert with reconvergence instructions (e.g., in a static reconvergence scheme). As most data-parallel codes have a relatively small instruction footprint, a conventionally sized instruction cache (32 kBytes) or uop cache (6144 uop) can capture all of the important reconvergence IPs.

It is also possible to generate reconvergence uops using hardware-based techniques. In this approach, the instruction front-end augments branch uops with the reconvergence UIP and generates explicit reconvergence uops at the reconvergence IP. Augmenting branch uops and adding uops to the uop stream is a straightforward extension to a uop cache. In one embodiment, however, hardware is used to discover the {branch ip, reconvergence ip} pairs used for reconvergence as follows:

(a) Each microthread manages a small list that contains {branch IP, branch mask} pairs. The branch IP is the IP of the branch and the branch mask is the mask of all active threads at the given branch.

(b) When threads hit a divergent branch, every active microthread records the current {branch IP, mask} pair and saves it to its thread-local list of divergence history.

(c) When threads reconverge, the circuitry computes a new "active mask" that reflects the reconverged mask. Using the newly computed reconverged mask, all microthreads traverse their local divergence history list (walk over the entries) until the following invariant is satisfied "reconvergence_mask AND {IP, branch_mask}_i==reconvergence_mask". This process discovers the previous branch where the microthreads initially diverged.

(d) After discovering the different branch, the hardware saves the {branch IP, reconvergence IP} in a table for later use.

In addition, one embodiment of the invention includes a new branch predictor. Instead of predicting per-microthread branches, the branch predictor of this embodiment makes predictions for an entire execution fragment. As the branch behavior of microthreads are heavily correlated in practice, this implementation significantly reduces the hardware requirements for the branch predictor.

Figure 21:
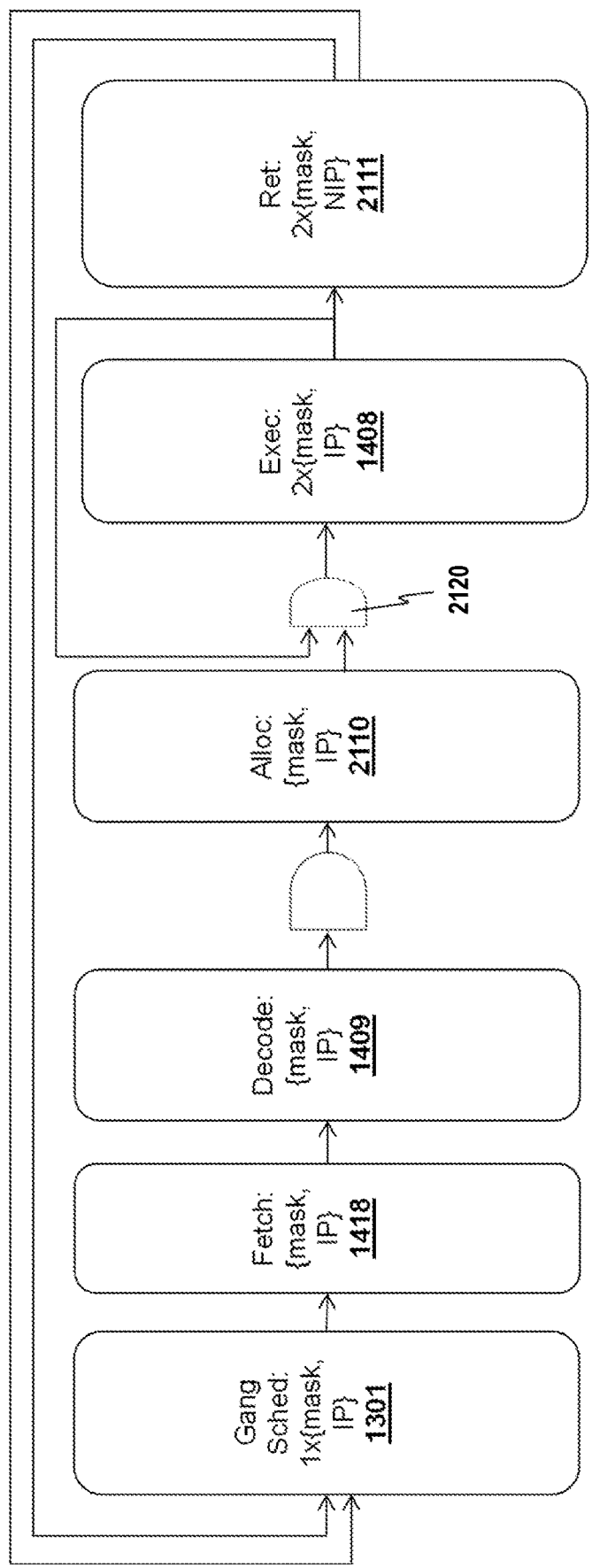
FIG. 21 illustrates an example of a microarchitectural mask manipulation.

FIG. 21 illustrates an example of a microarchitectural mask manipulation applied to a microprocessor pipeline. The illustrated pipeline includes the gang scheduler 1301 for scheduling instructions, an instruction fetch unit 1418, and a decoder 1409 for decoding macroinstructions into uops. Allocation circuitry 2110 allocates execution resources including registers and functional units, execution circuitry 1408 executes the uops, and retirement circuitry 2111 retires the instructions, storing the architectural state and deallocating the execution resources.

When a fragment is selected, the associated fetch mask and IP are passed from the fetch circuitry 1418 to the decoder 1409. The decoder 1409 generates micro-ops (uops) with an implicit additional register dependency on the microarchitectural mask which is written by all conditional branch and indirect jump instructions. To support load divergence, loads can also write the microarchitectural mask. All uops read the microarchitectural mask. Thus, the microarchitectural mask is treated much like a conventional register dependency from the perspective of forwarding and hazard detection. As shown in FIG. 21, the DPC microarchitecture performs a logical AND (conjunction) 2120 for in-between dependent masks.

In one embodiment, the gang scheduler 1301 attempts to schedule a fragment every cycle by examining the available execution fragments and selecting the "best" one (by either minimum IP or some other heuristic). Once the fragment has been selected, the gang scheduler 1301 sends the fragment, including the IP and microarchitectural mask, to the instruction fetch circuitry 1418. The instruction fetch circuitry 1418 produces cops and a microarchitectural mask. Note that the microarchitectural mask produced by the instruction fetch circuitry 1418 may not be the same as the one dispatched. The instruction fetch circuitry 1418 includes several mechanisms to detect re-convergence and may increase mask density. When a re-convergence event occurs, the microarchitectural mask density (the population count of the bits in the microarchitectural mask) increases.

As a fragment "owns" the instruction fetch circuitry 1418 for several cycles, it is possible that the IP of the fragment will match another fragment already in the gang scheduler 1301. In one embodiment, as the previously mentioned reconvergence circuitry 1900 operates non-speculatively (e.g., within the retirement stage 2111), another mechanism is implemented to exploit dynamic reconvergence detected in the front-end, referred to herein as "front-end fragment merging." In one embodiment, front-end fragment merging provides significant benefits when used with a non-speculative gang scheduler and a long instruction-fetch-to-retirement latency.

One embodiment of the pipeline performs implicit microarchitectural masking. For example, a first instruction (e.g., movq) may have an implicit dependency on a second instruction (e.g., jc). By treating the mask register as an explicit dependence, proper behavior after divergent instructions is ensured.

In one embodiment, the decoder 1409 augments every uop with an implicit additional dependency on the producer of the microarchitectural mask. The microarchitectural mask and associated manipulation circuitry allows hardware to convert the control dependency of a conditional branch into a data-dependence dynamically. This improves efficiency when converting thread-level parallelism into a form suitable for execution on SIMD-style hardware.

When the instruction fetch circuitry 1418 produces cops to the back end of the machine, allocation proceeds in similar fashion to a conventional out-of-order microprocessor; however, the key difference is that the microarchitectural mask is now an explicit dependency (e.g., like another register field in the uop). All instructions read the microarchitectural mask; however, only a small subset of instructions write the microarchitectural mask. Conditional branches and indirect jumps must write the microarchitectural mask. An implementation may choose to implement "load-divergence" by making loads to memory also write the microarchitectural mask register. Therefore, when a uop reads its operands in a reservation station, it will also do so for the microarchitectural mask. However, the microarchitectural mask is treated differently than a conventional operand. The new microarchitectural mask is computed taking the AND of the mask presented to the reservation station with the forwarded mask. This ensures microthreads behind a divergence event (branch or load) will properly execute.

This data-dependence based on the control dependency of a conditional branch could be subject to speculation. An implementation using a reorder buffer (ROB) may choose to speculatively dispatch instructions in the shadow of a mask producer to increase utilization in execution regimes with low occupancy or implementations with small numbers of microthreads per lane. Once the mask producer has been resolved, the instructions belonging to this fragment in the shadow of the mask producer may be cleared within the pipeline or from the reorder buffer (ROB).

The retirement circuitry 2111 updates the gang scheduler 1301 with new fragments. The microarchitectural mask is retired non-speculatively; consequently, all gang scheduler updates are non-speculative. The gang scheduler 1301 issues instructions from a given fragment until a specific divergence event occurs (e.g., divergent branch, cache miss, minimum IP fragment switch, priority inversion fragment switch, livelock breaker fragment switch). When this occurs, one or more fragments must be written back to the gang scheduler. A new fragment generated by a divergent instruction (e.g. a conditional branch) is handled slightly differently than a fragment switch event.

When a fragment switch operation occurs, the associated uop is tagged by the front-end that it is the last uop for a given fragment. In retirement, the uop will update the gang scheduler 1301 with its mask and IP, removing it from the execution state of the machine.

Other types of fragment switches may include inverting priority of the gang scheduler heap to allow forward progress on fragments that are otherwise not live in the machine, livelock breaking when a given fragment has been consuming all resources but not making forward progress, call/return stack fragment switches for indirect branches, and predictor-based fragment switches.

In one embodiment, divergent branches compute two {masks, IP} tuples. The execution hardware 1408 chooses the execution path with the minimum IP to execute. The current fragment assumes the mask for the appropriate branch direction and forwards the updated mask to any dependent uops. When the divergent branch retires, it updates the gang scheduler with the not-taken fragment. In both cases, retirement updates to the gang scheduler 1301 will cause the gang scheduler to attempt to reconverge fragments.

An implementation may employ a hardware mechanism to assign speculative mask state to uops allowing it, in effect, to have a longer latency to resolve a divergence event and still have the most full mask possible at dispatch because the mask updates happens later in the pipeline. This requires adding a table of fragment masks which each uop references. There is one entry for every unique fragment that is allowed to be live within the backend of the machine. Each table entry corresponds to a different fragment sequence ID.

The above techniques are useful for shutting off the instruction fetch cluster of a data parallel machine and executing out of the IDQ 1305. The new IDQ mask table is separate from the heap state for at least two reasons: (1) If a fragment push occurs after the fragment switch uop for this sequence ID is allocated, then this table cannot perform a fragment merge without potentially violating program order; and (2) any fragment ending event that removes a fragment from the heap is still a candidate for merge.

On a fragment push, if the fragment sequence ID is resident in the IDQ 1305 and the fragment switch operation has not yet allocated, then a merge is performed on the IDQ mask table and the gang scheduler heap. This merged mask is copied into every uop complete mask as they allocate.

Figure 22:
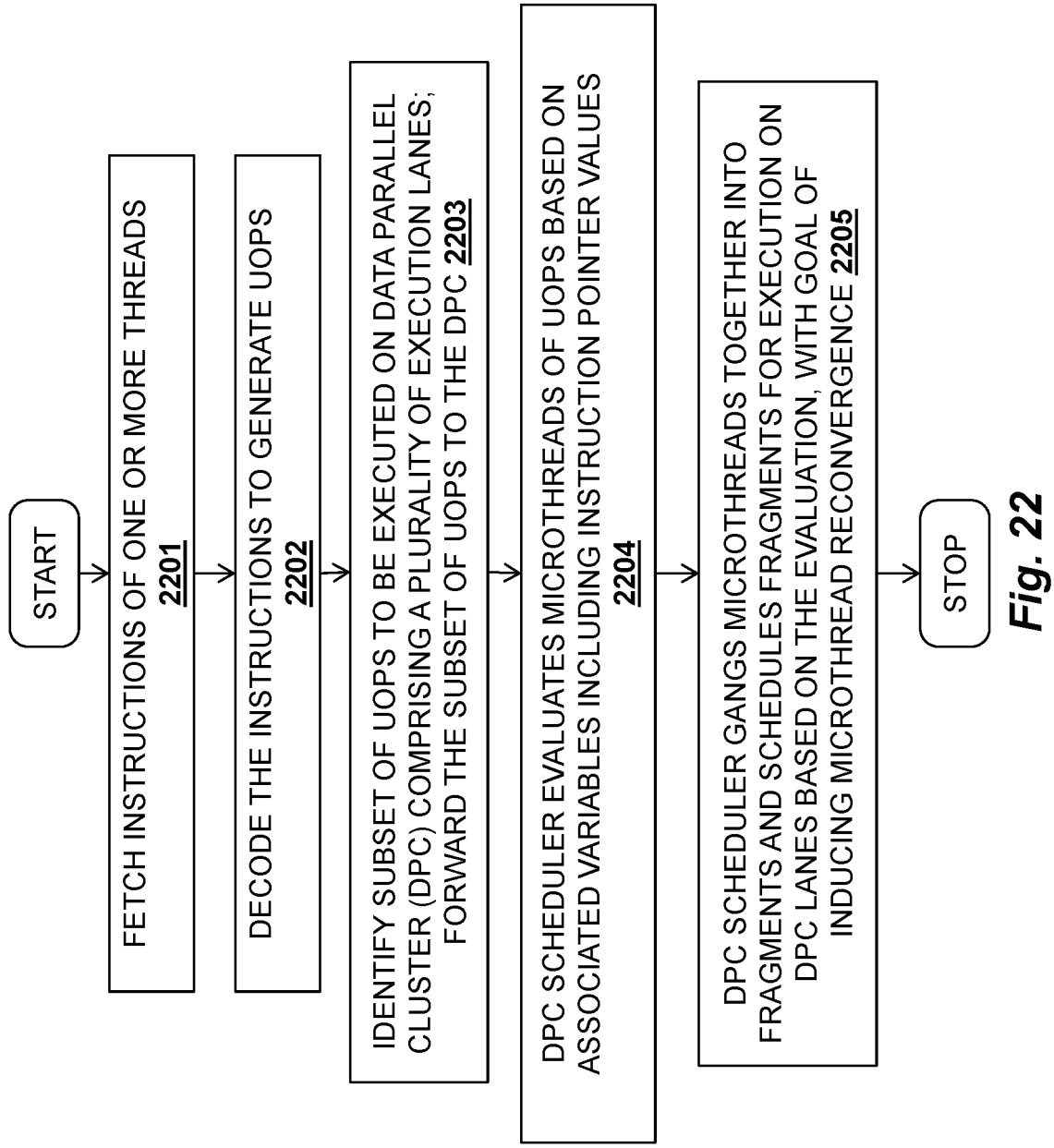
FIG. 22 illustrates a method in accordance with one embodiment.

A method in accordance with one embodiment is illustrated in FIG. 22. The method may be implemented on the processor and system architectures described above, but is not limited to any particular architecture.

At 2201 instructions of one or more threads are fetched and, at 2202, the instructions are decoded to generate uops. As mentioned, in one embodiment, the fetch and decode are performed by a host processor (e.g., such as an x86 processor with a simultaneous multithreading/multi-core architecture). In another embodiment, the DPC includes fetch and decode circuitry to fetch and decode its own instructions to generate uops.

At 2203 a subset of uops are identified which are to be executed on the DPC. These uops are then forwarded to the DPC (e.g., over an on-chip interconnect if the DPC is on-chip or an off-chip interconnect if the DPC is off-chip).

At 2204 the DPC scheduler evaluates microthreads of uops based on associated variables associated with the microthreads. As mentioned, in one embodiment, the variables include the instruction pointer (IP) values associated with the microthreads. At 2205 the DPC scheduler gangs the microthreads together into fragments and schedules the fragments for execution on DPC lanes based on the evaluation from 2204. As previously described, the DPC scheduler schedules the fragments with the goal of inducing microthread reconvergence.

Adaptable and Efficient Lane-Wise Tensor Processing

As mentioned above, one embodiment of the data parallel cluster 1300 includes a tensor ALU 1340 for processing tensor data within its designated lane. One particular embodiment of the tensor ALU 1340 is described below. Since previous solutions have not paired SPMD with tensor processing, they are less adaptable and less efficient than tensor ALU 1340 described here.

In particular, one embodiment of the tensor ALU (TALU) 1340 is highly adaptable and uses a 2D-broadcast implementation that achieves highly efficient Tensor Matrix Multiplication (TGEMM) in a SPMD architecture. In addition, the TALU 1340 is reconfigurable to handle various matrix dimensions and includes support structures (e.g., register file read ports, cache bandwidth requirements, etc.) to allow the TALU 1340 to operate at a high efficiency.

i. Tensor ALU (TALU) Instruction Embodiments

Figure 23:
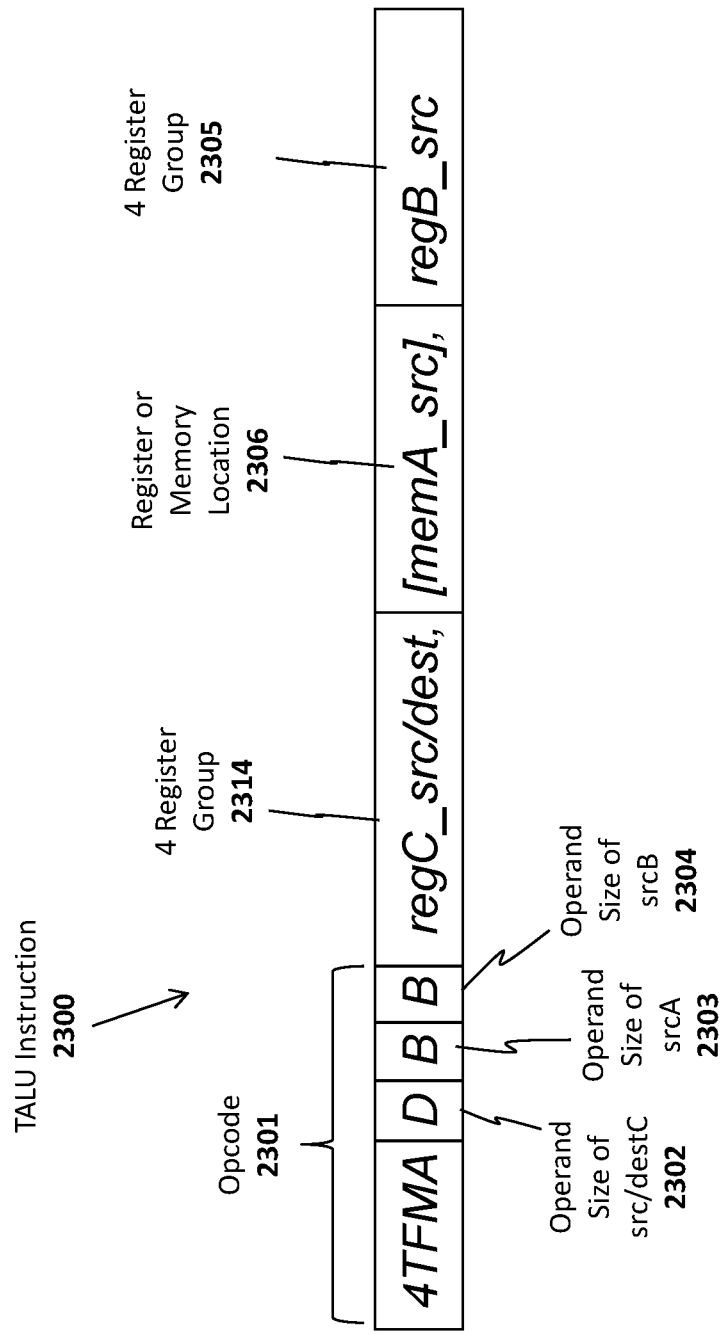
FIG. 23 illustrates an example set of instruction fields.

As illustrated in FIG. 23, one embodiment of a TALU matrix instruction 2300 comprises an opcode field 2301 to specify the operation to be performed, operand size fields 2302-2304 to specify a size for each of the operands, two 4-register group operand fields 2304-2305, and an operand field 2306 identifying four elements in a memory location. The '4' at the start of opcode 2301 indicates the number of elements of A used in the operation. The DBB portion of the opcode (2302-2304) indicates a doubleword size (D) for operand C, and Byte sizes (B) for operands A and B. Thus, four elements of srcA come from memory at a unit stride of 1 Byte.

In one embodiment, each TALU 1340 includes matrix multiplication circuitry to perform the matrix multiplication operation: $[1\times8]c+=[1\times4] A*[4\times8]B$. The microarchitecture of the TALU 1340 in this embodiment may be a 4×8 INT8*INT8 multiplier which accumulates into an INT32 unit. For example, existing values stored in an accumulator tile/vector register may be added to the products generated by the multiplier. The resulting sums may then be stored back to the accumulator tile/vector register.

In one embodiment, four rows of eight 1-Byte elements of srcB are loaded in four register operands. The instruction may specify a register group as the source for this (e.g., 4 register group 2314). One row (8 elements, 4 Bytes each) of C is read and written (accumulated) with this instruction. The size of a C element is decoded from D (stands for Double Word) in the instruction.

Thus, register and memory usage for this embodiment is as follows:

(a) 4 rows×8 columns of 1 Byte operands in B require 32 Bytes in total (each row requires 8 Bytes). In one embodiment, this is stored using 4 DPC registers, with each register being 8 Bytes/64 bits in size.

(b) 1 row×8 columns of 4 Byte operands in C also require 32 Bytes total, again consuming 4 DPC registers. Note that C is read and written in unit stride of 4 Byte contiguous memory.

(c) For specifying the start of srcA from memory an INT register is used; srcA access is at stride of 1 Byte contiguous memory.

(d) Using the instruction format in FIG. 23, 4 registers as a group are specified for C and B in fields 2304 and 2305, respectively. In one embodiment, the last two bits of the register operand are masked out and 0b00, 0b01, 0b10 and 0b11 are added to identify the 4 registers to be used.

While 4TFMADBB is shown as an example for a 4×8 TALU, the underlying principles of the invention are not limited to any particular operand size or register arrangement. By way of example, and not limitation, a tensor instruction with a 8TFMADBB opcode may use an 8×4 TALU and a tensor instruction with a 16TFMADBB opcode may use a 16×2 TALU.

ii. 2D-Broadcast Embodiments

As mentioned, one embodiment of a DPC 1300 includes a 32-lane implementation with a 4×8 TALU in each lane. Prior to a 4TFMADBB instruction, loads may be performed to move the 4×8 B tiles of data (e.g., 4 loads of 8 Bytes each) into four adjacent XMM registers. For example, the prefetcher 1602 mentioned above may use hints or other techniques to anticipate and prefetch the data into the shared cache 1601. Similarly, in an implementation with one DPC 1300 (rather than a DPC tile 1600), a prefetcher may prefetch the data into the data cache 1380 so that it will be available locally to all of the lanes.

In one embodiment, all 32 lanes execute these loads and fetch adjacent B tiles into their corresponding register files. Each lane includes register files to hold one set of architectural registers per Gang. To improve throughput, the load of a B tile in each lane will be marked as gang invariant within the lane. As such, the same B-tile will be broadcast and written into each Gang's register files within the lane. This constitutes one of the dimensions of the 2D-broadcast.

In one embodiment, loads are also performed to move the C tile (1 row of 8 elements of 4 Bytes each=32 Bytes total per lane) into four adjacent XMM registers. Since four out of 32 XMM registers are taken for the B tile, 28 XMM registers are available for the C tiles. Since each 4TFMADBB instruction needs 4 XMM registers for the C tile, 7 such 4TFMADBB instructions may be executed in a Gang (i.e., before XMM registers are fully consumed). Since there may be eight Gangs in one implementation of the DPC, there may be 7×8=56 4TFMADBB registers before all XMM registers are used in all eight Gangs.

In one embodiment, these 56 4TFMADBB instructions are used to determine a unit of Blocking. Since each 4TFMADBB instruction produces 8 elements of C tile per lane and since there are 32 lanes, the blocking size that can be achieved by a 32 lane implementation of a DPC running 4TFMADBB instructions is 56×256. As another example, the Blocking size that can be achieved by a 32 lane implementation of DPC running 8TFMADBB instructions will be 112×128. The bigger the Blocking size, the higher the data reuse and hence, fewer the number of times the same data element needs to be read in order to complete a matrix multiplication.

Once the B and C tiles are loaded into registers in each lane, the 4 elements of srcA are loaded from memory. In one embodiment, this load is fused with the 4TFMADBB instruction such that the load writes to an FTMP register (e.g., a temporary or non-architectural register) and the 4TFMADBB instruction reads this FTMP register for srcA. The same A tile is read by all 32 lanes, in effect, broadcasting the same A tile data to all the lanes. This constitutes the 2nd dimension of the 2D-broadcast scheme (A data reuse). Both the A and B broadcasts increase data reuse and enable the 56×256 blocking size for 4TFMADBB. Note that the same B tiles are reused for each of the 56 A tile reads (B data reuse). Furthermore, once the partial products of a 56×256 block of C are done, the K dimension is processed (i.e., input matrix A is M×K dimension, input matrix B is K×N dimension, and output matrix C is M×N dimension) and the results are accumulated into the same C tile (C data reuse).

Figure 24:
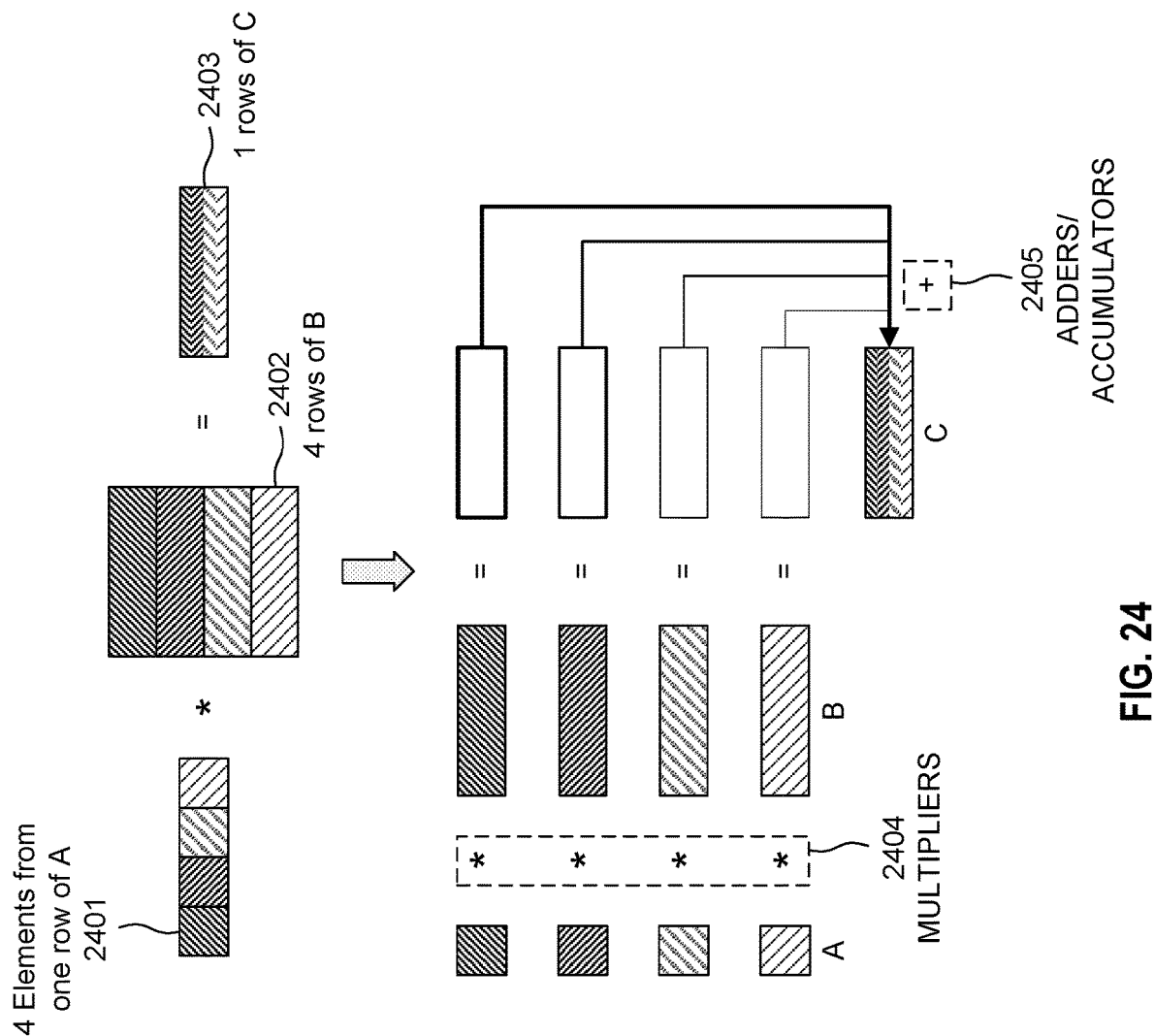
FIG. 24 illustrates an example of an arrangement of rows and columns of a matrix and associated operations.

FIG. 24 illustrates operations that happen in each lane in one embodiment. In particular, a 1×4 A tile 2401 is multiplied with a 4×8 B tile 2302 to produce the partial product of a 1×8 C tile 2403. In one embodiment, multipliers 2404 in the lane multiply the first element of A with each of the 8 elements in the top row of B to produce the 8 elements in the top row of C. Similarly, the second, third, and fourth elements of A are multiplied with the second from the top, third from the top, and bottom rows of B, respectively, to produce corresponding rows of C. These partial product rows of C are added by adders/accumulators 2405 within the lane.

Figure 25:
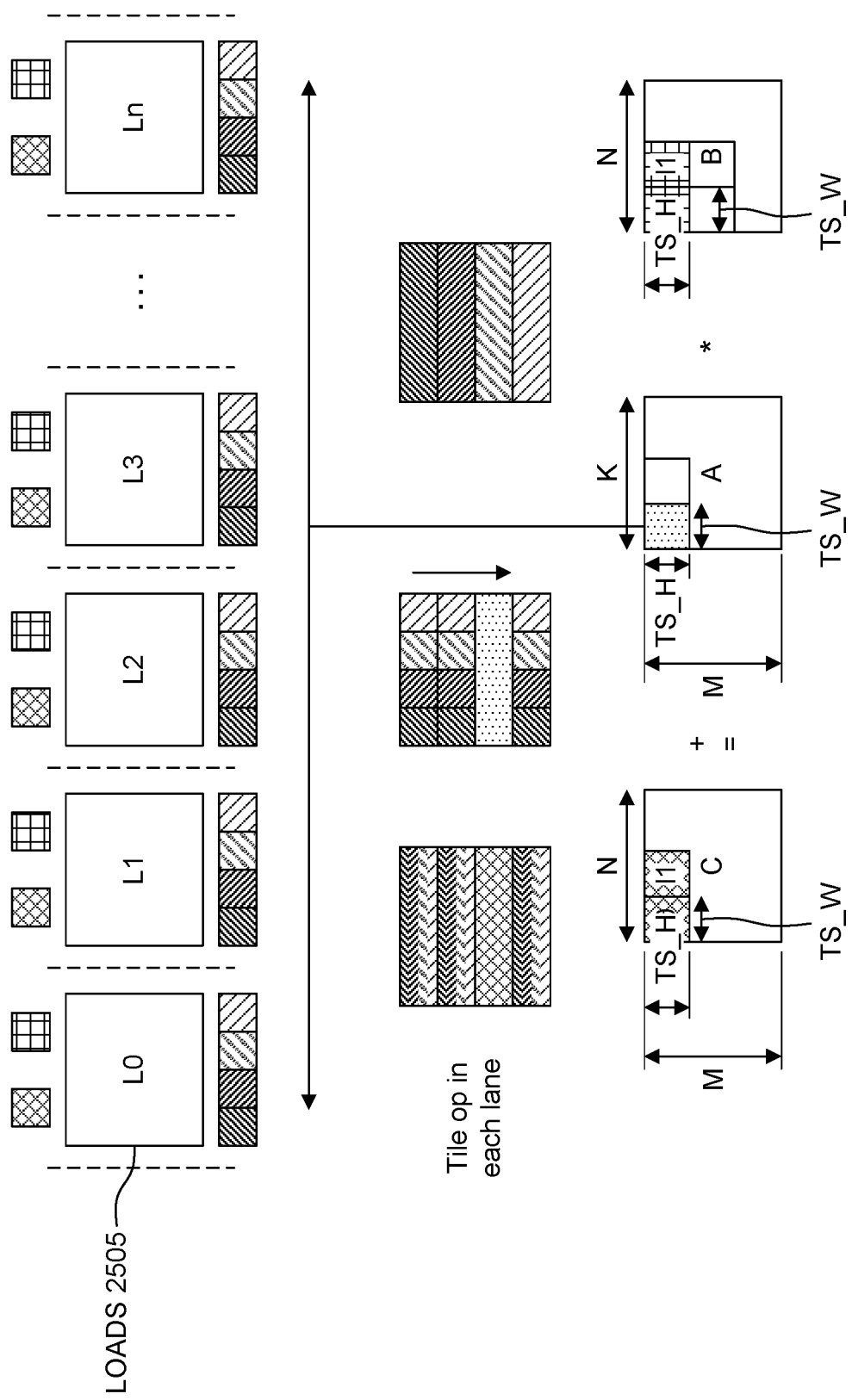
FIG. 25 illustrates operations performed on an example set of tiles.

FIG. 25 illustrates how the tiles of A, B, C are moved to complete the entire matrix multiplication in one embodiment. These operations are sufficient to generate one 56×256 Block of the C matrix. These operations are repeated by moving along the M and N dimensions of the C matrix to complete the instruction. Each lane is first loaded at reference 2505 with 7*G tiles of C (the accumulator operand) where there are 7 accumulators in each Gang and G is the number of Gangs per lane. Each lane is loaded with 1 tile of B (a Gang invariant load). Loading the 1 tile of B copies elements into registers of all Gangs in a lane. The TS_W elements from A are broadcast every cycle across all lanes and multiply-accumulate operations (e.g., FMA operations) are performed to produce new TS_W elements of C each cycle. After 7 A loads, one embodiment switches between the Gangs in a lane. The inner loop C[56R*8C]+=A [56R*4C]*B[4R*8C] where this 56Row*8Col C-block is re-used across the K dimension. In particular, one embodiment moves in the K direction of A and B.

iii. Adaptable Tensor ALU Design

Figure 26:
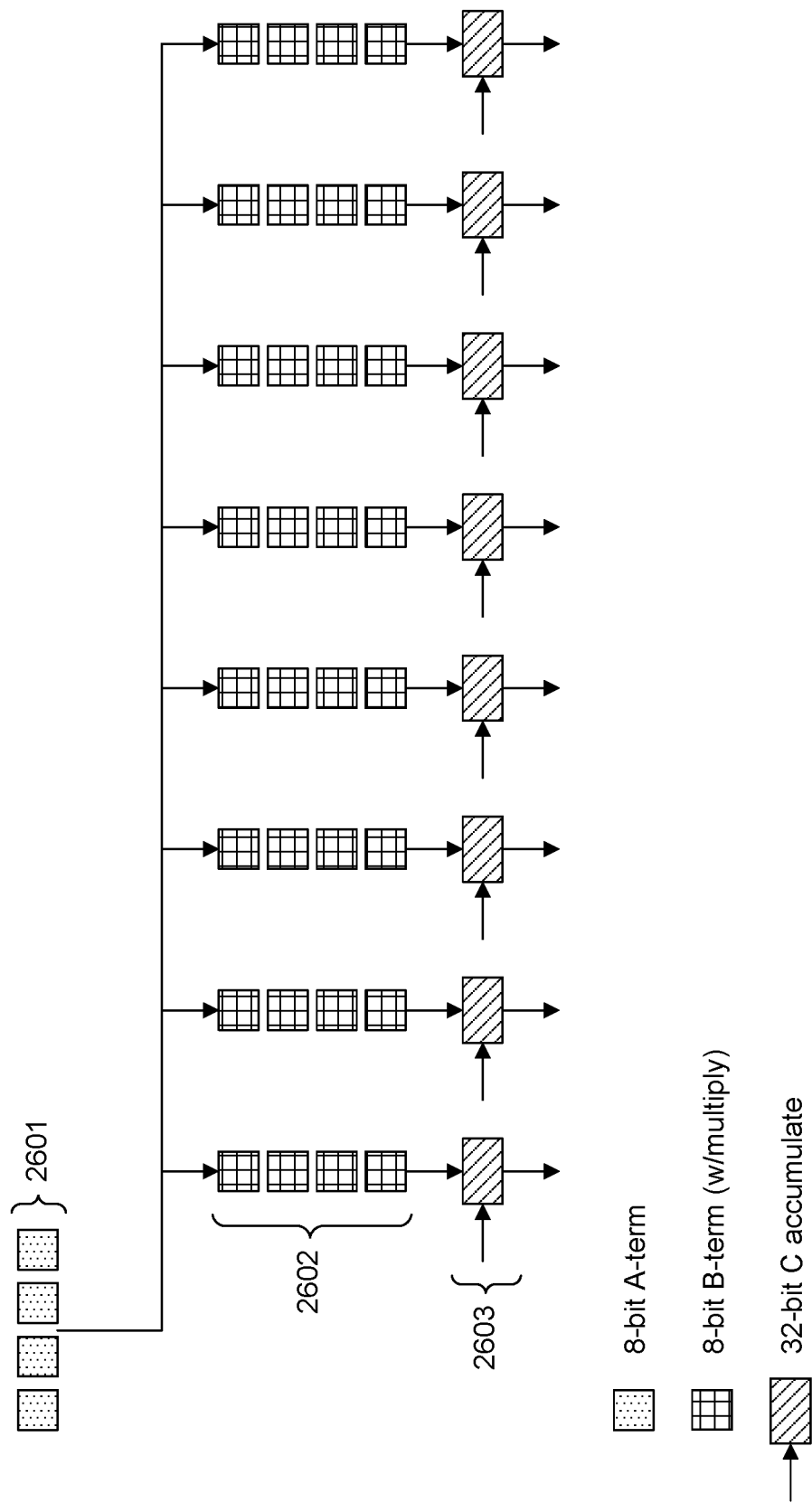
Figure 27:
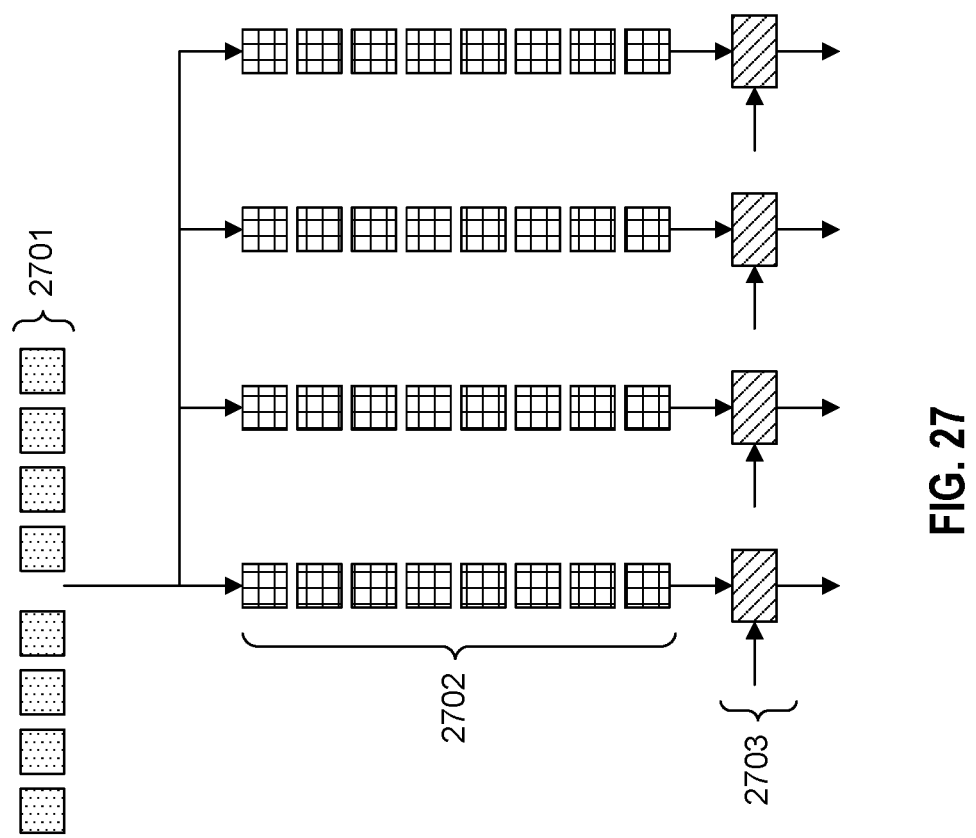

In order to achieve high hardware utilization with widely varying matrix dimensions, one embodiment of each TALU 1340 uses the same circuitry to implement different blocking shapes using different configurations of the 32 multipliers. Consider two separate implementations of the TALU in 4×8 (FIG. 26) and 8×4 (FIG. 27) respectively, which illustrate 8-bit A-term processing elements 2601-2701, 8-bit B-term processing elements (with multipliers) 2602-2702, and 32-bit C accumulate processing elements 2603-2703. The various processing elements in FIGS. 26-27 are identified using different fill patterns.

If the B tile is stored in column-first format, a base 4×8 configuration of multipliers can be used to implement an 8×4 configuration by adding the adjacent even and odd columns as shown in FIG. 28. A set of 2-input 32-bit multiplexers 2804*a-h* are included in this embodiment to select from different input options.

In the 4×8 configuration of this implementation, the first 4 bytes of A 2701 are broadcast to all 8 dot-product columns 2802 (all muxes 2804*a-d* steer their left input in this configuration). At the accumulate stage at the bottom, the C inputs are directly available to the accumulator (even columns), or selected through a multiplexer 2804*e-h* (odd columns), thereby implementing the same function as shown in FIG. 26 (i.e., 4TFMADBB).

In the 8×4 configuration, the low 4 bytes of A 2701 are supplied to the even columns and the high 4 bytes of A 2701 are supplied to the odd columns. As illustrated, the input multiplexers 2804*a-d* steer the bytes of A 2701 to the correct columns 2802. At the accumulator stage 2803, the C input is added to the dot-product at each even column, and the resulting sum is steered via multiplexers 2804*e-h* to be added to the dot-product of the neighboring odd column, producing the final result at the output of each adder in the odd columns. Thus, this configuration implements the same function as shown in FIG. 27 (i.e., 8TFMADBB).

Reconfiguration of the initial matrix of multipliers as described above can be readily extended to a 16×2 matrix computation. The need for such reconfiguration stems from the need to handle different matrix sizes efficiently (e.g., from a square 2048×2048 matrix to a skewed 2048×128 or 128×2048 matrix).

iv. Support Structures to Sustain High Efficiency

1. Register Banking:

When the 4TFMADBB instruction is in steady state operation, it needs to read and write 4 XMM registers for the C Tile. In one embodiment, in order to avoid adding 4 Read and 4 Write ports to the register file, the register file is banked into Odd and Even banks. XMM0, XMM2, XMM4, etc., are in the even bank and XMM1, XMM3, XMM5, etc., are in the odd bank. Since the C Tile is restricted to span 4 adjacent registers (such as XMM0-XMM3 or XMM4-XMM7 etc.), 2 read ports and 2 write ports in each bank are sufficient.

2. B Tile Broadcast Across Gangs:

In one embodiment, the register file supports writing/broadcasting the results of a B Tile load operation into the same registers of each Gang. For example, if the first gang invariant load fetches the first row of the B Tile into XMM0, XMM0 registers of all 8 gangs are written with the same data.

3. A Tile Broadcast Across Lanes:

In one embodiment, the Data Cache 1380 supports broadcasting the same data to all 32 lanes of the data parallel cluster 1300. In one embodiment, the data cache 1380 supports high speed parallel access of the B Tile and C Tile by all 32 lanes.

DPS Gang Invariant Operation Optimizations

In a Single Program Multiple Data (SPMD) model such as those described above, the same instruction is executed on many lanes with different data on each lane. As mentioned, the different micro-threads (uthreads) that are executing the same instruction in all the lanes 1310 form a Gang. Sometimes all or a subset of the uthreads within a Gang or even all uthreads within all Gangs may operate on the same data to perform the same operations. Such operations are called Gang Invariant Operations (GIOs). Having all the uthreads separately execute GIOs results in wasted power and wasted execution bandwidth.

Figure 30:
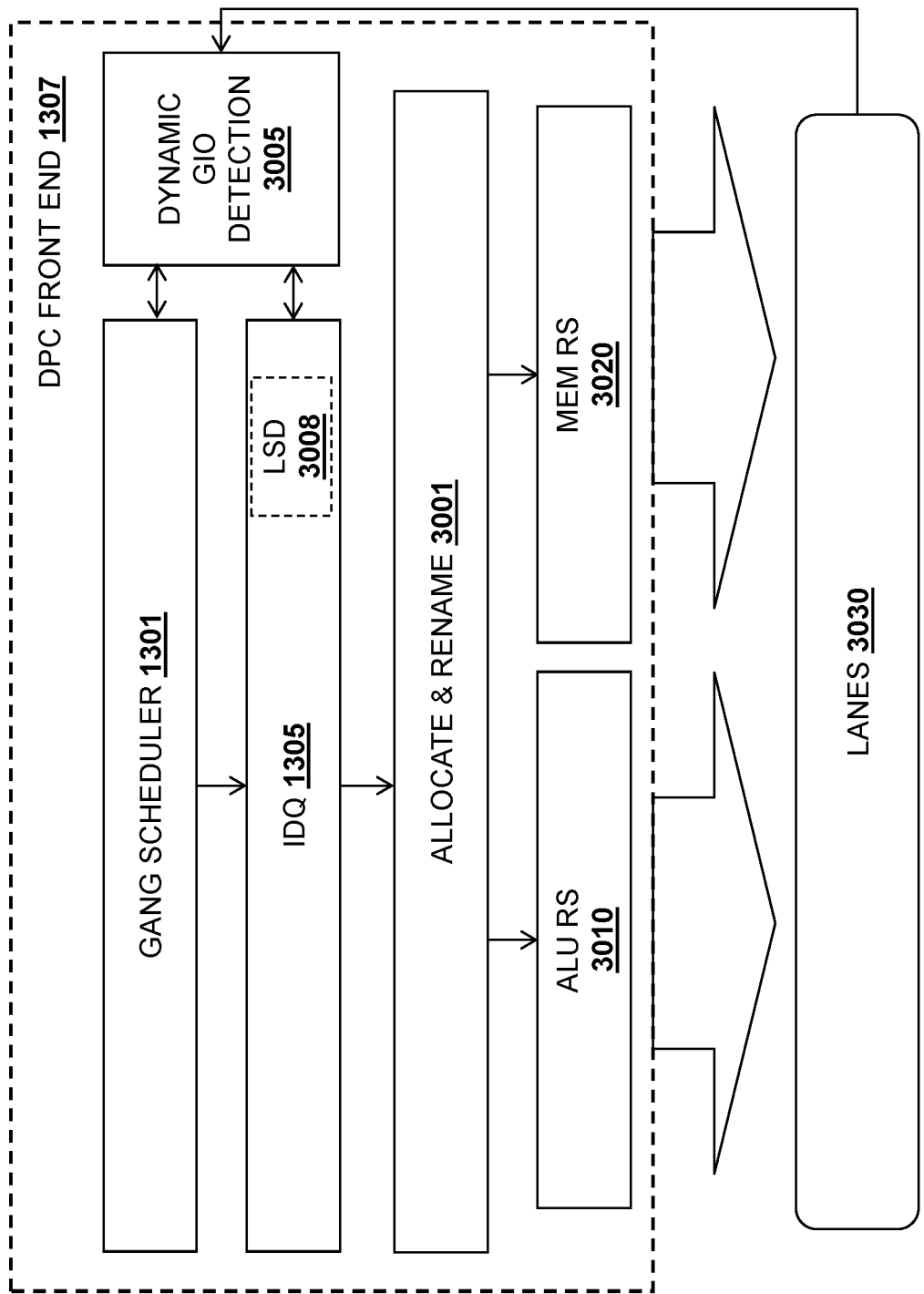
FIG. 30 illustrates additional details of one embodiment of a DPC front end.

FIG. 30 illustrates additional detail of one embodiment of a DPC front end 1307 which includes dynamic GIO detection circuitry 3005 for identifying GIOs based on information associated with the uops (e.g., inserted into the instruction stream by the compiler) and/or execution feedback from the various lanes 3030. Examples of the analysis performed by the dynamic GIO detection circuitry 3005 are provided below.

In addition, FIG. 30 illustrates allocate & rename circuitry 3001 for allocating execution resources within the lanes 3030 (e.g., ALUs, TALUs, etc.) and performing register mapping/renaming within the lanes 3030 (e.g., mapping physical registers to logical registers to be used during execution) for the various microthreads. An ALU reservation station 3010 then dispatches uops to free ALU/TALU execution resources and a memory reservation station 3020 dispatches uops for memory operations (e.g., load/store operations).

The embodiments of the invention described below detect and convey GIOs to the execution circuitry and provide hardware mechanisms to complete GIOs with minimal resource consumption. In particular, these embodiments:

(i) classify the types of GIOs;
(ii) detect GIOs statically or dynamically;
(iii) convey GIOs to the execution hardware; and
(iv) include circuitry to minimally complete GIOs.

(i) Classifying the Types of GIOs

There are two dimensions along which GIOs can be classified. The first dimension of classification is based on the condition of the invariance. For example, an instruction may be an Always Invariant Operation (AIO) or only a Conditionally Invariant Operation (CIO). An AIO always performs the same work across all the uthreads (i.e., every time that instruction is encountered, such as when part of a loop). However, a CIO does the same work across uthreads only when a certain condition is met.

The following code snippet of a 2D OpenCL application includes AIOs and CIOs:

```
__kernel void sgemm_knh(__global float *C, __global float *A,
            __global float *B, int n, int mm, int __k) {
1: const int m = 16 * I_BLK;
2: int ii = get_global_id(0);
3: int i = ii * I_BLK;
4: int j = get_global_id(1);
...
    for (int k = 0; k < __k; k++) {
        float vb = B[k * m +j];
        NUM_OPS(DOFMA)
    }
    NUM_OPS(STOREC);
```

The operation in Line 1 generates the same m value across all uthreads because the operation does not depend on any variables that are different across different uthreads (i.e., the outcome depends only on thread-invariant variables). We refer this operation as an AIO.

In contrast, the operation in Line 3 depends on the x-dimension thread index (i.e., get_global_id(0)). This operation will generate different values among different uthreads within a Gang. Across Gangs, however, if the x-dimension thread block size is less than or equal to the Gang size, every Gang produces the same value for each corresponding thread since each thread sees the same ii value. As such, Line 3 becomes a GIO. However, if the x-dimension thread block size is greater than the Gang size, the threads in different Gangs running on the same lane will have different ii values. Line 3 in this case is not a GIO. Because it is sometimes Gang invariant and sometimes not, this operation is a Conditionally Invariant Operation (CIO).

The second dimension of classification is from a hardware perspective taking lanes into account and consists of the following types: (a) Within Lane Across Gangs; and (b) Across Lanes Across Gangs.

Figure 29A:
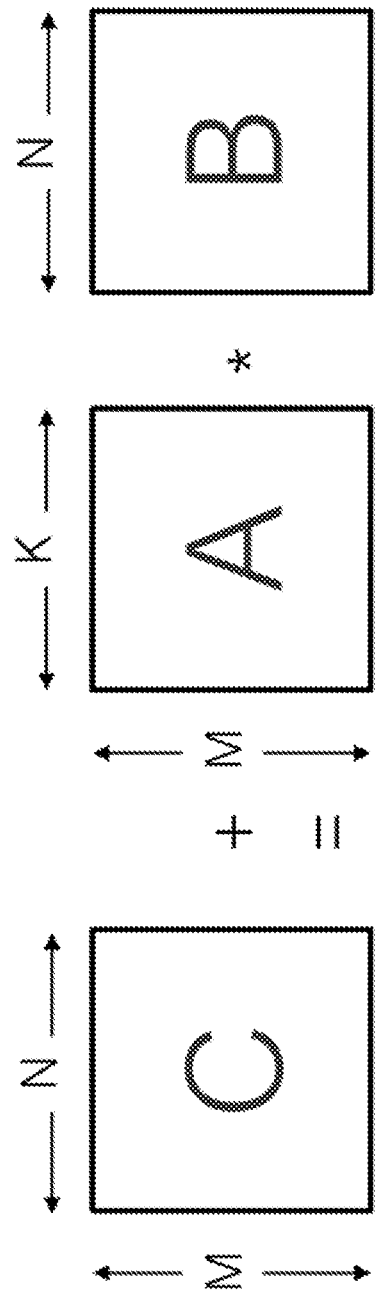
FIGS. 29A-B illustrate a processing order for different tiles.

An example of invariance that is within Lane and across Gangs is found when a Matrix Multiplication (A*B=C) is implemented in SPMD. In this implementation, each lane loads a different B matrix tile, as shown in FIG. 29A (e.g., in response to load uops dispatched by MEM RS 3020). A single A Tile is broadcast to all the lanes. This A Tile is multiplied with the different B Tiles in each Lane to produce different C Tiles as illustrated.

Figure 29B:
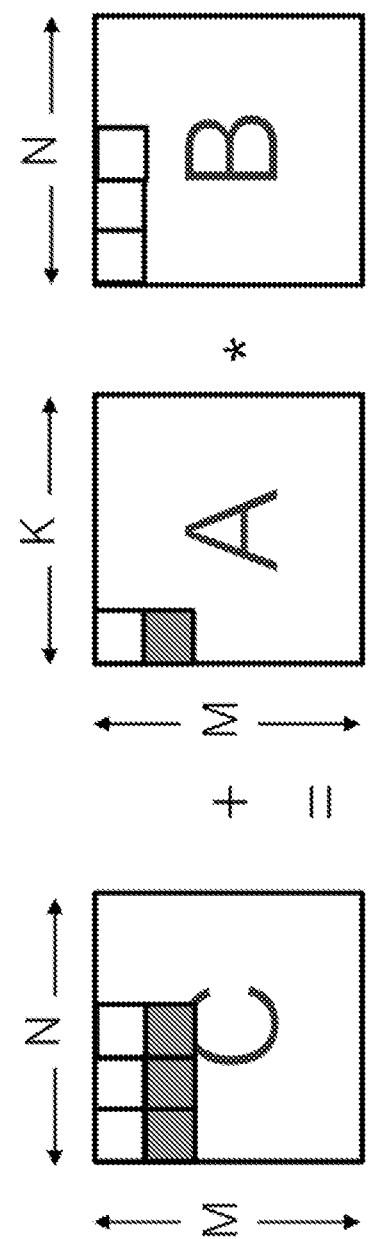

Multiple Gangs may also cooperate to get the same matrix multiplication done in an efficient manner. To do so, a second Gang fetches a different A Tile, multiplies with the same B Tile as the first Gang and produces a different B Tile. The new A Tile and C Tile operated by the second Gang are shown as the shaded boxes in FIG. 29B. In one embodiment, to achieve this, the same B Tiles are needed in respective lanes for both Gangs 1 and 2. Since Gangs 1 and 2 have separate register files, instead of having separate loads bringing in the same B Tiles twice for the two Gangs, the same loads can bring the B Tiles once and deposit them into the register files of both Gangs.

ii) Detecting GIOs Statically or Dynamically

In one embodiment, GIOs are identified based on both compiler analysis and runtime analysis performed by the dynamic GIO detection circuitry 3005. All types of invariance (AIO or CIO) are detected statically during the compilation phase, and AIOs are always treated as GIOs. However, in one embodiment, CIOs are evaluated as GIOs (or not) by the dynamic GIO detection circuitry 3005 depending on the information at kernel launch and from feedback from the execution lanes 3030.

To identify GIOs, the compiler first identifies intrinsic thread-invariant values (AIO) in the SIMT programming model. For example, constant values, kernel parameters, thread block dimensions are the same across different threads in a thread block. The compiler then identifies intrinsic conditionally-invariant variables (CIO). For example, in the current Gang mapping scheme, these are thread index functions/registers (e.g., get_global_id(0) or threadIdx.x).

After marking the initial AIO and CIO information, the compiler generates a program dependence graph, portions of which may be propagated the information through registers and instructions. At each instruction/uop, the destination operand is assigned to a stricter invariance definition from source operands; for example, if the source operands are AIO and CIO, the destination operand is assigned as CIO. In one embodiment, the information propagation will be performed in an iterative manner until the type of invariance does not change for each instruction. After this phase, all static instructions are classified with AIO, CIO or NIO (No Invariant Operation).

As previously discussed, CIOs can only become GIOs at runtime (e.g., based on the kernel's thread block size). In one embodiment, when the dynamic GIO detection circuitry 3005 detects that the number of microthreads is below a threshold, it converts CIOs to GIOs. For example, in one implementation, if the number of uthreads in the x-dimension is less than the Gang size, the dynamic GIO detection circuitry converts the CIOs to GIOs. In one embodiment, if no such triggering condition is detected, the dynamic GIO detection circuitry 3005 treats CIOs as regular SIMT operations with no invariance. However, the exact condition can be changed depending on the architectural definition.

iii) Convey GIOs to the Execution Circuitry

GIOs can be conveyed to the execution hardware in the lanes 3030 by assigning instruction prefixes or utilizing instruction control codes. For example, in an ISA that has instruction prefixes (e.g., x86), one prefix such as 0XF1 can be assigned the value of Conditionally Invariant Operation Prefix. Additionally, if the invariant operation identified was the memory operand of an x86 ModR/M byte, for example, the invariant nature of the implied load can be encoded in the reserved values of the segment register field (0x6 and 0x7). In an ISA that has control codes, control code fields may be used to convey the same information.

iv) Minimal Completion of GIOs

There are multiple ways to implement GIOs in hardware. In one embodiment, a Loop Stream Detector (LSD) 3008 associated with the IDQ 1305 includes circuitry to implement semi-lockstep gang execution. If it is determined that one or more gangs are executing the same IPs, the gangs will share entries in the IDQ 1305 which will stream uops for each gang to the backend. In one implementation, the gang selection circuitry of the front end 1307 (e.g., the gang scheduler 1301) will round robin between gangs and attempt to allocate uops from each gang such that no gang tries to allocate past the current shared gang stream before all gangs have allocated all the uops in the stream.

In one embodiment, hardware support to manage invariance within a lane and across gangs includes register file design for writing the results of a load into the register files of multiple Gangs. In one embodiment, this is accomplished by placing the same register ID of multiple gangs adjacent to each other and performing a wide broadcast-type write into all the Gangs' register files simultaneously.

When a gang invariant operation is detected by the dynamic GIO detection circuitry 3005, it marks the uop with the invariant portion (pdst, load-op, or load-op+pdst). In one embodiment, the front end 1307 reads these uop bits and forces other gangs to be picked when the next uop to be allocated is an invariant op. When all gangs have allocated the uops immediately before the invariant uop, then the front end 1307 allocates the invariant uop. A shared execution of an invariant uop is permitted when all gangs participating have allocated the uops immediately prior to the invariant uop. In this way, hazards are prevented.

In one embodiment, hardware register resources are dedicated to values produced by gang invariant operations. Execution of a GIO results in a value which is written to this dedicated state, and the front-end 1307 is notified by a broadcast that this particular GIO value is stored within the machine. Each scheduling or allocation decision checks to see if it is a GIO whose value has been successfully produced by some other thread within this lane, and the operation may be cancelled before dispatch if this test succeeds. In one embodiment, redundant operations are eliminated by the front end 1307. A table of IPs may be used to track unique GIO producers in the backend of the machine and release the physical register when all threads within a lane no longer have the value produced by the GIO visible.

Figure 31:
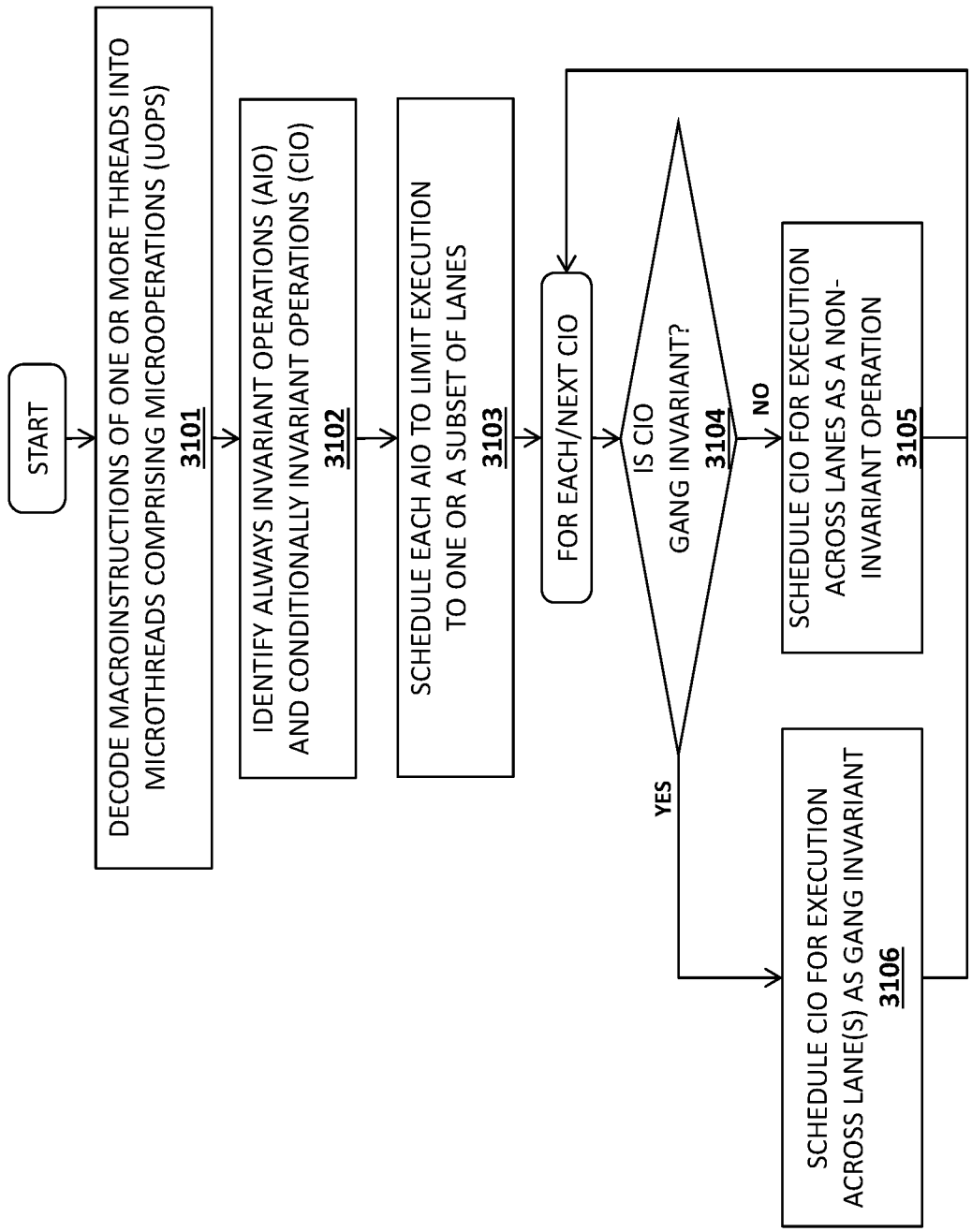
FIG. 31 illustrates a method for detecting and managing gang invariance within a parallel processor.

A method in accordance with one embodiment of the invention is illustrated in FIG. 31. The method may be implemented on the various processor and system architectures described above, but is not limited to any particular architecture.

At 3101 macroinstructions of one or more threads are decoded into microthreads comprising microoperations. At 3102 always invariant operations (AIOs) and conditionally invariant operations (CIOs) are identified. For example, an indication of the type of operation may be encoded in or otherwise associated with each uop. At 3103, each AIO is scheduled to limit its execution to one lane or some subset of lanes.

At 3104, for each CIO, a determination is made as to whether the CIO is gang invariant. For example, an evaluation of current variables may be performed to determine whether the CIO under the current set of conditions will be gang invariant. If not, then at 3105 the CIO is scheduled for execution across lanes as a non-invariant operation. If so, then at 3106 the CIO is scheduled for execution across one or more lanes as a gang invariant operation.

Apparatus and Method for a High Throughput Parallel Co-Processor and Interconnect with Low Offload Latency As mentioned above with respect to FIG. 14C, a data parallel cluster 1300 may be coupled to the cores 1401*a-b* of a central processing unit (CPU) in a co-processor/accelerator arrangement, over a high-speed cache coherent interface 1496 (the terms "co-processor" and "accelerator" will be used interchangeably herein). Various coherent co-processor/accelerator interfaces are in use today including, for example, NVLink, Open Coherent Accelerator Processor Interface (OpenCAPI), Cache Coherent Interconnect for Accelerators (CCIA), and UltraPath Interconnect. Each interface includes mechanisms to dispatch work to a co-processor device and techniques to protect the coherency of the data shared between the CPU and the co-processor device.

One key limiter in the offload of data parallel problems from the CPU to accelerator devices is the transfer latency. Embodiments of the invention provide a scalable solution by implementing heterogeneous hardware at two different optimization points and transparently moving the offloaded execution between the two different hardware units. While the embodiments described below focus on the interaction between a data parallel cluster and host processor, the underlying principles of the invention are not limited to any specific type of accelerator device.

One embodiment of the invention includes circuitry and logic for expressing the data parallel work between hardware units such as a host processor and an accelerator device. One embodiment includes instructions for offloading parallel work from a processor which do not specify the execution resources employed. In addition, specialized instructions may be used within the parallel execution resources that distribute execution across a plurality of processing elements and/or lanes. A software mechanism may also be implemented for expressing parallel work (e.g., such as may be embodied in a compiler which is flexible in the parallel execution resources used).

Figure 32:
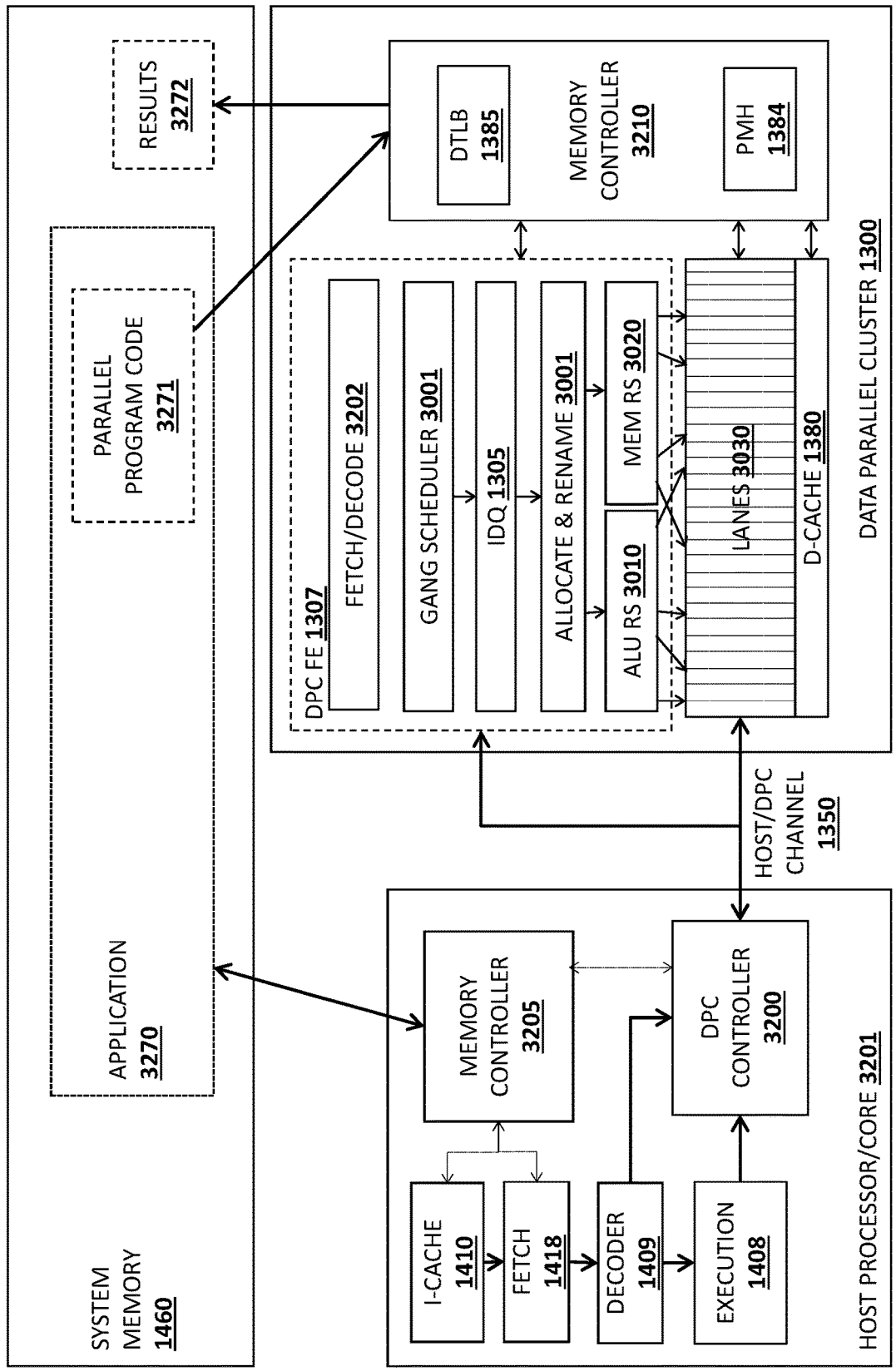
FIG. 32 illustrates one embodiment of coupling a host processor/core with a parallel processing engine.

FIG. 32 illustrates a specific implementation in which a DPC controller 3200 integrated within the host processor or core 3201 (hereinafter "processor 3201") manages the power and occupancy signals for adjusting the power states of different execution resources within the DPC 1300 (e.g., determining which execution resources to keep active). In the illustrated embodiment, a host/DPC communication channel 1350 connects the processor 3201 to the DPC 1300. In addition, FIG. 32 illustrates an embodiment in which both the processor 3201 and DPC 1300 include independent memory controllers, 3205 and 3210, respectively, for coupling each device to system memory 1460.

In one embodiment, the DPC controller 3200 adjusts the number of concurrent execution resources for a parallel task offloaded from the processor 3201 to the execution lanes 3030 of the DPC 1300 based on different variables and components. For example, the DPC controller 3200 may determine the most efficient schedule for parallel tasks on the DPC 1300, based on signals that indicate the power consumed by dispatched parallel work and the breadth of parallel work yet to be dispatched, for each lane 3030. It evaluates these signals to determine whether to suspend further execution of parallel work in one or more execution units within one or more lanes 3030 and/or migrate work to one or more different execution units or lanes 3030. For example, in the specific architectures described herein, the DPC controller 3200 may reallocate work from one or more ALUs 1350 and/or TALUs 1340 to different ALUs/TALUs, potentially in a different lane 1310, based on the current/anticipated processing requirements and the overall system power budget.

The accelerator device may include one or more parallel hardware units optimized for different design points. For example, the design points may include frequency, energy efficiency, total amount of execution state, available memory bus bandwidth, and available microarchitectural resources such as ALUs 1350 and TALUs 1340.

In one embodiment, the host processor 3201 executes an application which includes parallel program code 3271. When the application 3270 is started up, the instruction processing pipeline of the processor 3201 executes the primary application thread. In particular, instructions of the thread are passed from the memory controller 3205 to the I-cache 1410 and/or fetch unit 1418, decoded by the decoder 1409 and executed by the execution circuitry 1408. The decoder 1409 and/or execution circuitry 1408 detects when a sequence of instructions in the primary thread are designed to be executed on the DPC 1300, the decoder 1409 and/or execution circuitry 1408 forwards these instructions to the DPC controller 3200 which initiates execution on the DPC lanes 3030.

The DPC controller 3200 may initially configure the DPC cluster 1300 by passing initial values such as the thread context identifier, the number of active threads, and the number of loop iterations to the lanes 3030 of the DPC 1300, either directly or via the DPC FE 1307. In one embodiment, the DPC controller 3200 then passes an address pointer to the parallel program code 3271 over the host/DPC channel 1350. The DPC FE 1307 begins fetching instructions from this address pointer and scheduling the instructions for execution in parallel across the lanes 3030. In this embodiment, the instructions of the parallel program code 3271 are fetched and decoded by fetch/decode circuitry 3202 within the DPC FE 1307. However, in other embodiments, the parallel program code 3271 is decoded by the host processor 3201 and stored to memory 1460 or transmitted over the host/DPC channel 1350. Results 3272 of the parallel execution on the lanes are stored back to a designated region in memory 3272 which is accessible by the processor 3201 (e.g., so that it the primary thread and/or other threads can access the data).

In one embodiment, the host processor 3201 performs other operations to support the DPC 1300 such as allocating in-memory stacks for the microthreads/uops and pushing the pointer to the base of the stack(s) and the stack size to the DPC 1300. These stacks may then be used by the lanes 3030 when executing the microthreads. In addition, the host processor 3201 may allocate in-memory thread-local storage for certain programming models.

In one embodiment, if the host processor 3201 detects that the execution regime is not suited to the currently executing execution resources of the lanes, it may implement a transfer of the current parallel program code 3271 to a different unit (e.g., a different ALU/TALU and/or a different lane).

Figure 33:
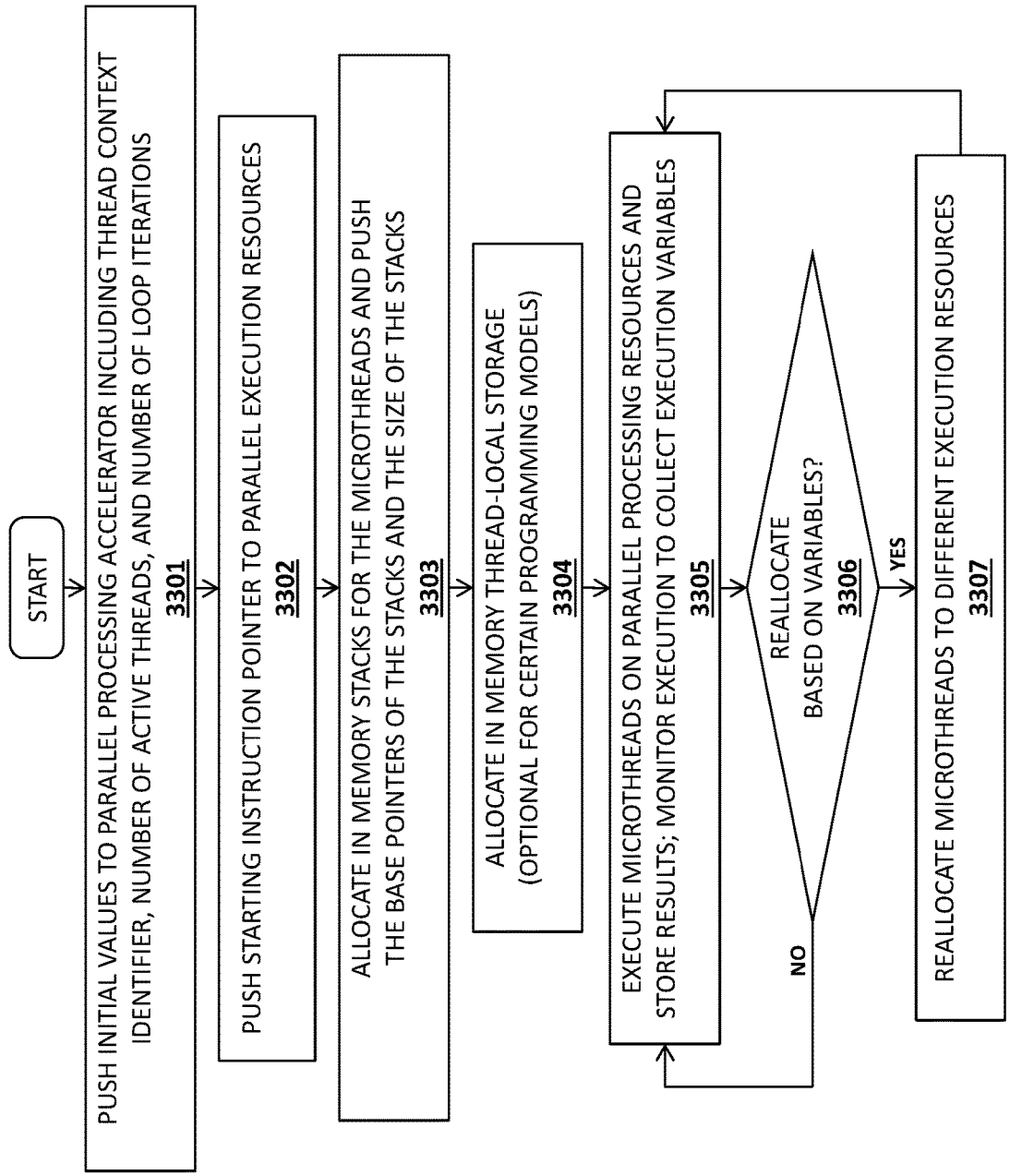
FIG. 33 illustrates one embodiment of a method for allocating work to a parallel processing engine.

A method in accordance with one embodiment of the invention is illustrated in FIG. 33. The method may be implemented on the system architecture described above, but is not limited to any particular processor or system architecture.

At 3301, initial values are pushed to the parallel execution accelerator. As mentioned, this may include the thread context identifier (e.g., to identify the application 3270 initiating the operations), the number of active threads, and the number of loop iterations. At 3302, an instruction pointer is pushed to the parallel execution resources identifying a location in memory from which to execute the microthreads. In one embodiment, this region of program code is initially set up in memory by the host processor to generate the pointer; the host processor then provides the pointer to the parallel execution resources.

At 3303, in-memory stacks are allocated for the various microthreads and the base pointers of the various stacks and the size of each stack are pushed to the various microthreads, thereby providing the execution resources visibility of the execution stacks for executing the microthreads. At 3304, in memory thread-local storage is allocated (dependent on the particular programming model being used).

At 3305 the microthreads are executed on the parallel execution resources and results are stored. Depending on the implementation, the parallel execution resources may slice the parallel work according to the architectural scheme defined by the instructions for expressing parallel execution of a loop. In addition, at 3305 the host processor or circuitry of the parallel execution resources monitor variables related to the performance and/or power usage of the parallel execution resources. For example, the average power consumed per unit of time, instruction execution efficiency, workload on the parallel execution resources, and/or temperature readings may be collected.

At 3306 the performance/power variables are evaluated to determine whether the microthreads should be reallocated across the processing resources a more efficient manner. For example, if the power budget of the system is being exceeded, then processing resources may be reallocated to reduce power consumption. Conversely, if a particular performance metric is not being met, then the processing resources may be allocated to raise performance. Different power/performance policies may be implemented for different systems. If a reallocation decision is made, then one or more microthreads are reallocated to different execution resources at 3307.

In one embodiment, if it is determined that the execution regime of the currently active parallel procedure would be better executed on different resources, the controller may signal to the active parallel execution resources that the number of active threads is different and/or may signal that the next thread contexts are null (e.g., to cause the active parallel execution resources to terminate execution). In either case, the code executing on the active execution resources may finish a number of loop iterations at defined architectural points specified by the compiler (e.g., inserted into the control flow graph). Thus, thread contexts do not need to be saved by a large collection of parallel execution resources and transmitted, potentially at large cost, to a different location on- or off-chip. Only a small amount of state is transmitted, keeping the transition latency low.

One embodiment of the invention includes a set of instructions to access and manage parallel processing resources. Table A below specifies a particular set of instructions and includes an indication as to whether the instructions are to be executed on the host processor or on the parallel processing device.

TABLE A

| Instructions for Managing Heterogeneous Parallel Task Offload | Valid on host | Valid on device |
|---|---|---|
| Parallel procedure call (PCALL)-Execute parallel procedure at memory location with a number of iterations specified. Results are stored in memory, potentially at a location specified by a control structure. | True | True |
| Parallel procedure return (PRET)-Cease execution of a parallel procedure. A signal can be sent to the control unit to indicate this resource is available. | False | True |
| Parallel procedure thread context (TCONTEXT)- Returns an identifier that provides a unique slice into the loop iterations of the current parallel procedure. | False | True |
| Number of active threads (TOCCUPANCY)- Returns an unsigned integer which indicates the number of concurrently executing resources. Used to calculate the next slice into the parallel procedure call's loop iterations. | False | True |
| Next thread context (INCCONTEXT)-Returns an identifier which indicates the next unique slice into the loop iterations of the current parallel procedure. Can return a null identifier. | False | True |
| Any of these instructions may reference the depth of nested parallel procedure calls to get a unique slice at each level of parallel procedure call. | | |

In this embodiment, the host processor executes the PCALL instruction to initiate a parallel procedure call on the parallel execution resources. The parallel procedure call identifies a memory location/pointer from which the parallel execution resources are to execute the parallel program code as well as a number of iterations to be performed. Results are stored in memory, potentially at a location specified by a control structure. In the embodiment shown in FIG. 32, for example, the memory pointer to the parallel program code 3271 is transmitted over the host/DPC channel 1350 and the results 3272 are stored in a memory location specified by the host processor 3201 (e.g., a memory region allocated to the DPC 1300 by the host processor 3201 or the memory subsystem).

The remaining instructions listed in Table A are executed by the parallel execution resources. In particular, when execution is complete and results generated, the parallel execution resources may execute a parallel procedure return (PRET) instruction, which signals the controller that processing is complete (and therefore that this execution resource is available).

The parallel procedure thread context instruction (TCONTEXT) returns an identifier that provides a unique slice into the loop iterations of the current parallel procedure. For example, TCONTEXT may indicate the amount of work performed by the parallel execution resources.

The number of active threads instruction (TOCCUPANCY) returns a value indicating the number of concurrently executing resources and may be used (e.g., by the host processor 3201) to calculate the next slice into the parallel procedure call's loop iterations.

The next thread context instruction (INCCONTEXT) returns an identifier which indicates the next unique slice into the loop iterations of the current parallel procedure. In one embodiment, it can return a null identifier.

In one embodiment, the parallel program code 3721 includes a general Turing-complete compute instruction set augmented with the instructions highlighted above. The iterations of a loop without dependencies between loop iterations can be expressed in a concurrency-independent machine representation that can be directly executed by a compatible parallel accelerator device without any intervening steps. The state of any particular hardware context is implied by the state of the parallel execution resources set up by the controller (e.g., DPC controller 3200), rather than expressly defined statically in the offload instruction specification.

Figure 34:
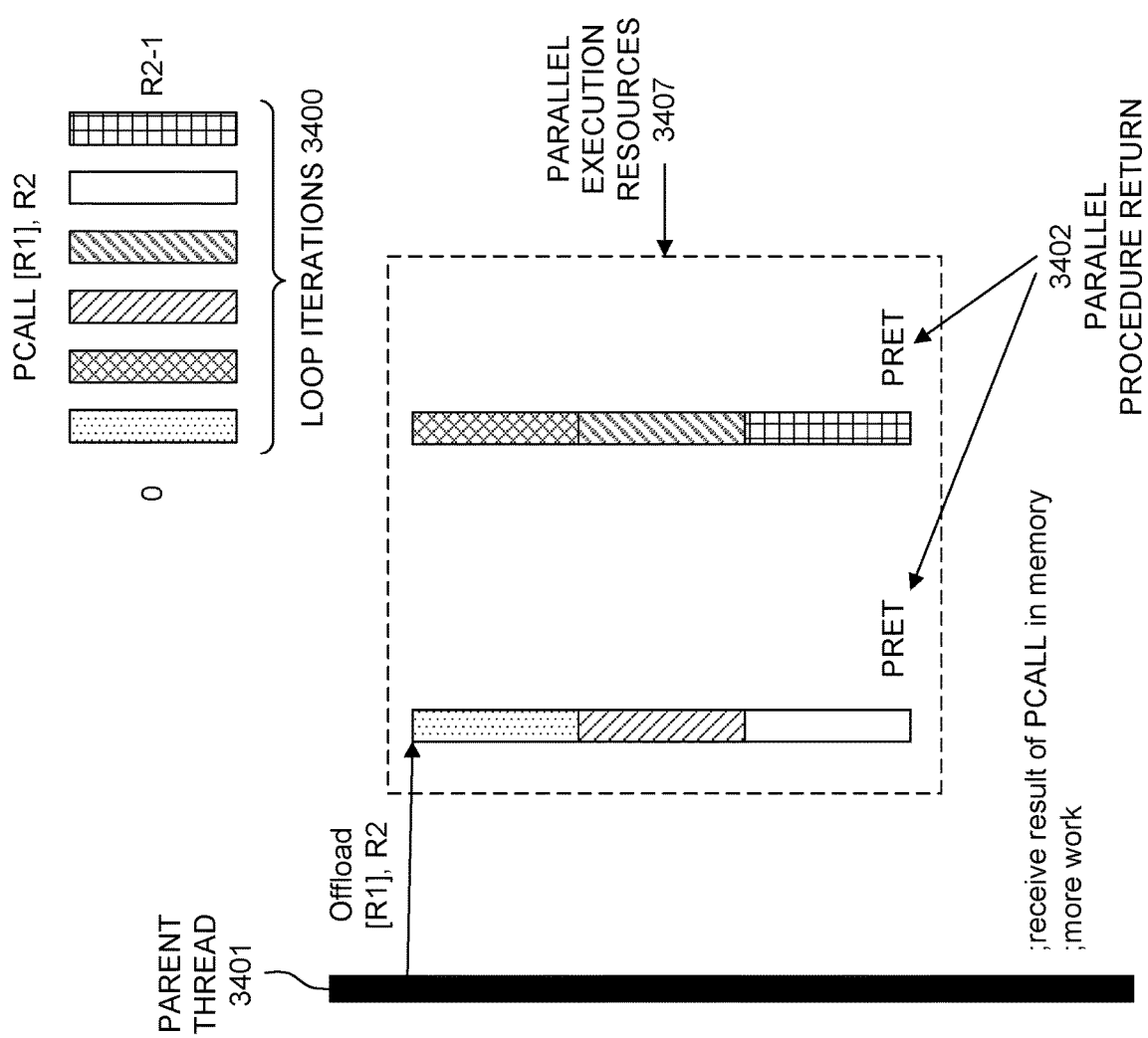
FIG. 34 illustrates an example parent thread spawning loop iterations which are distributed to parallel execution resources.

In one embodiment, while executing the program code identified by the parallel procedure call, the parallel execution resources receive values resulting from the instructions in Table A and use them to map different loop iterations to execution resources according to the scheme detailed in FIG. 34. With respect to the DPC embodiment, for example, the DPC controller 3200, the parallel program code 3271, and the instructions listed above are combined to determine which loop iteration is currently being executed by each hardware context inside the DPC lanes 3030.

In FIG. 34, a parent thread 3401 (e.g., executed on the host processor) executes a parallel procedure call (PCALL) identifying a particular set of loop iterations 3400 to be executed. In response to the PCALL instruction, the loop iterations 3400 are scheduled and executed across two different parallel execution resources 3407 (e.g., such as the lanes discussed above). When execution is complete, each parallel execution thread (sometimes referred to above as a microthread) executes a parallel procedure return instruction 3402 to notify the parent thread 3401 that execution is complete.

Figure 35:
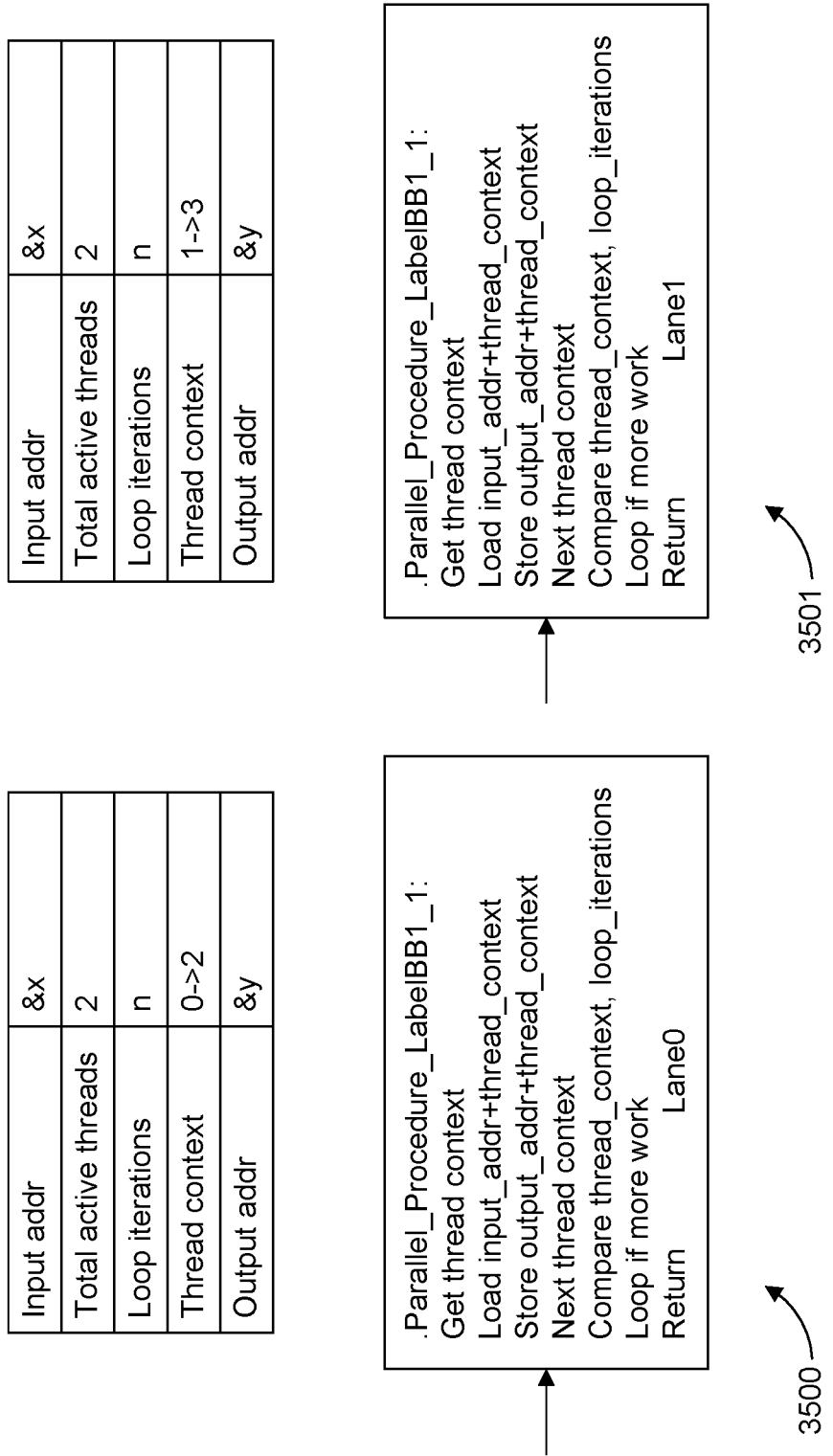
FIG. 35 illustrates an example of parallel processing across two lanes.

Another example of how instructions can dynamically map to available execution resources is provided in FIG. 35. This example is based on the DPC architecture described above. Consider a copy loop trying to move a buffer of N elements from some memory address x to some memory address y.

```
for(int i=0; i<n; i++) {
    Y[i] = x[i];
}
```

In this example, the available parallel execution resources consist of two lanes of one hardware context each, for a total of two active threads 3500 and 3501 in the DPC 1300.

The parallel procedure executed by each thread is identical. The thread context instruction provides an offset into the input array that is independent from the other iterations of the loop. Then, the next thread context instruction provides an increment of the induction variable i of the loop. The compiler inserts a comparison to make certain that the returned identifier is not null and execution has not finished. The active thread then executes a different loop context. Each thread is responsible for pulling any state required, such as addresses of input and output. This is designed to reduce the amount of data transferred in dispatching new parallel work to parallel execution resources.

The next thread context is dependent on the current thread context, the total active threads, and the number of loop iterations. As the number of active threads changes due to the hardware control unit making decisions about which parallel execution resources are participating in this parallel procedure call. This information, as expressed via the new instructions, is sufficient to locate a hardware context's iteration within the larger collection of active parallel execution resources for this loop.

Embodiments of the invention may encode concurrency requirements, for example by a control register that indicates how many threads are available to execute concurrently, to support synchronization between loop iterations to express dependencies such as compare-and-swap or barrier. Optionally, an implementation may perform a context switch to support synchronization between loop iterations that are expected to execute concurrently but are mapped to fewer hardware contexts. Or, instead, an implementation could make the parallel procedure call with an instruction which will fail due to insufficient available execution resources and require the host thread to use alternate code paths with fewer threads required for concurrent operation.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Components, features, and details described for any of the apparatus may also optionally apply to any of the methods, which in embodiments may be performed by and/or with such apparatus. Any of the processors described herein may be included in any of the systems disclosed herein. In some embodiments, the computer system may include an interconnect, a processor coupled with the interconnect, and a dynamic random access memory (DRAM) coupled with the interconnect. Alternatively, instead of DRAM, other types of volatile memory that don't need to be refreshed may be used, or flash memory may be used.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLES

The following are example implementations of different embodiments of the invention.

Example 1

A processor comprising: instruction fetch circuitry to fetch instructions of one or more primary threads; a decoder to decode the instructions to generate uops; a data parallel cluster (DPC) to execute microthreads comprising a subset of the uops, the DPC further comprising: a plurality of execution lanes to perform parallel execution of the microthreads; an instruction decode queue (IDQ) to store the uops prior to execution; and a scheduler to evaluate the microthreads based on associated variables including instruction pointer (IP) values, the scheduler to gang microthreads into fragments for parallel execution on the execution lanes based on the evaluation.

Example 2

The processor of example 1 wherein the scheduler is to gang the microthreads into fragments based on IP values to induce microthread convergence.

Example 3

The processor of example 1 wherein a fragment comprises a collection of associated microthreads.

Example 4

The processor of example 2 further comprising: reconvergence circuitry to be used by the scheduler to determine an order in which to execute the fragments, the reconvergence circuitry comprising a data structure to store variables associated with each fragment.

Example 5

The processor of example 4 wherein the reconvergence circuitry is configured to generate a signal to identify a next fragment to be executed based on a comparison of the variables of all fragments.

Example 6

The processor of example 5 wherein the comparison comprises a comparison of the IP values of the fragments and wherein the fragment having a minimum IP value is to be selected for execution by execution lanes.

Example 7

The processor of example 1 wherein the DPC further comprises: mask storage to store an execution mask having at least one value associated with each parallel execution lane.

Example 8

The processor of example 7 wherein the DPC is to enable or disable execution lanes for executing each fragment or microthread based on the values associated with the lanes.

Example 9

The processor of example 8 wherein the execution mask is to be updated dynamically for each fragment or microthread, thereby enabling a number of lanes required to execute the fragment or microthread.

Example 10

The processor of example 1 wherein the DPC further comprises: a data cache to store data to be used to execute the fragments; a translation lookaside buffer (TLB) to store virtual-to-physical address translations for accessing system memory.

Example 11

The processor of example 1 wherein each lane of the DPC further comprises: a register file to store data associated with an executing fragment; a tensor arithmetic logic unit (TALU) to process tensor data associated with an executing fragment; and an address generation unit to generate addresses required to execute each fragment.

Example 12

A method comprising: fetching instructions of one or more primary threads; decoding the instructions to generate uops; identifying microthreads comprising a subset of the uops; evaluating the microthreads based on associated variables including instruction pointer (IP) values; and ganging the microthreads into fragments for parallel execution on a plurality of parallel execution lanes based on the evaluation.

Example 13

The method of example 12 wherein the microthreads are ganged into fragments based on the IP values to induce microthread convergence.

Example 14

The method of example 12 wherein a fragment comprises a collection of associated microthreads.

Example 15

The method of example 13 further comprising: determining an order in which to execute the fragments using a data structure storing variables associated with each fragment.

Example 16

The method of example 15 further comprising: generating a signal to identify a next fragment to be executed based on a comparison of the variables of all fragments.

Example 17

The method of example 16 wherein the comparison comprises a comparison of the IP values of the fragments and wherein the fragment having a minimum IP value is to be selected for execution on the parallel execution lanes.

Example 18

The method of example 12 further comprising:
storing an execution mask having at least one value associated with each of the parallel execution lanes.

Example 19

The method of example 18 further comprising: enabling or disabling execution lanes for executing each fragment or microthread based on the values associated with the lanes.

Example 20

The method of example 19 further comprising: dynamically updating the execution mask for each fragment or microthread, thereby enabling a specified number of lanes required to execute the fragment or microthread.

Example 21

A machine readable medium having program code stored thereon which, when executed by a machine, causes the machine to perform the operations of: fetching instructions of one or more primary threads; decoding the instructions to generate uops; identifying microthreads comprising a subset of the uops; evaluating the microthreads based on associated variables including instruction pointer (IP) values; and ganging the microthreads into fragments for parallel execution on a plurality of parallel execution lanes based on the evaluation.

Example 22

The machine-readable medium of example 21 wherein the microthreads are ganged into fragments based on the IP values to induce microthread convergence.

Example 23

The machine-readable medium of example 21 wherein a fragment comprises a collection of associated microthreads.

Example 24

The machine-readable medium of example 22 further comprising program code to cause the machine to perform the operation of: determining an order in which to execute the fragments using a data structure storing variables associated with each fragment.

Example 25

The machine-readable medium of example 24 further comprising program code to cause the machine to perform the operation of: generating a signal to identify a next fragment to be executed based on a comparison of the variables of all fragments.

Example 26

The machine-readable medium of example 25 wherein the comparison comprises a comparison of the IP values of the fragments and wherein the fragment having a minimum IP value is to be selected for execution on the parallel execution lanes.

Example 27

The machine-readable medium of example 21 further comprising program code to cause the machine to perform the operation of: storing an execution mask having at least one value associated with each of the parallel execution lanes.

Example 28

The machine-readable medium of example 27 further comprising program code to cause the machine to perform the operation of: enabling or disabling execution lanes for executing each fragment or microthread based on the values associated with the lanes.

Example 29

The machine-readable medium of example 28 further comprising program code to cause the machine to perform the operation of: dynamically updating the execution mask for each fragment or microthread, thereby enabling a specified number of lanes required to execute the fragment or microthread.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a plurality of parallel execution lanes comprising execution circuitry and registers to concurrently execute a plurality of threads;
front end circuitry coupled to the plurality of parallel execution lanes, the front end circuitry to arrange the threads into parallel execution groups and schedule operations of the threads to be executed across the parallel execution lanes,
wherein the front end circuitry is to dynamically evaluate one or more variables associated with the operations to determine if one or more of the operations are conditionally invariant, and the determination comprises determining whether the one or more of the operations will be invariant across threads of a plurality of parallel execution groups within a same lane but not across threads of the plurality of parallel execution groups in multiple lanes, to produce a same variable value across the threads of the plurality of parallel execution groups;
a scheduler of the front end circuitry to responsively schedule a shared thread upon a determination that a conditionally invariant operation will be invariant across the threads of the plurality of parallel execution groups; and
a first parallel execution lane to execute the shared thread to generate execution results and to share the execution results across other threads of the plurality of parallel execution groups.

2. The processor of claim 1 further comprising:
a first set of registers in a first parallel execution lane to store the execution results;
and data distribution circuitry to broadcast one or more of the execution results to additional sets of registers within the first parallel execution lane.

3. The processor of claim 1 wherein dynamically evaluating the one or more variables comprises determining whether input values to the conditionally invariant operation will be identical across the threads of the plurality of parallel execution groups.

4. The processor of claim 1 wherein the scheduler is to cause one or more threads to wait for the execution of the shared thread to complete.

5. The processor of claim 1 wherein the threads are microthreads comprising a plurality of microoperations.

6. The processor of claim 5 wherein the front end circuitry further comprises a decoder to generate the microthreads responsive to decoding a plurality of macroinstructions.

7. The processor of claim 5 wherein the front end circuitry is to arrange the microthreads into the parallel execution groups based on instruction pointer values to induce microthread convergence.

8. The processor of claim 1 further comprising:
mask storage to store an execution mask having at least one value associated with each parallel execution lane, wherein the front end circuitry is to enable or disable one or more of the parallel execution lanes based on the values associated with the lanes.

9. A method comprising:
arranging a plurality of threads into parallel execution groups for execution on a plurality of parallel execution lanes, the threads comprising operations to be executed by execution circuitry within each of the parallel execution lanes;
dynamically evaluating one or more variables associated with the operations to determine if one or more of the operations are conditionally invariant, and the determination comprises determining whether the one or more of the operations will be invariant across threads of a plurality of parallel execution groups within a same lane but not across threads of the plurality of parallel execution groups in multiple lanes to produce a same variable value across the threads of the plurality of parallel execution groups;
scheduling a shared thread upon a determination that a conditionally invariant operation will be invariant across the threads of the plurality of parallel execution groups; and
executing the shared thread to generate execution results and to share the execution results across other threads of the plurality of parallel execution groups.

10. The method of claim 9 further comprising:
storing the execution results in a first set of registers in a first parallel execution lane;

and broadcasting one or more of the execution results to additional sets of registers within the first parallel execution lane.

11. The method of claim 9 wherein dynamically evaluating one or more variables comprises determining whether input values to the conditionally invariant operation will be identical across the threads of the plurality of parallel execution groups.

12. The method of claim 9 further comprising:
causing one or more threads to wait for the execution of the shared thread to complete.

13. The method of claim 9 wherein the threads are microthreads comprising a plurality of microoperations.

14. The method of claim 13 further comprising:
generating the microthreads responsive to decoding a plurality of macroinstructions.

15. The method of claim 13 further comprising:
arranging the microthreads into the parallel execution groups based on instruction pointer values to induce microthread convergence.

16. The method of claim 9 further comprising:
storing an execution mask having at least one value associated with each parallel execution lane; and
enabling or disabling one or more of the parallel execution lanes based on the values associated with the lanes in the execution mask.

17. A non-transitory machine-readable medium having program code stored thereon which, when executed by a machine, causes the machine to perform the operations of:
arranging a plurality of threads into parallel execution groups for execution on a plurality of parallel execution lanes, the threads comprising operations to be executed by execution circuitry within each of the parallel execution lanes;
dynamically evaluating one or more variables associated with the operations to determine if one or more of the operations are conditionally invariant, and the determination comprises determining whether the one or more of the operations will be invariant across threads of a plurality of parallel execution groups within a same lane but not across threads of the plurality of parallel execution groups in multiple lanes to produce a same variable value across the threads of the plurality of parallel execution groups;
scheduling a shared thread upon a determination that a conditionally invariant operation will be invariant across the threads of the plurality of parallel execution groups; and
executing the shared thread to generate execution results and to share the execution results across other threads of the plurality of parallel execution groups.

18. The non-transitory machine-readable medium of claim 17 further comprising program code to cause the machine to perform the operations of:
storing the execution results in a first set of registers in a first parallel execution lane; and
broadcasting one or more of the execution results to additional sets of registers within the first parallel execution lane.

19. The non-transitory machine-readable medium of claim 17 wherein dynamically evaluating one or more variables comprises determining whether input values to the conditionally invariant operation will be identical across the threads of the plurality of parallel execution groups.

20. The non-transitory machine-readable medium of claim 17 further comprising program code to cause the machine to perform the operations of:
causing one or more threads to wait for the execution of the shared thread to complete.

21. The non-transitory machine-readable medium of claim 17 wherein the threads are microthreads comprising a plurality of microoperations.

22. The non-transitory machine-readable medium of claim 21 further comprising program code to cause the machine to perform the operations of:
generating the microthreads responsive to decoding a plurality of macroinstructions.

23. The non-transitory machine-readable medium of claim 21 further comprising program code to cause the machine to perform the operations of:
arranging the microthreads into the parallel execution groups based on instruction pointer values to induce microthread convergence.

24. The non-transitory machine-readable medium of claim 17 further comprising program code to cause the machine to perform the operations of:
storing an execution mask having at least one value associated with each parallel execution lane; and
enabling or disabling one or more of the parallel execution lanes based on the values associated with the lanes in the execution mask.

* * * * *